United States Patent [19]

Benton et al.

[11] Patent Number: 4,625,276
[45] Date of Patent: Nov. 25, 1986

[54] DATA LOGGING AND TRANSFER SYSTEM USING PORTABLE AND RESIDENT UNITS

[75] Inventors: William M. Benton, Ft. Lauderdale; William W. Mee, Pompano Beach, both of Fla.

[73] Assignee: Vericard Corporation, Fort Lauderdale, Fla.

[21] Appl. No.: 528,112

[22] Filed: Aug. 31, 1983

[51] Int. Cl.⁴ ............................................. G06F 15/30
[52] U.S. Cl. .................... 364/408; 364/401; 364/406; 364/414; 235/379; 235/380
[58] Field of Search .................... 364/400–401, 364/403, 405–408, 413–415, 418, 200 MS File, 900 MS File; 235/379–381, 383, 491; 340/825.33

[56] References Cited

U.S. PATENT DOCUMENTS

| | | | |
|---|---|---|---|
| 4,001,550 | 1/1977 | Schatz | 235/61.7 B |
| 4,007,355 | 2/1977 | Moreno | 235/61.7 R |
| 4,032,931 | 6/1977 | Haker | 340/365 R |
| 4,053,735 | 10/1977 | Foudos | 235/61.9 R |
| 4,115,870 | 9/1978 | Lowell | 364/900 |
| 4,277,837 | 7/1981 | Stuckert | 364/900 |
| 4,321,672 | 3/1982 | Braun et al. | 364/408 |
| 4,341,951 | 7/1982 | Benton | 235/379 |
| 4,355,369 | 10/1982 | Garvin | 364/900 |
| 4,415,065 | 11/1983 | Sandstedt | 364/401 X |
| 4,417,306 | 11/1983 | Citron et al. | 364/415 |
| 4,423,313 | 12/1983 | Tanigaki | 235/379 |
| 4,428,050 | 1/1984 | Pellegrino et al. | 364/414 |
| 4,454,414 | 6/1984 | Benton | 235/379 |
| 4,460,965 | 7/1984 | Trehn et al. | 364/401 X |
| 4,472,626 | 9/1984 | Frid | 235/379 |
| 4,482,802 | 11/1984 | Aizawa et al. | 235/379 |
| 4,485,300 | 11/1984 | Peirce | 235/380 |

*Primary Examiner*—Gary V. Harkcom
*Attorney, Agent, or Firm*—Lowe Price LeBlanc Becker & Shur

[57] ABSTRACT

A system for transferring electronic funds data includes portable modules (20) each having a display (24) and a keyboard (26) together with an optical interface (36) adapted to transfer electronic funds data to other modules either directly or over the telephone lines through resident units (62). The modules (20) are operable in either a credit mode or a debit mode using a selector switch (30). Prior to establishing communication, the module determines whether it is in communication with another module or with a resident unit, then undergoes a "handshaking" protocol to establish half-duplex, bidirectional communication, before funds are actually transferred. Transaction records are retained in a random access memory (44) within each module. The transaction records are periodically downloaded to a central computer, or printed locally to generate a hard copy. Other applications of the system include monitoring physiological data, maintaining work-time records and monitoring radiation dosage.

8 Claims, 81 Drawing Figures

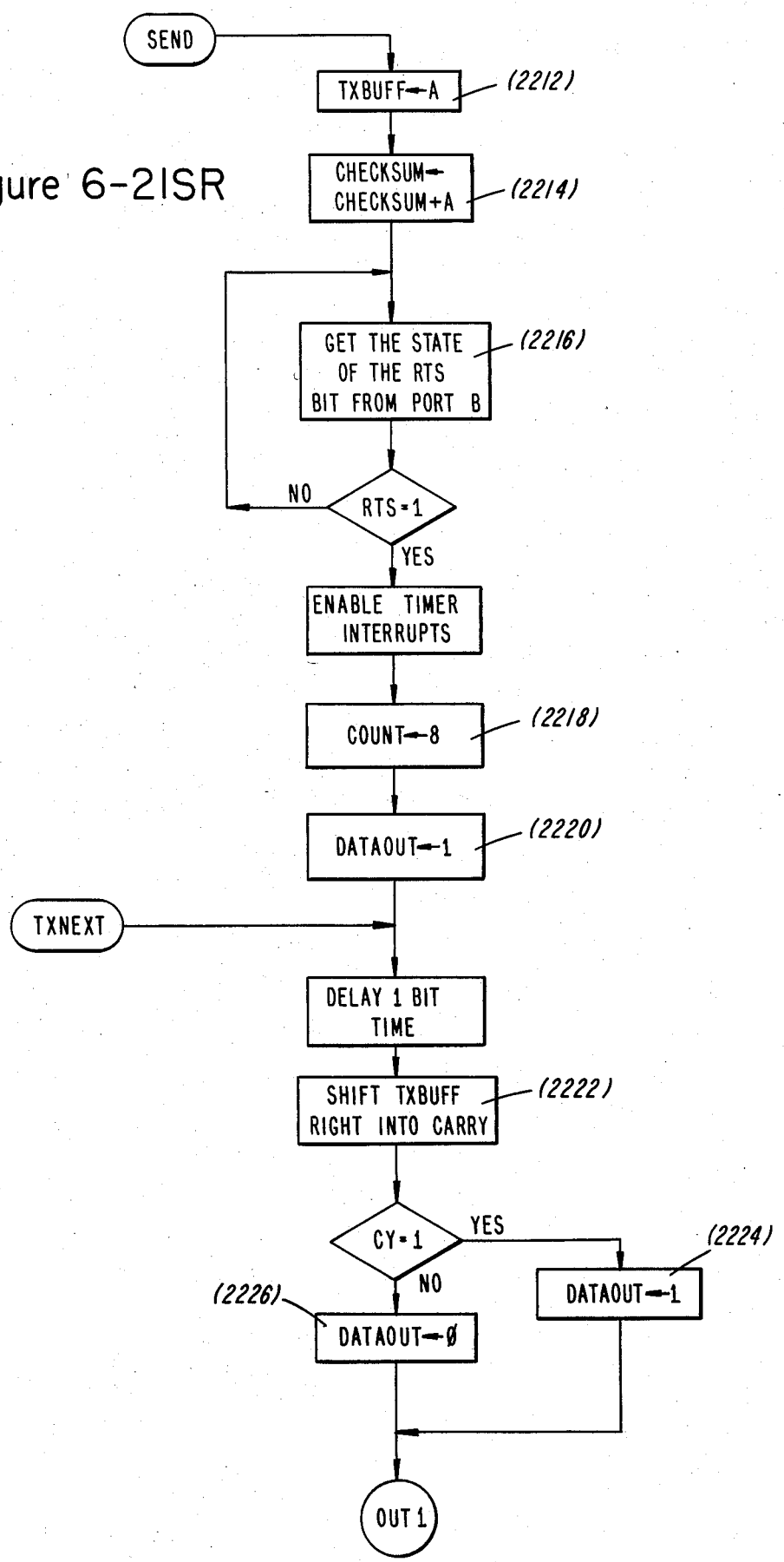
Figure 6-2ISR

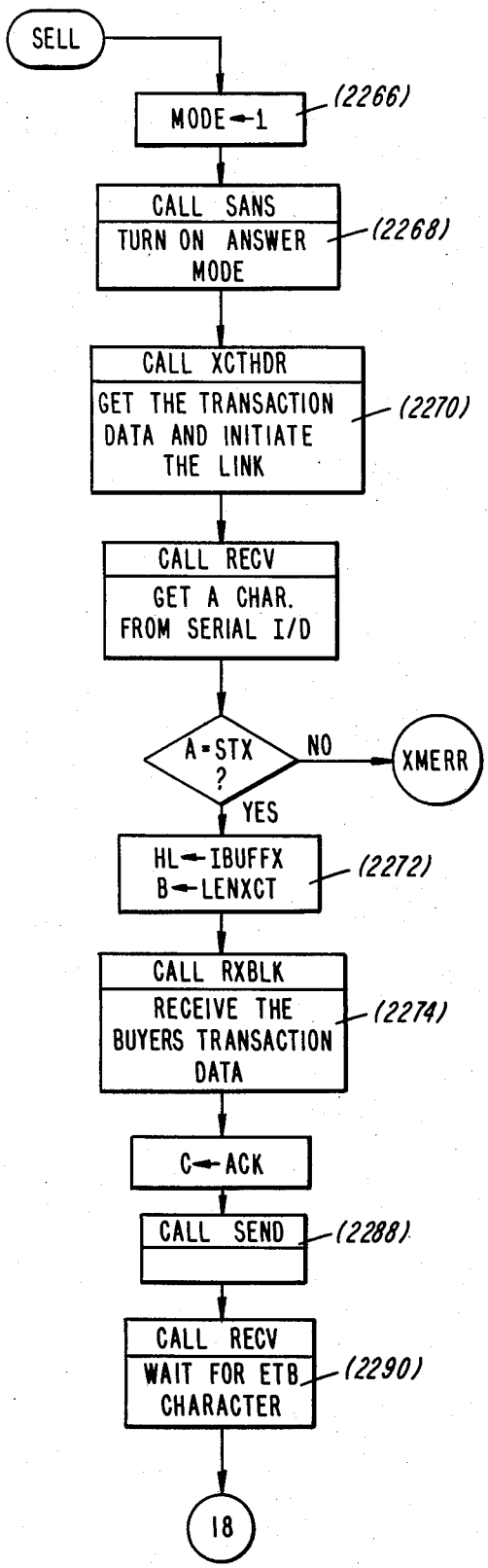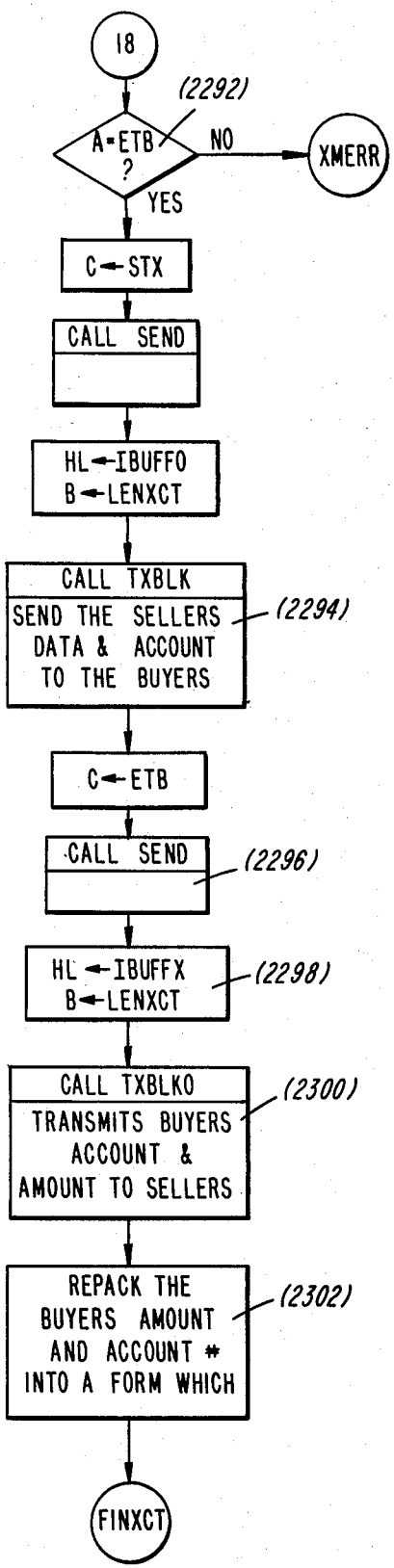
Figure 7-17     Figure 7-18

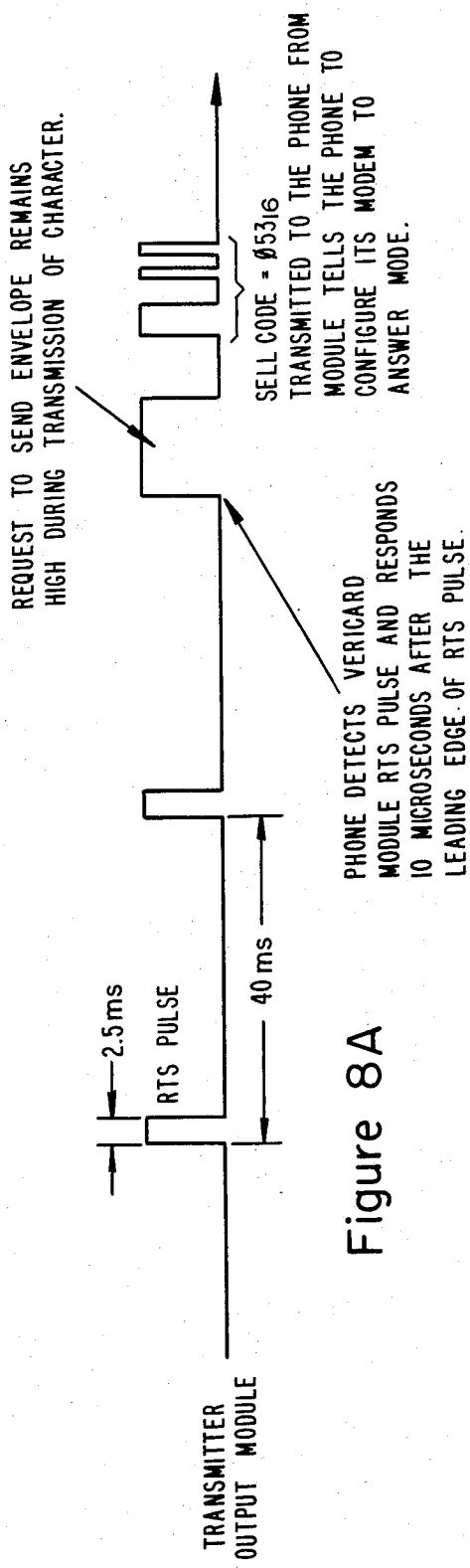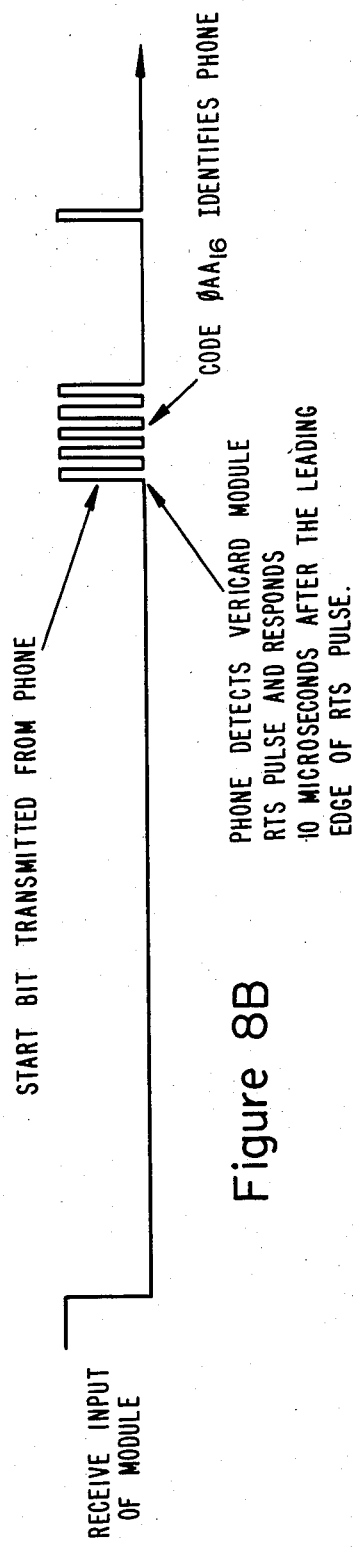

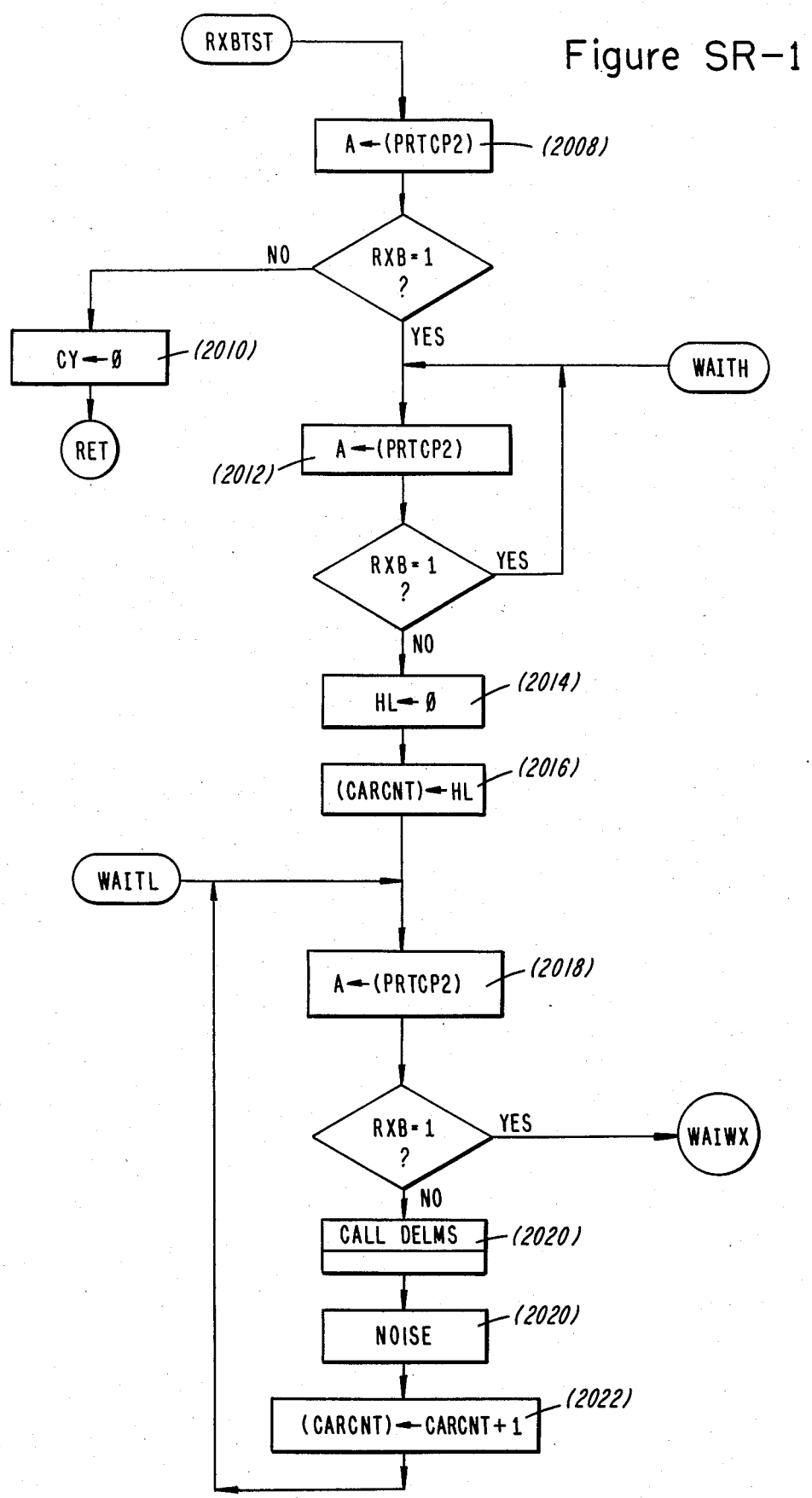
Figure SR-1

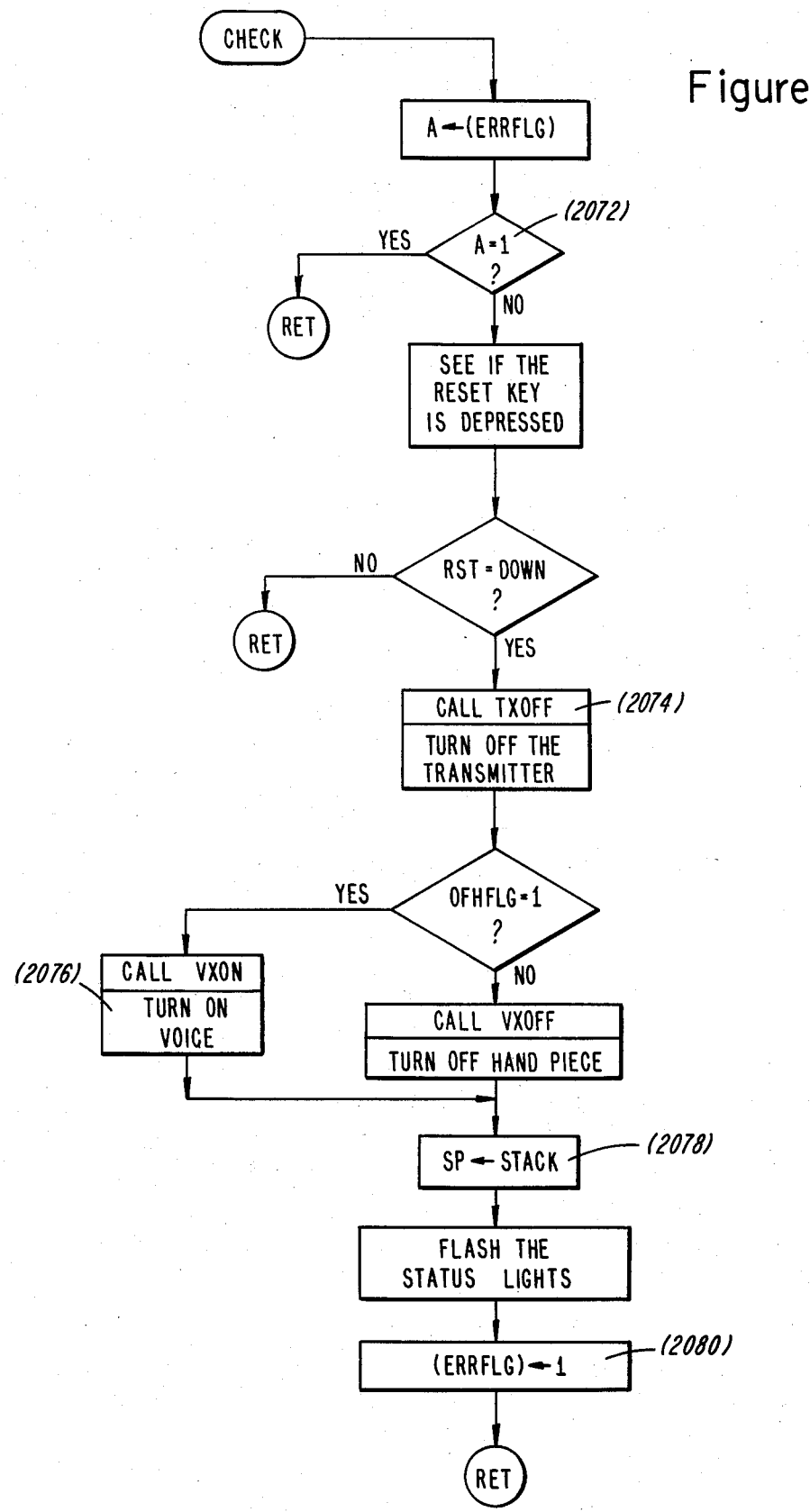
Figure SR-2

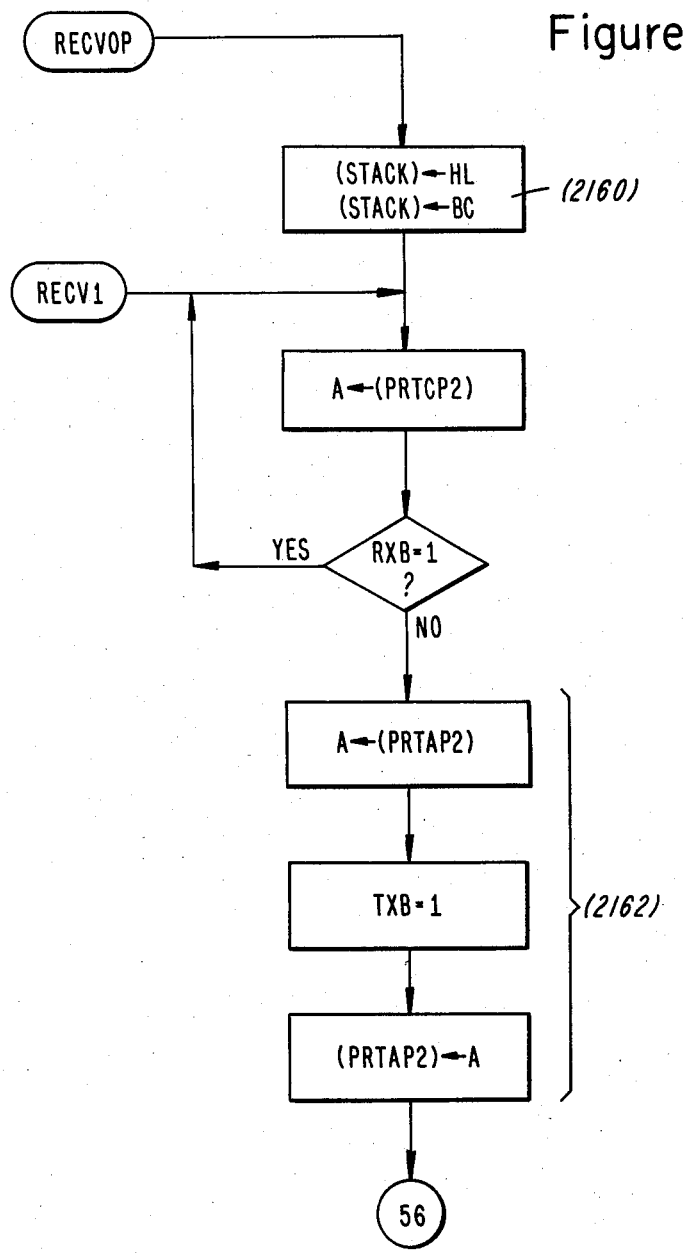
Figure SR-3

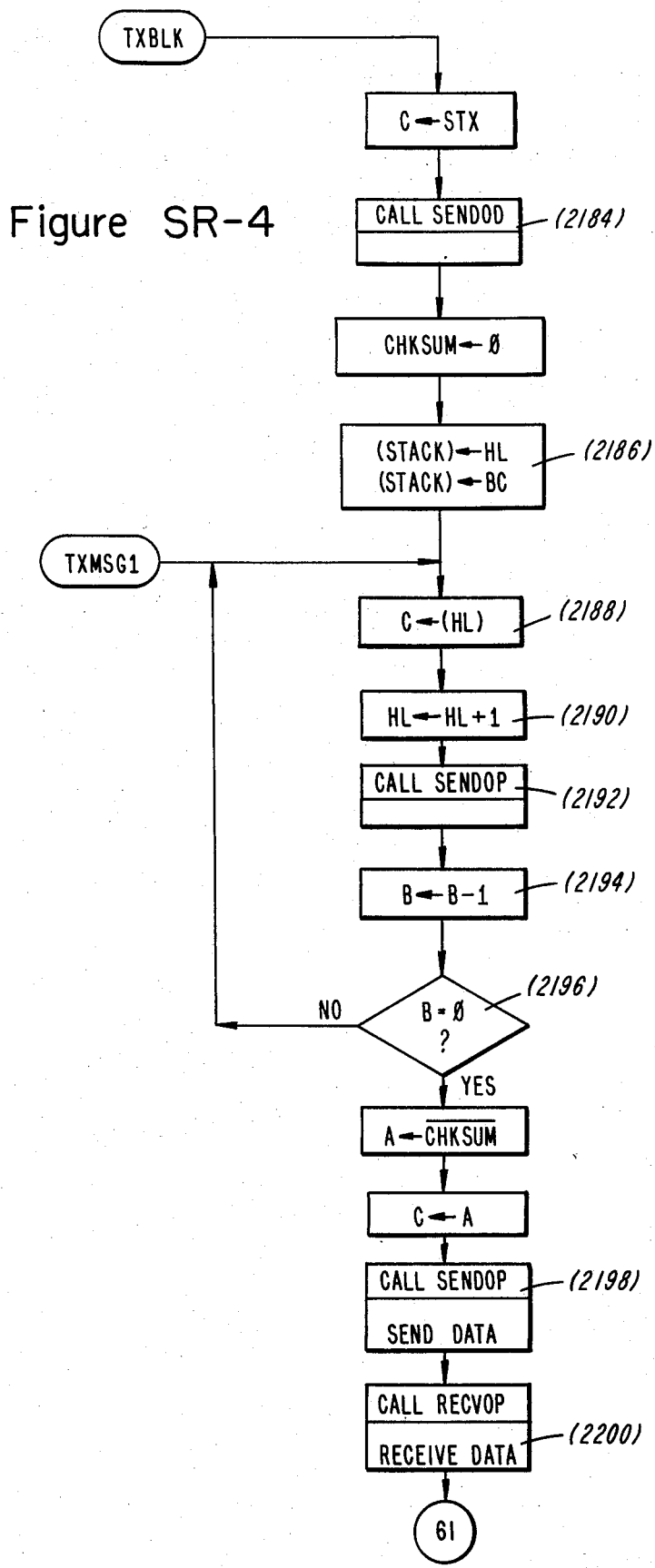
Figure SR-4

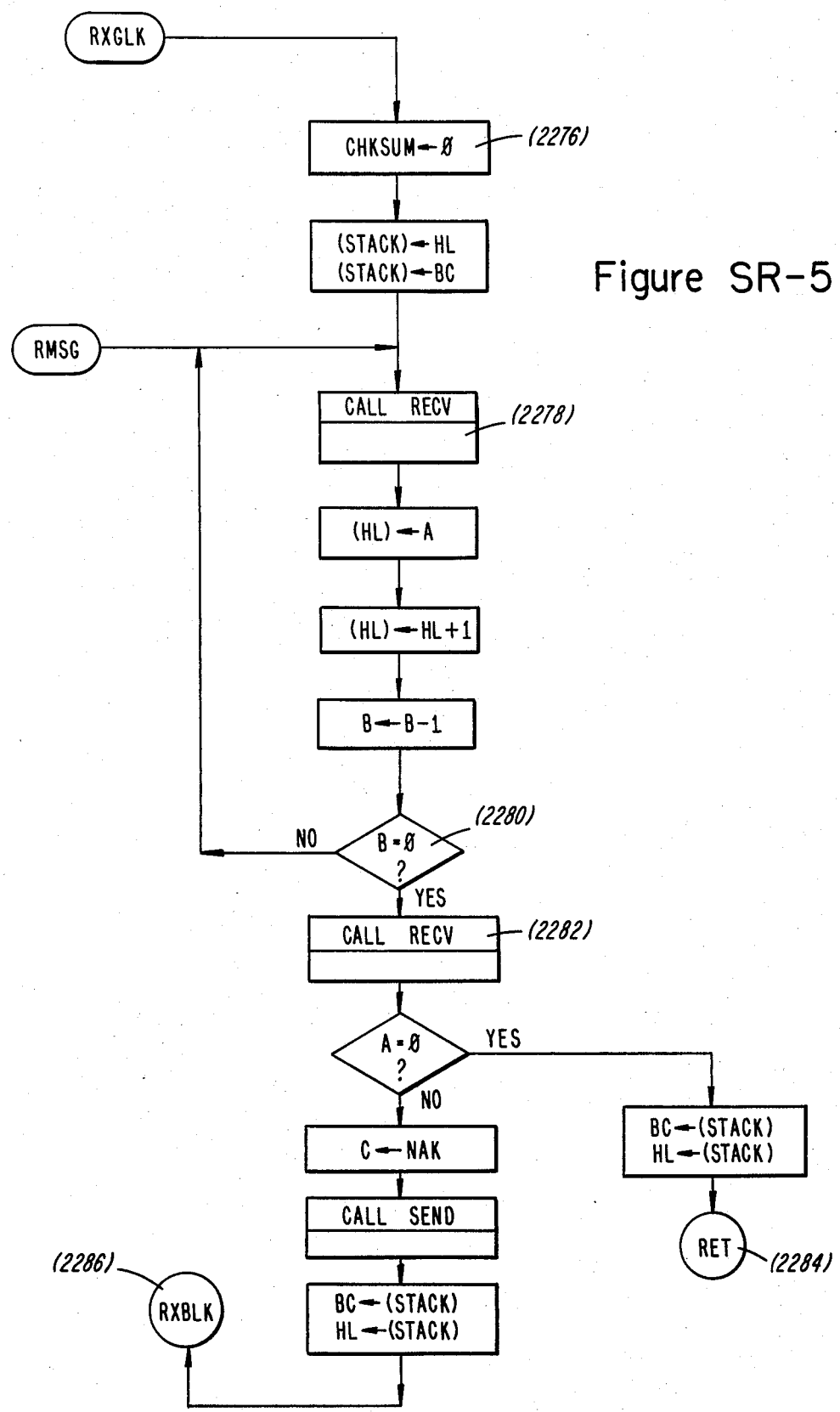
Figure SR-5

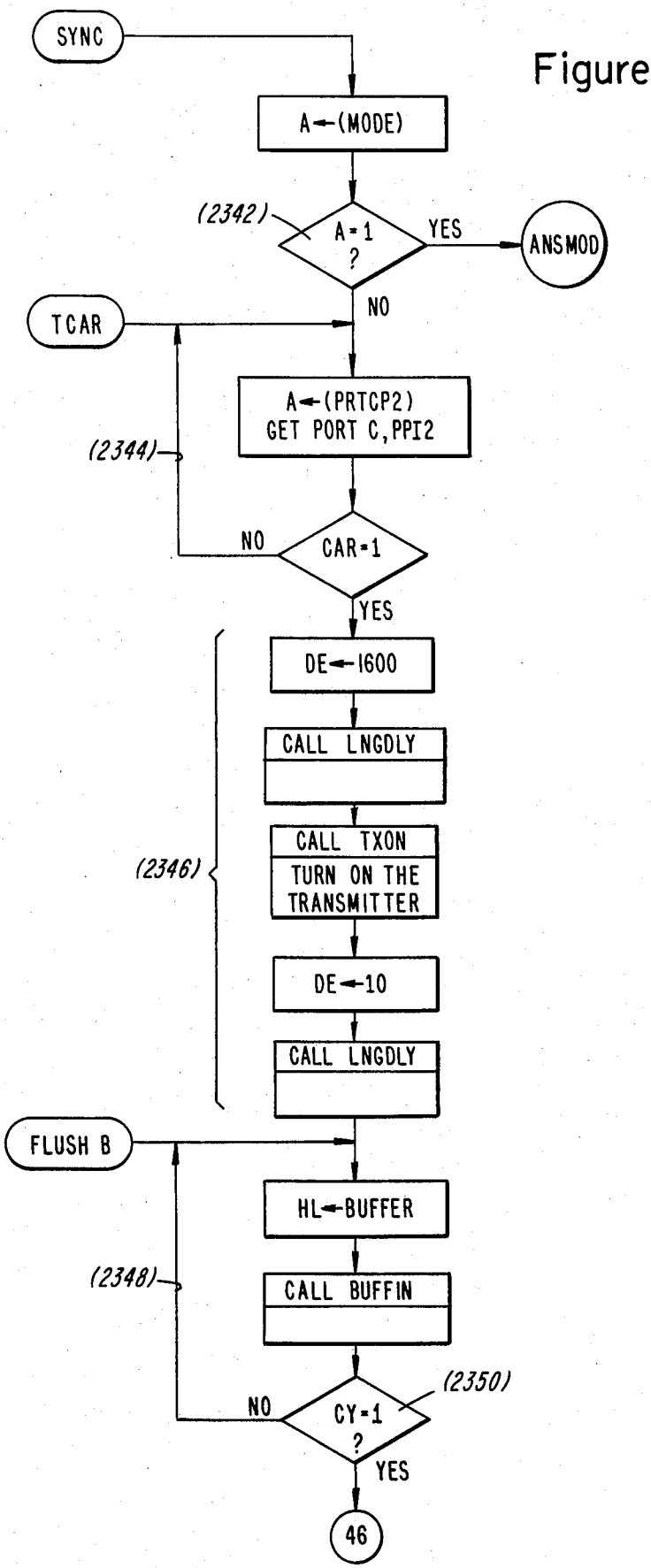
Figure SR-6

DATA LOGGING AND TRANSFER SYSTEM USING PORTABLE AND RESIDENT UNITS

CROSS-REFERENCE TO RELATED APPLICATIONS

This invention is related to the subject matter of U.S. Pat. Nos. 4,305,059; 4,341,951 and 4,454,414, all assigned to the assignee of this invention.

TECHNICAL FIELD

The present invention relates generally to electronic data transfer, and more particularly, toward a data transfer system applicable in funds transfer and numerous other environments, comprising a number of portable modules operative selectively in user identification and data accumulation modes. The portable modules communicate with each other directly or communicate with each other by telephone via microprocessor controlled resident units located at points of transaction.

BACKGROUND ART

Spurred by the pressures of paper-based checking which is costly and time consuming for financial institutions and further in light of the inconvenience of maintaining accurate accounting in cash transactions, institutions have sought out and experimented with various electronic means of extending and speeding up account accessibility. To this end and to improve record keeping as well as to reduce flow of actual cash, computer technology has been applied to develop electronic funds transfer, which is essentially a process of value exchange achieved through electronic devices. Examples of electronic funds transfer equipment that have become used on a substantial basis in recent years are the Automated Clearning House (ACH), the Automated Teller Machine (ATM) and the point of sale system (POS).

To eliminate the presence of a central computer in every transaction, there has been a trend toward off-line electronic funds transfer, that is, transfer of data between portable and resident units, with only periodic downloading of data to the central computer. In Mareno U.S. Pat. No. 4,007,355, for example, cashless transactions are made between credit cards through a special interface located at each vendor station. Stuckert U.S. Pat. No. 4,277,837 is directed toward a cashless, off-line transaction system involving portable units that are carried by customers and adapted for use with data storage and transfer cards.

The Moreno and Stuckert systems have particular problems that have limited their widespread use in off-line electronic funds transfer. In Marino, no exchange of funds may be made arbitrarily because the cards carried by each user, although having funds data storage capability, have no keyboards and require a special interface apparatus to be present at each transaction. In Stuckert, cards used with the portable terminals have no display; a separate portable terminal must be involved during each transaction. The user cannot continuously monitor his account, limiting the versatility of the system.

These problems and others were solved by Benton in U.S. Pat. No. 4,305,059 issued on Dec. 8, 1981, disclosing a modular funds transfer system wherein each user as well as vendor carries an identical portable module having a keyboard and a display. Funds are transferred between modules using a hard wire interface, and the account status stored in each module is updated following each transaction. In another patent to Benton Pat. No. 4,341,951, printed vouchers are issued by the portable module following each transaction.

The Benton approach was further refined in U.S. Pat. No. 4,454,414 to provide bidirectional optical coupling between portable funds data transfer modules, including a "hand-shaking" protocol that enables funds transfer to be completed only if a number of criteria are satisfied. These criteria include an identification check following keyboard entry by the user of a secret number and examination of the transaction amount to ensure that it falls within credit limits.

The principles developed by Benton have in the past been limited primarily to electronic funds transfer. There now exists a need, however, to build on these principles to develop a system which, in addition to providing authorization to complete a funds transfer, maintains transaction records as a function of time as well as of amount and type of each transaction. There is likewise a need to further extend and build upon these principles to apply off-line data transfer to applications other than funds transfer, such as monitoring and recording as a function of time: radiation dosage, access within a secured area, physiological data and work-time records. There is further a need to enable direct transfer of data between users off-line directly or between users over the telephone lines or transfer of data on-line between each user and a central computer.

DISCLOSURE OF INVENTION

One object of the invention is to provide a new and improved user identification and account verification system.

Another object is to provide a new and improved, modular, user identifcation and account verification system.

Another object of the invention is to provide an off-line data transfer system that is operative selectively in user identification and data accumulation modes.

Another object is to provide an off-line data transfer system using portable modules that accumulate and communicate data as well as resident units which receive data from the portable modules for on-line communication to a central computer.

Another object is to provide an off-line, modular, funds transfer system which is periodically placed on line for data verification from a central computer and is automatically disabled by the computer in response to a bad account or other factor such as a stolen module.

Another object is to provide off-line data accumulation in applications such as work-time record keeping, physiological data monitoring and radiation dosage monitoring using portable modules that are adapted to accumulate off-line data to be unloaded on-line to a central computer.

Another object is to provide a new and improved user identification and account verification system using optical coupling to transfer information off-line directly between portable modules, off-line between portable modules via resident modules and on-line between portable modules and a central computer via resident modules.

Another object is to provide account verification using portable modules operable selectively in debit and credit modes.

Another object is to provide, in an off-line user identification and account verification system using portable and resident modules, a hard copy printout of account summary and other data depending upon particular applications.

To satisfy these and other objectives, an identification and data logging system in accordance with the invention comprises portable modules each having a keyboard and a display as well as microprocessor circuitry for storing and processing data. Data are coupled between modules via an optical transceiver mounted on each module and each module is operable selectively in a user identification mode and a data accumulation mode. In the user identification mode, the user keyboard enters a secret, personal identification number into the module. The keyboard entered number is compared with data prestored in a memory circuit to generate an authorization signal in response to a positive comparison. The authorization signal may, if desired, control a printer or display to identify the user, e.g., by supplying his or her name, address, account number, etc. In the data accumulation mode, data keyboard entered by the user or received via the optical transceiver are stored as corresponding values of first and second parameters. In preferred embodiments, one of the parameters is time; the other may be funds transfer data, physiological data, presence within a secured area or radiation data depending on particular applications. In the funds transfer, the modules are programmed to operate in a debit mode or a credit mode, selected using an external mode switch on the portable module.

The system includes resident units that interface between the portable modules and a central computer. In a preferred embodiment, the resident unit contains a modem for coupling data between the portable modules and telephone lines. Of particular importance, the portable modules may transfer data between each other via the telephone lines through a resident unit at each location. The resident unit also includes an optical interface and a provide a hard copy printout of the accumulated data.

Still other objects and advantages of the present invention will become readily apparent to those skilled in the art from the following detailed description, wherein we have shown and described only the preferred embodiments of the invention, simply by way of illustration of the best mode contemplated by us of carrying out our invention. Accordingly, the drawings and description are to be regarded as illustrative in nature, and not as restrictive.

BRIEF DESCRIPTION OF THE DRAWINGS

FIGS. 6-21SR to 6-25SR are flow diagrams describing subroutines controlling the portable module;

FIGS. 7-1 to 7-41 are a flow chart describing the programming for controlling the resident unit;

Figures 1, 6:
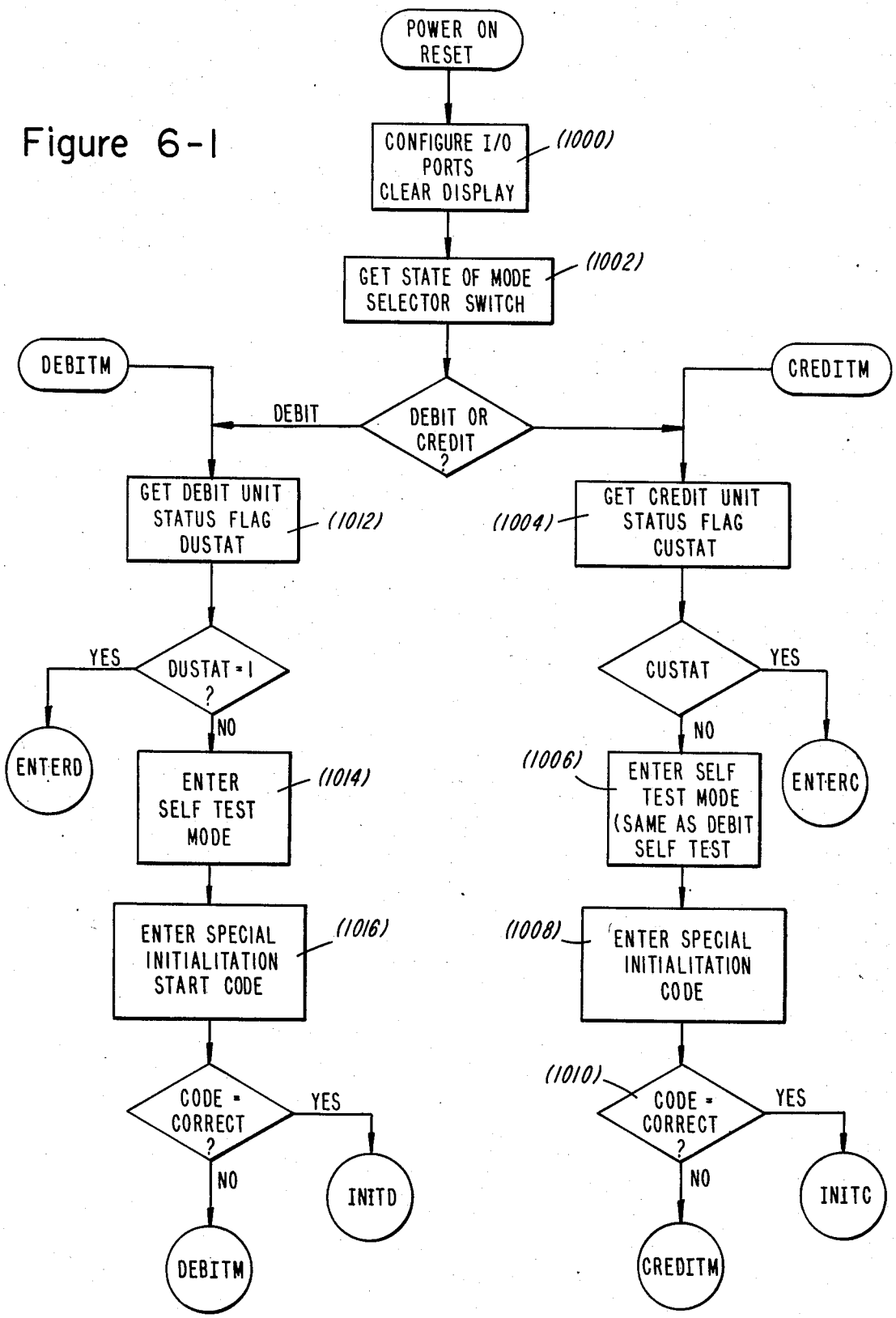
FIGS. 6-1 to 6-21 are a flow chart of the programming of the portable module.
Figures 2, 6:
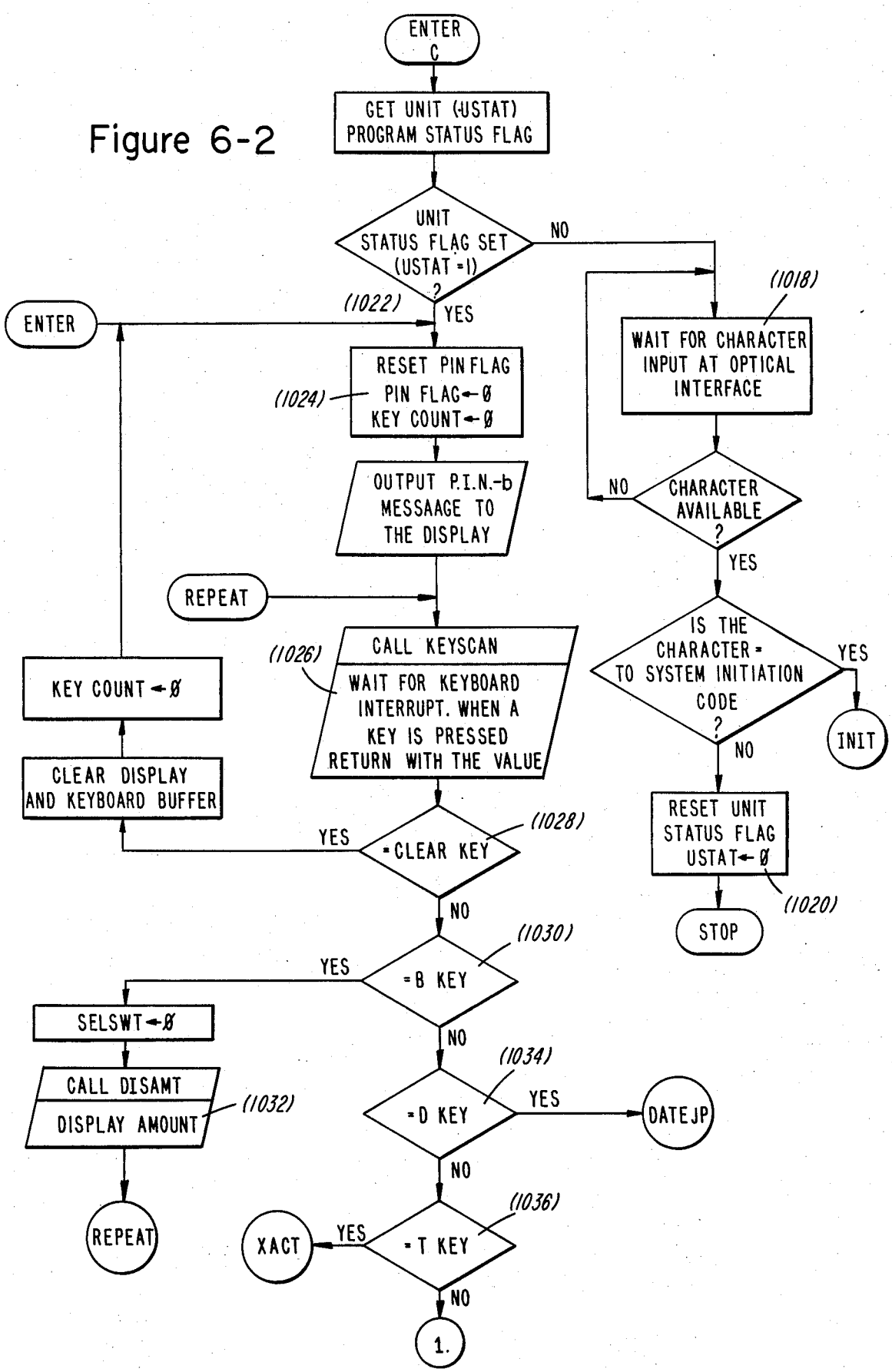
Figures 3, 6:
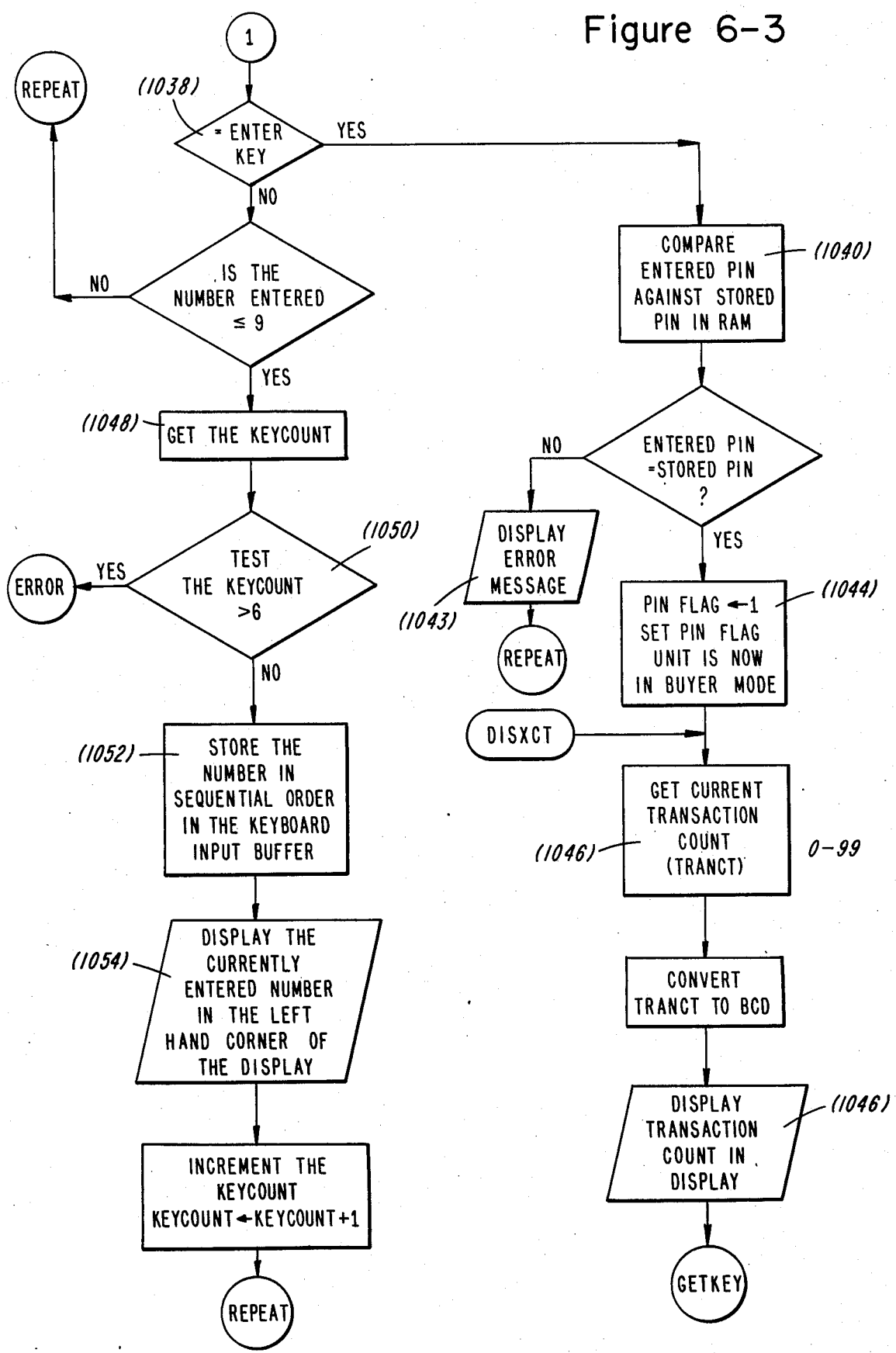
Figures 4, 6:
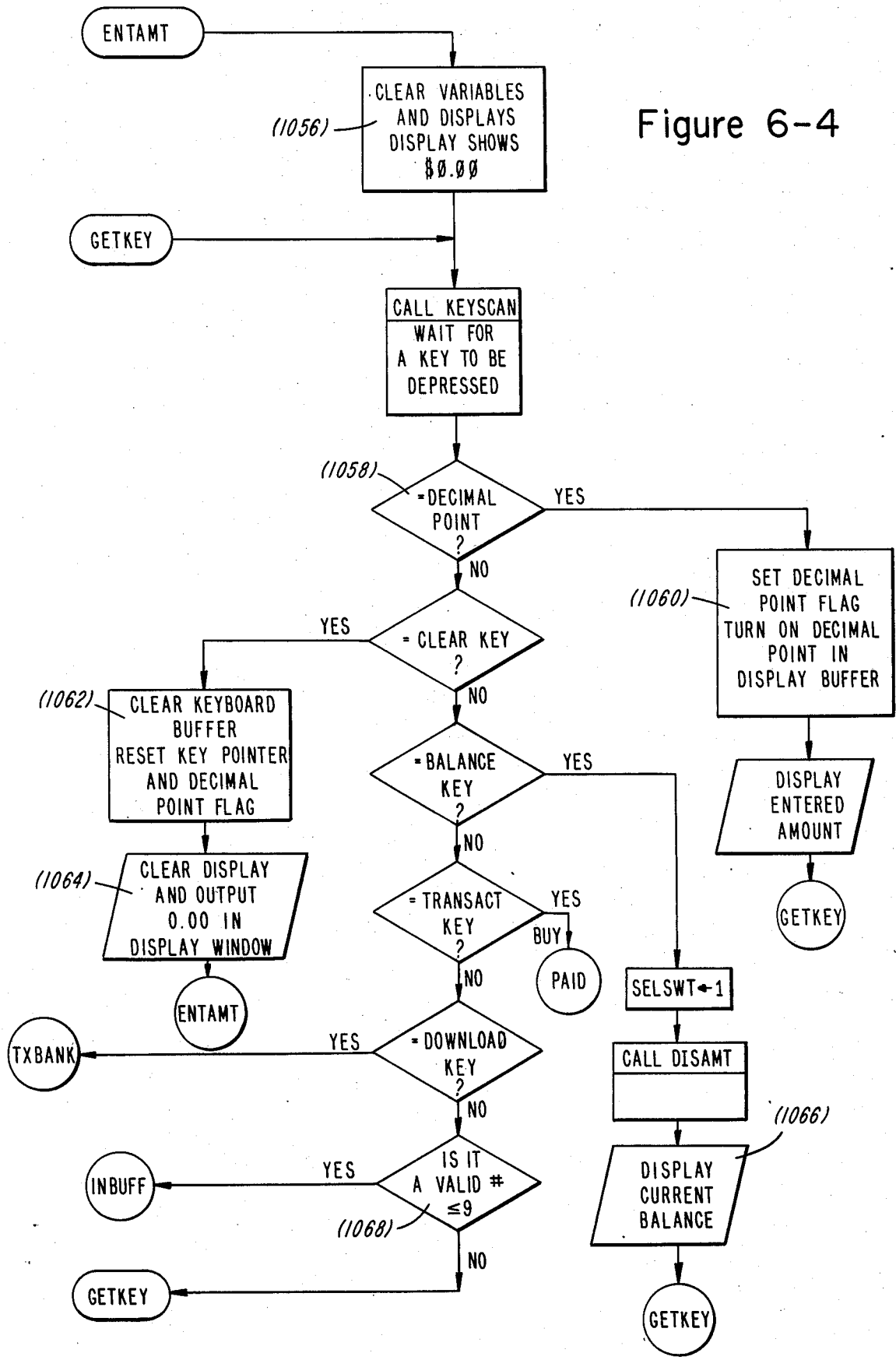
Figures 5, 6:
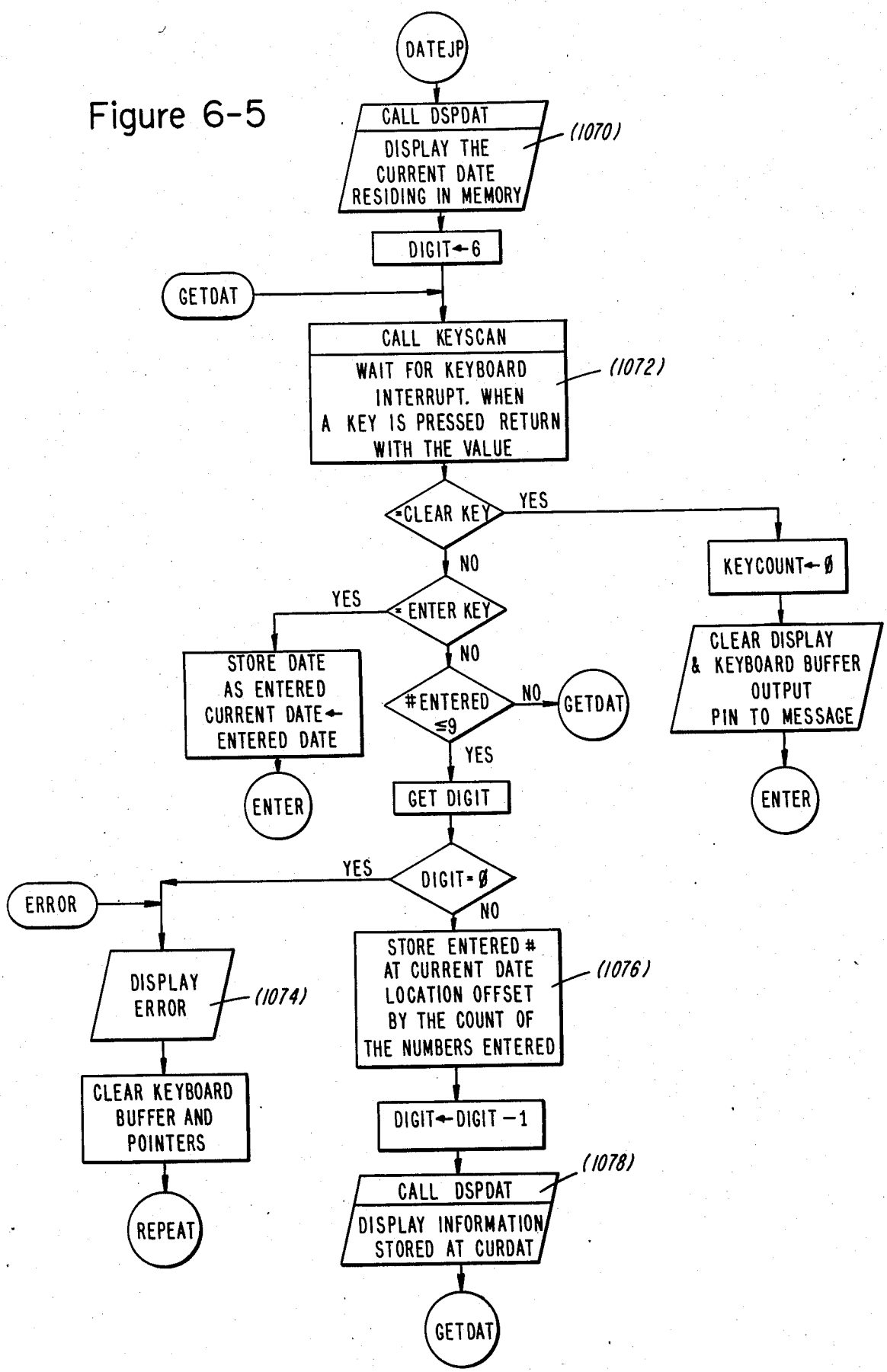
Figure 6:
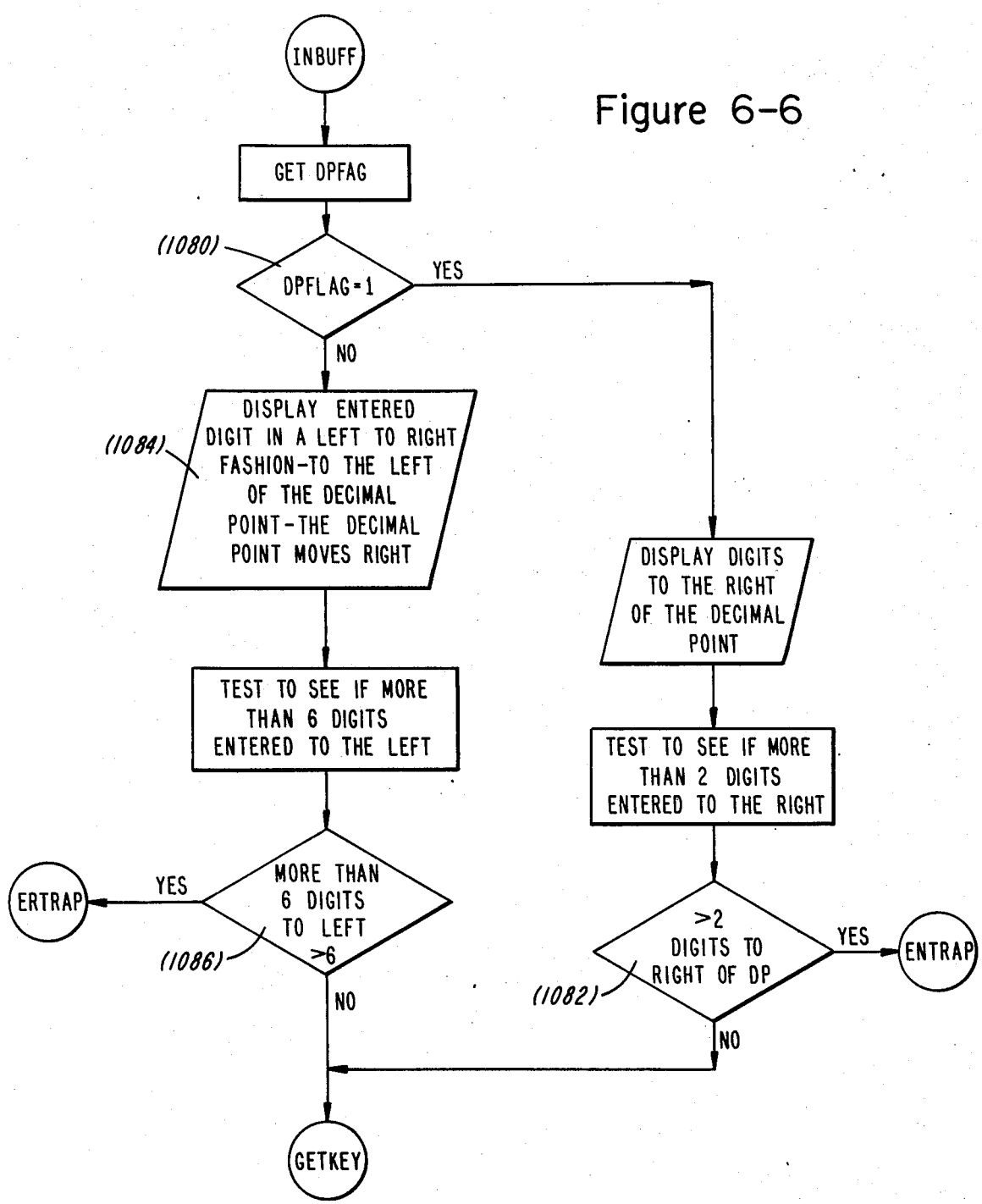
Figures 6, 7:
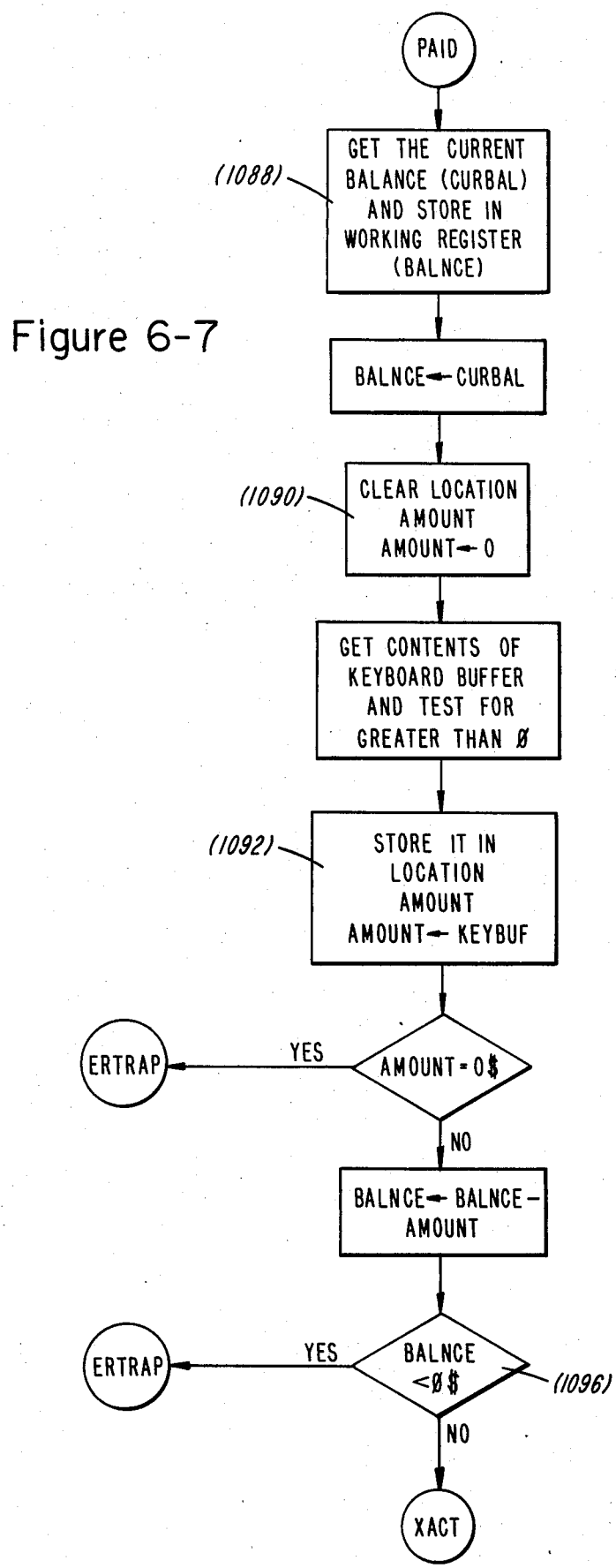
Figures 6, 7, 8:
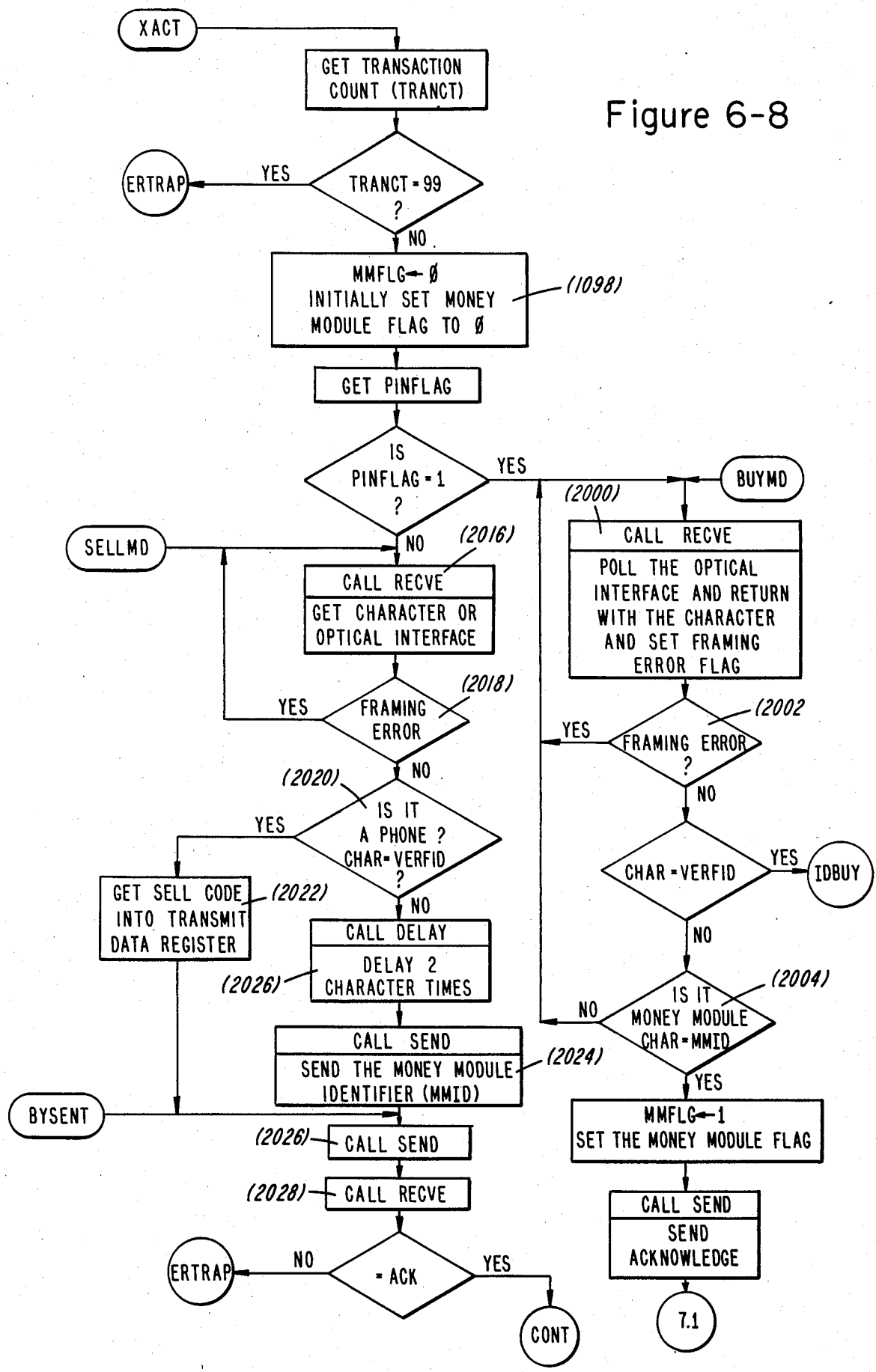
Figures 6, 7, 8, 8A:
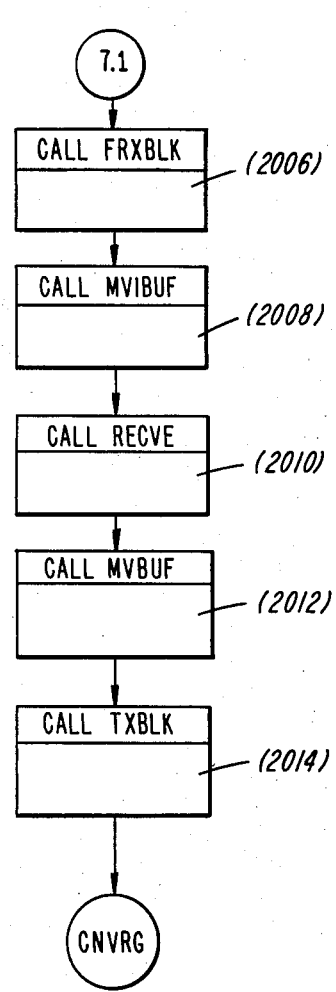
Figures 6, 7, 8, 9:
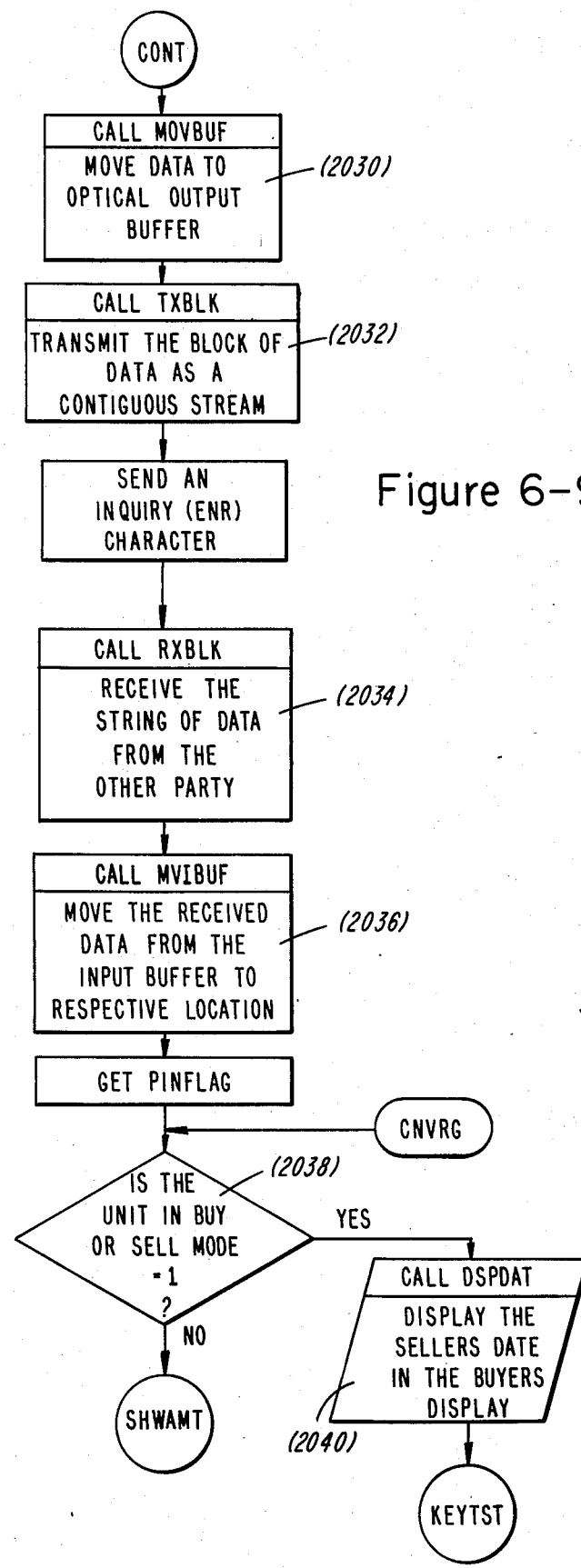

FIGS. SR-1 to SR-6 are flow charts of subroutines controlling the resident unit;

FIG. 8 is a pair of waveforms illustrating optical communication routines between a portable module and resident unit;

FIG. 9 is a pair of waveforms illustrating optical communication routines for interaction between a pair of portable modules.

BEST MODE FOR PRACTICING THE INVENTION

As an overview, the present invention involves a system of battery-powered, portable modules that contain microprocessor based electronic circuity to enable users to store data, retrieve data and transfer data among the modules. Data are transferred between pairs of portable modules through optical interfaces of the type disclosed in U.S. Pat. No. 4,454,414 incorporated herein by reference in its entirety. Each portable module further includes a keyboard for manually entering data and a display for providing a visual output of data being manipulated.

To transfer data between the portable modules, the modules are placed in optical alignment with each other, guided by an alignment recess and tab on each module. In a typical application, the data transfer between modules is in a financial environment, that is, a financial transaction takes place between the modules, with one module being a "buyer" and the other module being a "seller". Other types of data may, of course, be accumulated within each module and transferred between modules.

Data may be transferred between modules that are remote from each other through resident units positioned at points of transactions. The resident units have receptacles into which the portable modules are seated. Data are transferred between the resident unit and its associated portable module through an optical coupler. The resident unit couples the data from the portable module over the telephone lines to another resident unit and portable module, or possibly to a remote computer. This is an important aspect of the present invention which enables communications to be established among portable modules virtually anywhere in the world. In the case of financial transactions, for example, the portable modules enable purchases and other transactions to be made at points of sale or elsewhere, and permits direct communications to also be established between the portable module and bank or financial institution providing credit to participants.

Figure 1B:
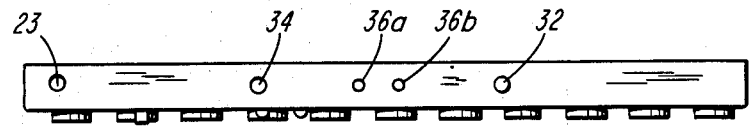
FIG. 1(b) is an end view of the module, disclosing the optical interface and external data input port.
Figure 1A:
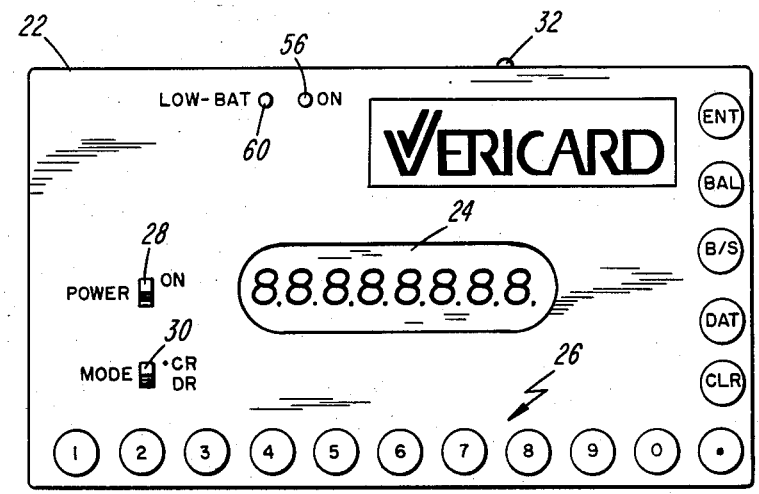
FIG. 1(a) is a top view of a portable module, in accordance with the invention.

FIG. 1(a) and 1(b) illustrate a portable, battery powered module 20 in accordance with the invention that is programmed to accumulate data that are keyboard entered or optically coupled into the module, and to transfer the data to similar modules directly or via resident units that interface with commercial telephone lines. Each module 20 comprises an impact-resistant, plastic housing 22 carrying a display 24, which may be a liquid crystal display, lightemitting diode display or other display, and a keyboard 26. Keyboard 26 is in a partially circumferential array of pushbutton keys, but other arrays, such as a standard rectangular matrix, could be used. Battery power is applied to the module through a manual switch 28 mounted on the housing 22. A mode switch 30 is manually controlled by the user to operate the module in a credit mode or a debit mode.

The credit mode and debit mode have significance in financial applications of the module. In the credit mode, the module 20 is used in a manner analogous to a credit card, manipulating account credits maintained by a bank or other financial institution. In the debit mode, the module 20 is used in a manner similar to a checking account, wherein transactions are debited against an existing account maintained at the institution by the module user.

Figure 2:
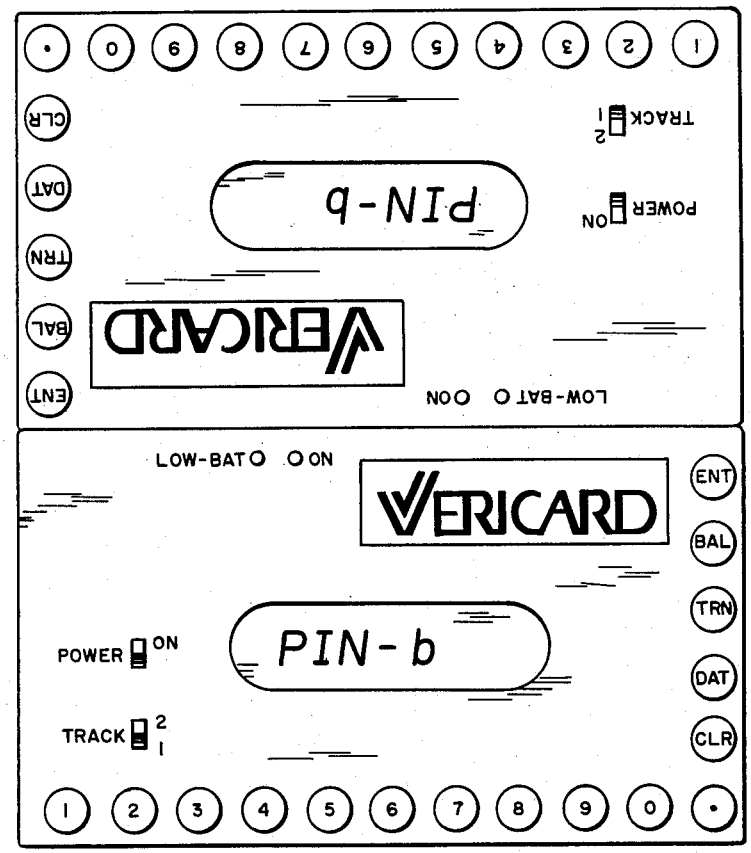
FIG. 2 is a top view of a pair of portable modules positioned in alignment for optically transferring electronic funds data between the two modules.

At one side of the module 20 is provided an alignment index tab 32 (see FIG. 1(b) and a corresponding alighment recess 34. Optical interface 36, positioned between the tab 32 and recess 34, comprises an optical transmitter-receiver pair 36a, 36b that is maintained in alignment with a corresponding optical pair on another module for data transfer when the two modules are mated, as shown in FIG. 2. A portable module 20 is shown seated within a resident unit 62, in FIG. 3. Unit 62 includes a seat 64 into which the module 20 is positioned for communication of the telephone lines, through an optical coupler 66 located in registration with transceiver 36 on the module. The unit 62 further includes a standard telephone handset 68 and touch tone dialer 70 as well as a number of function keys 72 and status display lamps 74. The resident unit 62 shall be discussed in more detail in a following section.

In the following discussion, it is assumed that two modules are aligned with each other, as shown in FIG. 2, to transfer data between them via an optical coupling. One of the modules, termed the "seller unit" receives "funds" in exchange for goods or services or for some other reason; the other module, termed the "buyer" module, transfers the funds to the seller module.

The buyer and seller initiate their respective modules by operating the power switch 28 to apply battery power to the control and display circuitry contained in each module. To maintain data stored in memory, the module contains a separate battery that is always connected to the memory circuitry, although the additional battery is unnecessary if non-volatile memory is used. Following power-on of the modules, the prompt "PIN-b" is displayed by the buyer module, as shown in the columns below. Throughout the text, the left hand column represents the buyer module display and the right hand column represents the seller module display.

| PIN-b | — |
|---|---|

The buyer now enters his personal identification number (PIN) in a user identification mode of operation. If an incorrect sequence is entered by the buyer, he resets the display by operating the clear key C (see FIG. 1a). Assuming that the correct sequence is believed entered, the buyer operates the "enter" key E. The buyer module performs a comparison of the keyboard entered PIN with a corresponding PIN stored in memory in the module. If the keyboard entered PIN is incorrect for the particular module, the message "ERROR" is displayed in the buyer module. If, on the other hand, the comparison is positive, however, indicating that the buyer is authorized to use the module, the buyer's module displays the current transaction count, e.g.,

| −10 | — |
|---|---|

The above display indicates that 10 transactions have been completed since the buyer module was last reset by the bank or other institution sponsoring the module. This number, besides providing sequential identification of transaction, similar to identifiers in a checkbook, may be arbitrarily limited to constrain the buyer from failure to unload the transaction data to the sponsoring institution, as discussed herein.

The buyer views his current balance by depressing the balance key (BAL) and this should preferably be done prior to each transaction. Exemplary displays, wherein a $5,000 balance remains in the buyer module are as follows:

| 5000.00 | — |
|---|---|

The buyer now enters the amount of the transaction by depressing the clear key (CLR) to reset the display and operating the appropriate number keys. If a $100 purchase is to be made, for example, the buyer and seller displays are as follows:

| 100.00 | — |
|---|---|

Communications must now be initiated between the buyer and seller modules. This process shall be described in detail later. Basically, however, the buyer and seller modules first determine that communication is between two modules rather than between a module and a resident unit or other terminal. To confirm the transaction, the buyer and seller now operate their respective transaction keys (TRN). The buyer module displays the transaction date, e.g., 12-01-82 and the seller module displays the transaction amount, in this case, $100. The displays are as follows

| 12-01-82 | 100.00 |
|---|---|

The buyer may now operate the balance (BAL) key to review the account number of the seller before confirming the transaction, e.g.,

| 123456 | 100.00 |
|---|---| assuming that the seller's account number is 123456. Similarly, the seller may review the buyer's account number by operating the balance key (BAL) on the seller module. Either party may cancel the transaction by operating the clear (CLR) key.

The transaction is completed only after both the buyer and seller have operated their respective (ENT) keys.

To confirm that the transaction has been completed, the prompt PAID appears in the displays of both modules. The account number of the seller, transaction date and transaction amount are stored in the transaction memory of the buyer module. The account number of the buyer, transaction date and transaction amount are stored in the memory of the seller module.

The buyer may now review his new balance by pressing the balance (BAL) key, e.g.,

| 4900.00 | — |
| --- | --- | reflecting the $100 purchase against the $5,000 account.

The seller may review his balance by operating the balance key (BAL) when the PIN has been entered. The correct PIN sequence is the distinguishing branch between buyer and seller on identical modules. In the present example, the seller module display would indicate 100.95, assuming that the account balance was at zero prior to the transaction.

Portable Module Block Diagram

Figure 3:
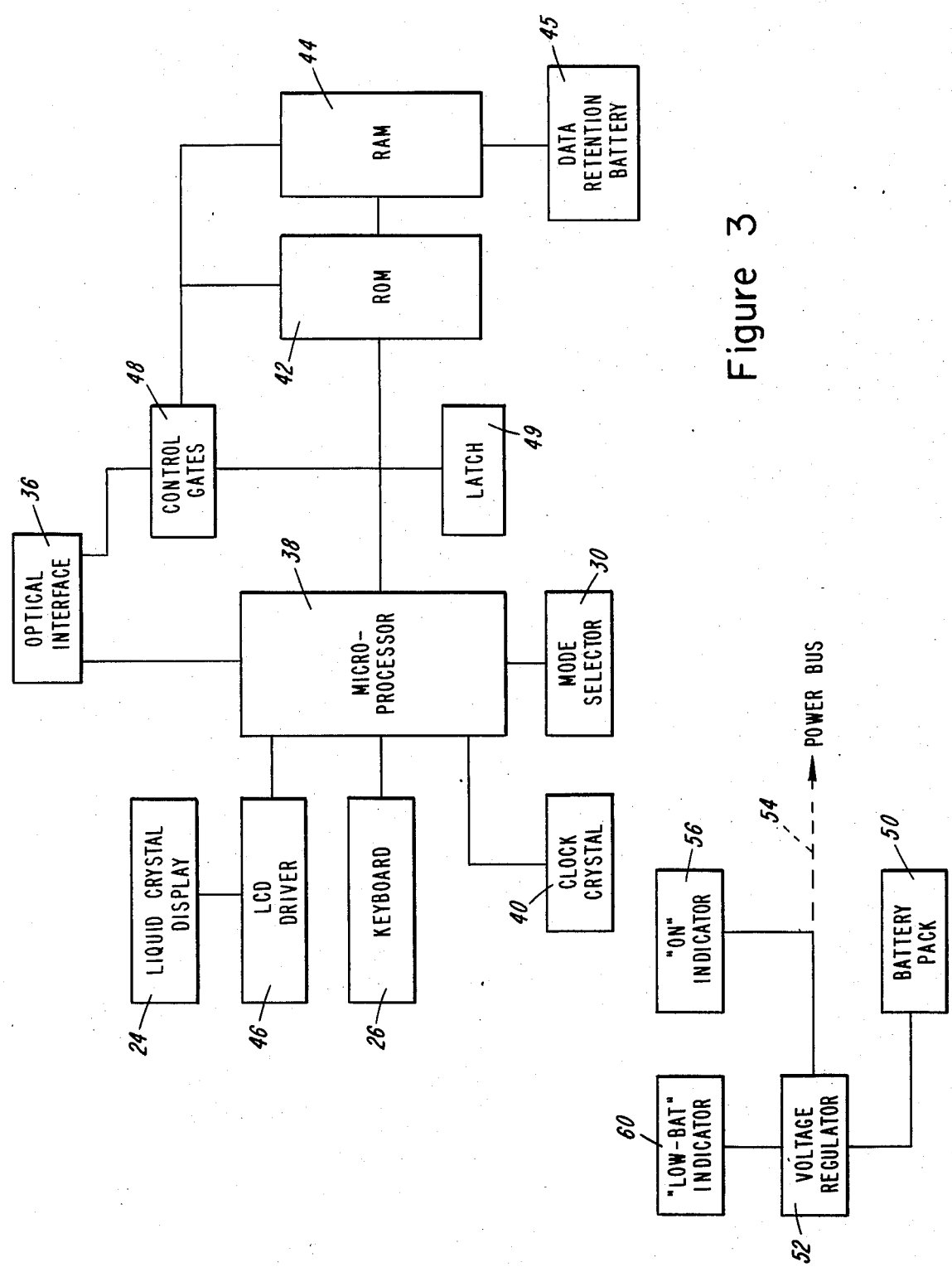
FIG. 3 is a block diagram of electronic circuitry within the module.

With reference to FIG. 3, the portable module 20 is controlled by a microprocessor 38, which may be a MC146805 microprocessor manufactured by Motorola or any other suitable microprocessor, programmed by firmware within read only memory (ROM) 42. The program stored in ROM42 includes operating system firmware to control the operation of the microprocessor 38 in the manner set forth in detail in the flow chart of FIG. 6 as well as certain data supplied to the module during manufacture, such as the module identification number and user personal identification number. Random access memory (RAM) 44 is a working memory which receives data for temporary storage. In an example wherein the module 20 is used a funds transfer application, the data stored in RAM 44 include the type of each transaction, that is, BUY or SELL, the amount of the transaction and the transaction count, i.e., the number of transactions that have been completed since the module was last reset by the bank or other sponsoring institution. These data are retained in RAM 44 for occassional downloading to a central computer through resident unit 62 or to a localprinter to formulate a printed record.

Interfaced with microprocessor 38 are display 24, display driver 46 and keyboard 26. Also interfaced with microprocessor 38 is optical transducer 36 constituted by infrared diode 36a for transmitting data and phototransistor 36b shown in FIG. 1(b) for receiving data. The operation of optical interface or transducer 36 is controlled by gates 48 that in turn are responsive to programming in ROM 42 and data in RAM 44. The gates 48 are interfaced with latch 49 to temporarily store data transmitted to or received by the optical interface 36.

The module 20 is powered by a replaceable battery in battery pack 50. Voltage from the battery and battery pack 50 is regulated by a voltage regulator 52 and applied on a power bus 54 that powers microprocessor 38 and ROM 42 as well as other circuitry. An "on" indicator 56, exposed to the housing 22 of module 20, indicates that battery power is turned on via switch 28. Similarly, a low battery indicator 60, responsive to the output of voltage regulator 52, signals a low battery voltage to instruct the user to change batteries.

RAM 44 is a volatile memory. As such, it must be energized at all times to retain its stored data, even when the battery in pack 50 is removed. Accordingly, a data retention battery 45, installed at the factory, supplies voltage to the RAM 44. Battery 45 is a compact, long lasting battery that is never removed by the user but is occassionally replaced by the authorizing institution.

Clock crystal 40 establishes a time base for microprocessor 38 in a conventional manner. Mode selector switch 30 operates microprocessor 38 in either a credit mode or a debit mode, as explained earlier.

Module Programming Flow Chart

Referring to FIG. 6-1, following turn-on of the module, the input-output ports of the microprocessor 38 are configured and the display 24 is cleared (1000). The state of the mode selector switch 30 is tested to determine whether the module 20 is operating in a credit mode or in a debit mode (1002). If the switch 30 is in a credit mode, the program branches to step(1004) to determine whether the circuitry is initialized for the credit mode, by testing the credit unit status flag CUSTAT. If the flag is set, the credit mode is entered at FIG. 6-2. If the credit unit status flag is not set, the self test mode is entered, wherein the display, memory, optical interface and keyboard are tested (1006). A special initialization code is now entered, to enable to module to receive data from the sponsoring institution, when the module is first issued. A test is made to determine whether the initialization code is the correct code for the credit mode (1010). If the initialization code is incorrect, control of the program returns to CREDITM causing the program to "wait" for the correct code. If the code is correct, the credit mode is initialized with data input by the sponsoring institution via the optical interface 36. These data supplied to the module by the institution include the credit card number, the credit balance, the credit personal identification number (PIN) and other user identification information, such as name, address, social security number, city, state, zip and telephone number.

If the switch 30 is in the debit mode, the program branches to step 1012 at DEBITM. In this branch, a debit unit status flag DUSTAT is tested to determine whether the flag is set, indicating that the device has been debit mode initialized. If the flag is reset, the self test mode (1014) is executed to exercise certain hardware tests, such as an LCD display test, key pad test, optical interface test and a memory test (1014). A special initialization start code (1016), corresponding to the credit mode code in step (1008)is entered and tested. If the entered code is incorrect, control of the program returns to DEBITM, to "wait" for the correct code. If the code is correct, the debit initialization routine INITD is executed to enable the module to receive, through the optical interface 26, debit account number, debit PIN, debit balance, and other user information.

Referring to FIG. 6-2, the credit mode programming is shown. In general, the programming for the debit mode is similar to that for the credit mode, except that debit mode account number is different from the credit mode account number, although the personal identification numbers for each mode may be the same. The transaction memory is different for the two modes, that is, the debit transactions and credit transactions are recorded in separate areas of RAM 44. For simplicity, therefore, only the credit mode programming is shown.

The unit program status flag is obtained and tested to determine whether the module has been previously loaded with data. If USTAT is not set, indicating that the module has not been initialized, the optical interface 36 is monitored to identify receipt of an optical character (1018). If the received character corresponds to the system initiation code (credit mode, this example), the program branches to initiation sequence INIT, in FIG. 6-16; otherwise, reset the unit status flag USTAT indicating that the module has been initialized, and stop (1020).

If the unit status flag is set, indicating that the module has been initialized (1022), the PINFLAG is reset and the keyboard buffer is cleared by resetting key count. The prompt "P.I.N.-b" is displayed in display 24 and a key scan subroutine is called (1026). The key scan subroutine, which is conventional, places the module in a low power state and waits indefinitely for a keyboard interrupt. When the key is depressed, the value of the translated character is returned.

Thus, if the clear is operated (1028), the display and keyboard buffer are cleared, and the key count is reset. If the balance key B (1030) is operated, the amount of the most previous transaction is displayed; the previous transaction information is unloaded to the resident unit into which the module is seated, for display on a printer (1032).

Figure 5:
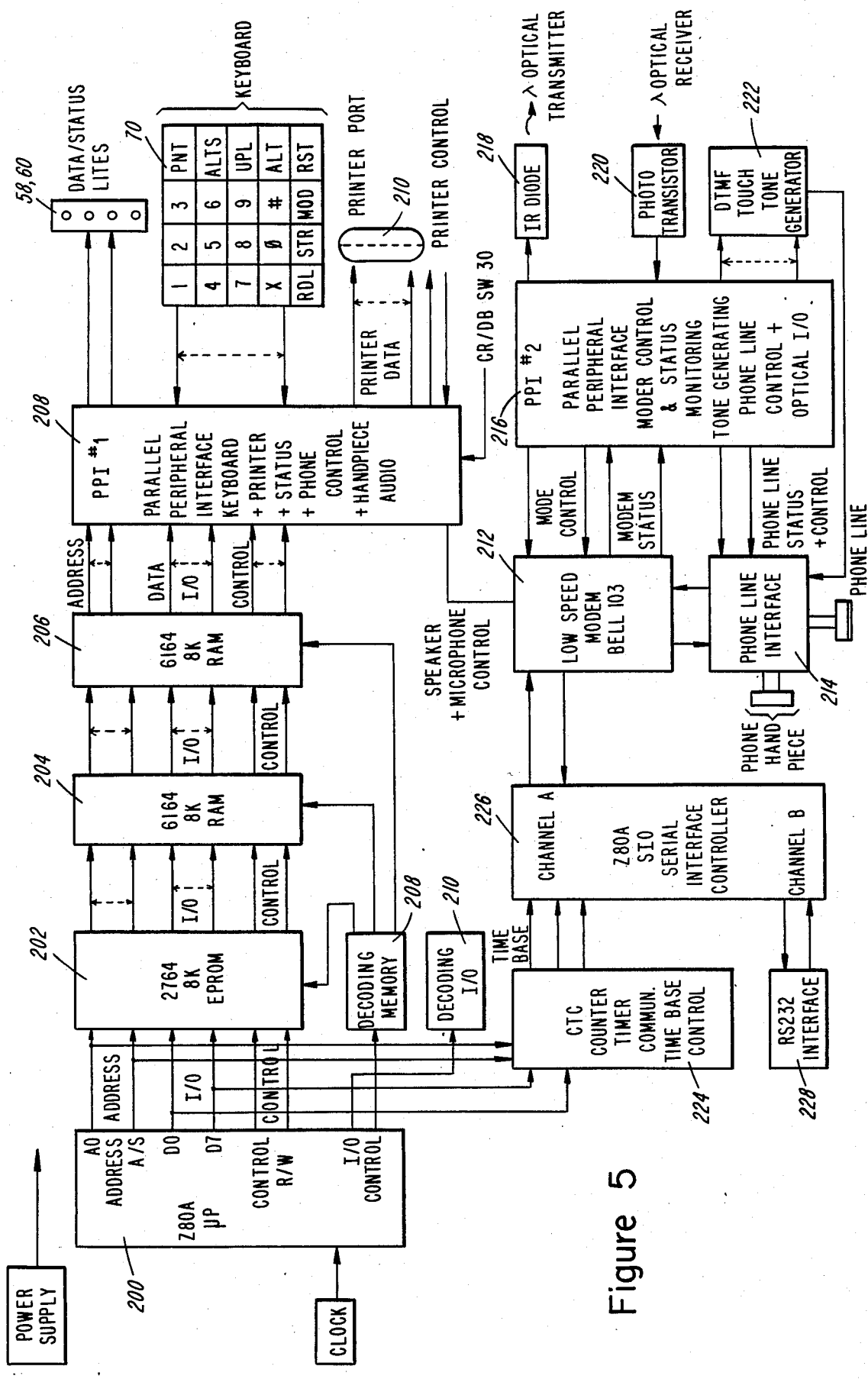
FIG. 5 is a block diagram of electronic circuitry within the resident unit of FIG. 4.

Operation of the D key (1034) causes the program to jump to routine DATEJP, in FIG. 6-5, to receive entry of the current date.

The transaction key T (1036) causes the program to jump to the XACT routine in FIG. 6-8, assuming that the module is in the SELLER mode.

Referring to FIG. 6-3, if the entered key E is operated (1038), the contents of the keyboard buffer are tested to determine whether they match the PIN value stored in RAM 44 (1040). If the keyboard entered PIN is different from the stored PIN, an error message is displayed (1042) and the user is enabled to try again, bearing in mind that the enter key is operated only after the user keyboard enters a PIN. If there is correspondence between the keyboard entered PIN and the stored PIN, the PIN FLAG is set, identifying the module as being in the "BUY" mode (1044). The current transaction count TRANCT is obtained (1046) and converted to BCD for display (1046). The current transaction count ranges in value from 0 to 99, and represents the number of transactions that have been completed since the module was initialized by the sponsoring institution. The program now jumps to GETKEY in FIG. 6-4.

The number of number keys that are operated in succession prior to operation of a function key is monitored and stored in KEYCOUNT if more than six numbers have been entered, an error message is displayed (1050). Otherwise, the numbers are stored in sequential order in the keyboard input buffer (1052) and the numbers are displayed as they are entered (1054).

Figure 4:
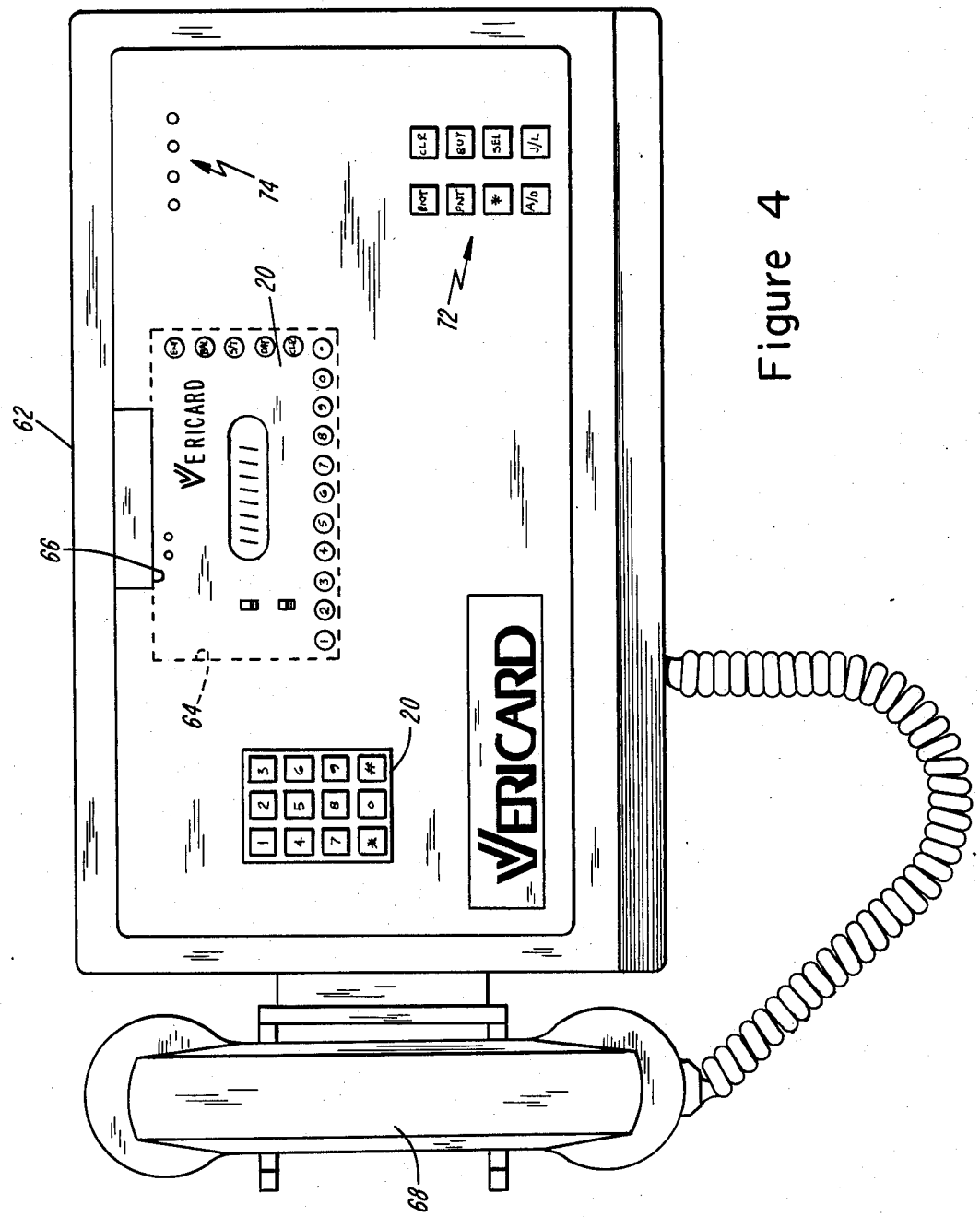
FIG. 4 is a top view of a resident unit into which is seated a portable module of the type shown in FIG. 1.

Referring to FIG. 6-4, routine EMTAMT (enter amount) causes the variables and display to clear, so that the display shows $0.00 (1056). The GETKEY routine calls the KEYSCAN subroutine and responds in accordance with the particular key depressed. If the decimal point is operated (1058), the decimal point flag is set to store the decimal point in the display buffer (1060), to be transferred to display 24.

If the clear key is operated, the keyboard buffer is cleared and the key pointer as well as decimal point flag are reset (1062). The display is cleared and the output 0.00 is applied to display 24 (1064). The program now branches back to ENTAMT.

If the balance key is operated, calling for display of the account balance the select switch variable SELSWT is set and the display amount subroutine DISAMT is called. This subroutine causes the current balance to be displayed if SELSWT is set and causes the amount of the current transaction to be displayed when SELSWT is reset (1066).

If the transact key T is operated, the program jumps to the PAID routine, in FIG. 6-7.

If the download key is depressed (the download key is the same as the date key), the data stored in RAM 44 is downloaded to the resident unit, using the routine TXBANK in FIG. 6-17.

A test is made to determine whether the keyboard entered data is a number less than or equal to 9 (1066). If the entered data is a number having a value less than or equal to 9, the program jumps to INBUFF (FIG. 6-6); otherwise, the program returns to GETKEY.

Referring to FIG. 6-5, the DATEJP routine is accessed in response to operation of the date key in FIG. 6-2. The subroutine DSPDAT (display date) writes the current date to the display 24 in the format DD-MM-YY (day, month, year) (1070). At the GETDAT routine, the subroutine KEY SCAN monitors operation of the keyboard (1072). Again, the clear key causes the KEY COUNT to reset, clears the display and keyboard buffer and displays the "P.I.N.-b" message. The enter key causes the date DIGIT (six digits together with hypens) as entered, to be stored. If the value of DIGIT, representing the date is zero, an ERROR message is displayed (1074). The entered number is stored at the current date location in memory, offset by the count of the numbers entered (1076). The value of DIGIT is decremented (shifted) and the information stored at CURDAT is displayed (1078). The program returns to GETDAT, for entry of the remaining date numbers.

In FIG. 6-6 (the INBUFF routine), each keyboard entered number is stored in the keyboard buffer by initially testing the decimal point flag to determine whether the flag is set (1080). If the DPFLAG is set, digits are displayed to the right of the decimal point, e.g., 1997.25. If more than two digits are entered to the right of the decimal point, the program jumps to ERTRAP to ignore entry of additional numbers (1082); otherwise, the next digit or command is accessed.

If the decimal flag DPFLG is reset, the entered digit is displayed to the left of the decimal point. As digits are entered, the decimal point shifts to the right (1084). If more than six digits are entered, the module ignores entry of additional digits (1086).

The PAID routine, shown in FIG. 6-7, is initiated by obtaining the current balance CURBAL and storing it in a working register (1088). The amount assigned to the working variable AMOUNT is reset (1090) and the keyboard buffer is tested to determine whether its content is greater than 0. The content of the keyboard buffer, which is the amount shown in the display, is stored in location AMOUNT (1092). If the value of AMOUNT is 0, an error message is displayed (ERTRAP); otherwise, the value of AMOUNT is subtracted from the current balance (1094). If the result is negative, the program stops at ERTRAP, since the user is not authorized to spend more money than is available in the account memory; otherwise, the transaction is processed (1096)in the routine XACT.

Transaction processing XACT in FIG. 6-8, is initiated by monitoring the transaction count TRANCT. If the transaction count is 99, the program stops at ERTRAP, since not more than 99 transactions are authorized between initialization of the module at the sponsoring institution. Other numbers of authorized transactions may, of course, be programmed. Assuming that fewer than 99 transactions have been completed, i.e., TRANCT is less than 99, a "money module" flag MMFLG is initially set to 0 (1098). The PINFLAG flag is tested to determine whether the portable module is in a BUY mode or in a SELL mode.

If the module is in a BUY mode (BUYMD), the optical interface 36 is polled (2000) by calling subroutine RECVE, to obtain the character incoming at the interface as well as to set a framing error flag. The program loops to ignore the character if the character incoming from the remote module is a framing error; otherwise, a determination is made whether the incoming character has been transmitted by another module or by a resident unit (2002). If the incoming character is determined to not have originated from a resident unit, the incoming character is presumed to have originated from a module operating in the BUY mode. To understand how this determination is made, FIG. 8 illustrates optical communication between a module and a resident unit; FIG. 9 illustrates optical communication between a pair of modules. In FIG. 8, the upper waveform represents the data transmitted by a module to a remote resident unit; the lower waveform represents the data received by the same module. The module is requesting service from the resident unit by transmitting request to send (RTS) pulses. These pulses have widths of 2.5 milliseconds and are spaced 40 milliseconds apart, providing a 5% duty cycle, to conserve power. When the leading edge of a pulse is detected by a resident unit, the resident unit transmits a character back to the module at 1200 baud with one start bit and one stop bit. In the upper waveform, the leading edge of RTSB is detected by the remote resident unit which responds with an identification code $\emptyset AA_{16}I$, which consists of a string of alternating ones and zeros. While the module is receiving the character transmitted by the resident unit, the request to send envelope remains high. Following confirmation of receipt of the resident unit code, the module transmits a SELL code such as $\emptyset 53_{16}$ to instruct the resident unit to configure its modem to an answer mode.

In FIG. 9, the upper waveform represents a module in a SELL mode and the lower waveform represents the same module receiving pulses from a second, remote module. In the upper waveform at time B, module 1 detects the request to send (RTS) pulse of the second module and interprets the RTS as a start bit. Since module 1 is in a SELL mode, it changes from a receive mode to a transmit mode if it clocks either a framing error or an indeterminant character. All resident unit and module initial identifier codes employ alternating binary patterns, that is, $AA_{16}$, $AI_{16}$, $AB_{16}$. This alternating binary bit pattern (101010 . . .) cannot possibly be clocked into a receive buffer from a misinterpreted RTS pulse. Thus, in this fashion, the module can determine whether it is communicating with a resident unit or with another module.

Since each module must necessarily go into a receive mode after the transact key T is operated regardless of whether the module is in the BUY or SELL mode, it is necessary for one of the modules to change from receive to transmit so that normal communication can proceed. All communication between modules and between a module and a resident unit is half duplex, that is, the module is not capable of sending and receiving data simultaneously. The transmit line doubles as a request to send handshaking signal. One reason that this mode reversal is necessary arises from the passive way in which the resident unit detects the presence of a module. The resident unit detects that a module is on its receptacle by noting the presence of as well as the timing of the RTS pulse stream of the module and classifying the pulse stream as valid or invalid. This technique eliminates the need to manually interact with any controls on the resident unit to tell it whether a module is present and requesting service and what mode the module is in, i.e., BUY or SELL. This information must be made known to the resident unit so that when two modules are communicating with each other via two resident units, one internal modem can be configured as ANSWER and the other modem as ORIGINATE. The modems would not function if they were both set to the same mode. Obviously, there is no a priori way for the resident unit to know whether to set itself in ANSWER or ORIGINATE mode unless it receives some information from the module instructing it which way to configure itself. The resident unit will thus function with the module automatically.

Figures 6, 7, 8, 9, 10:
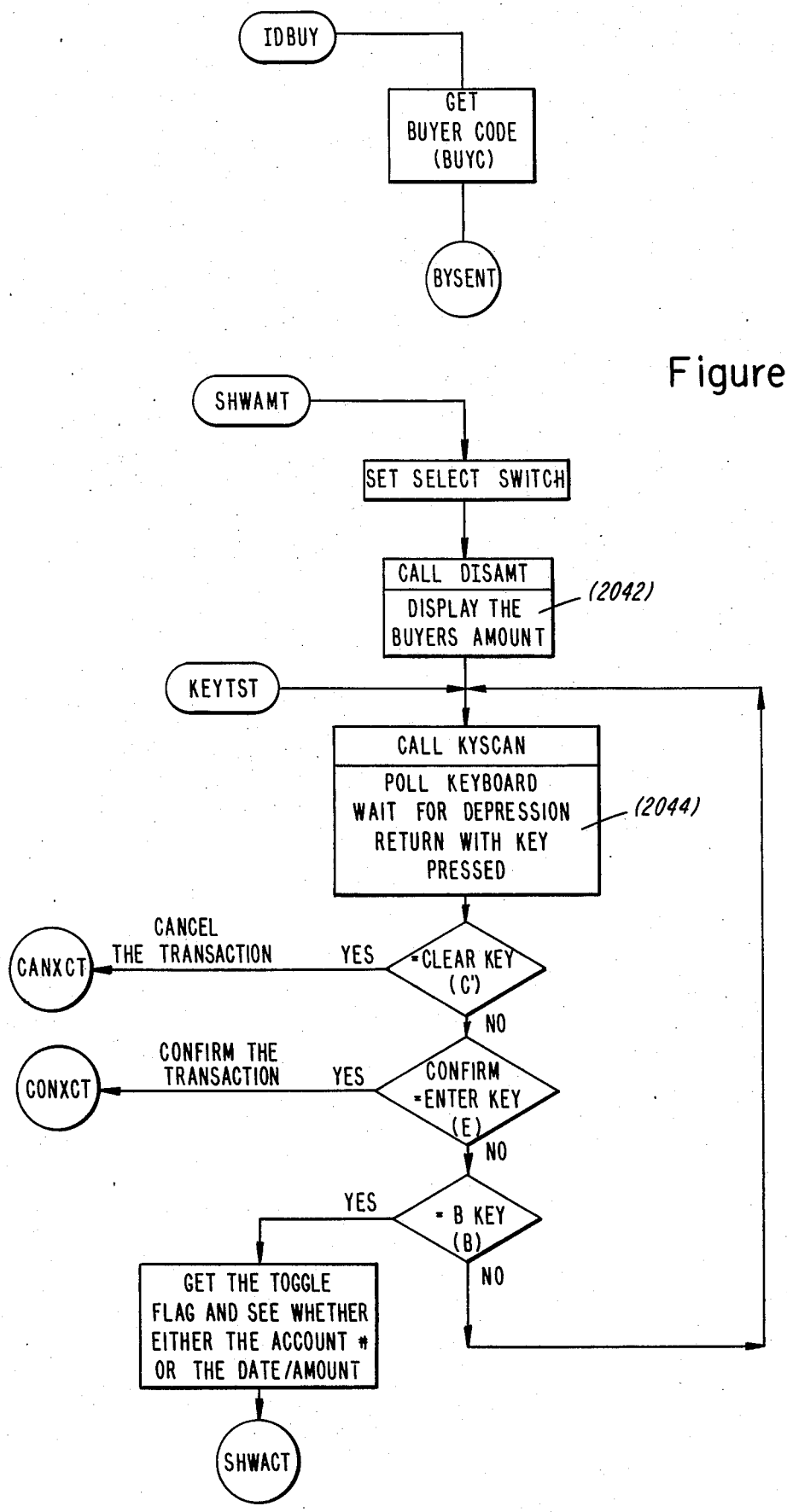
Figures 6, 7, 8, 9, 10, 11:
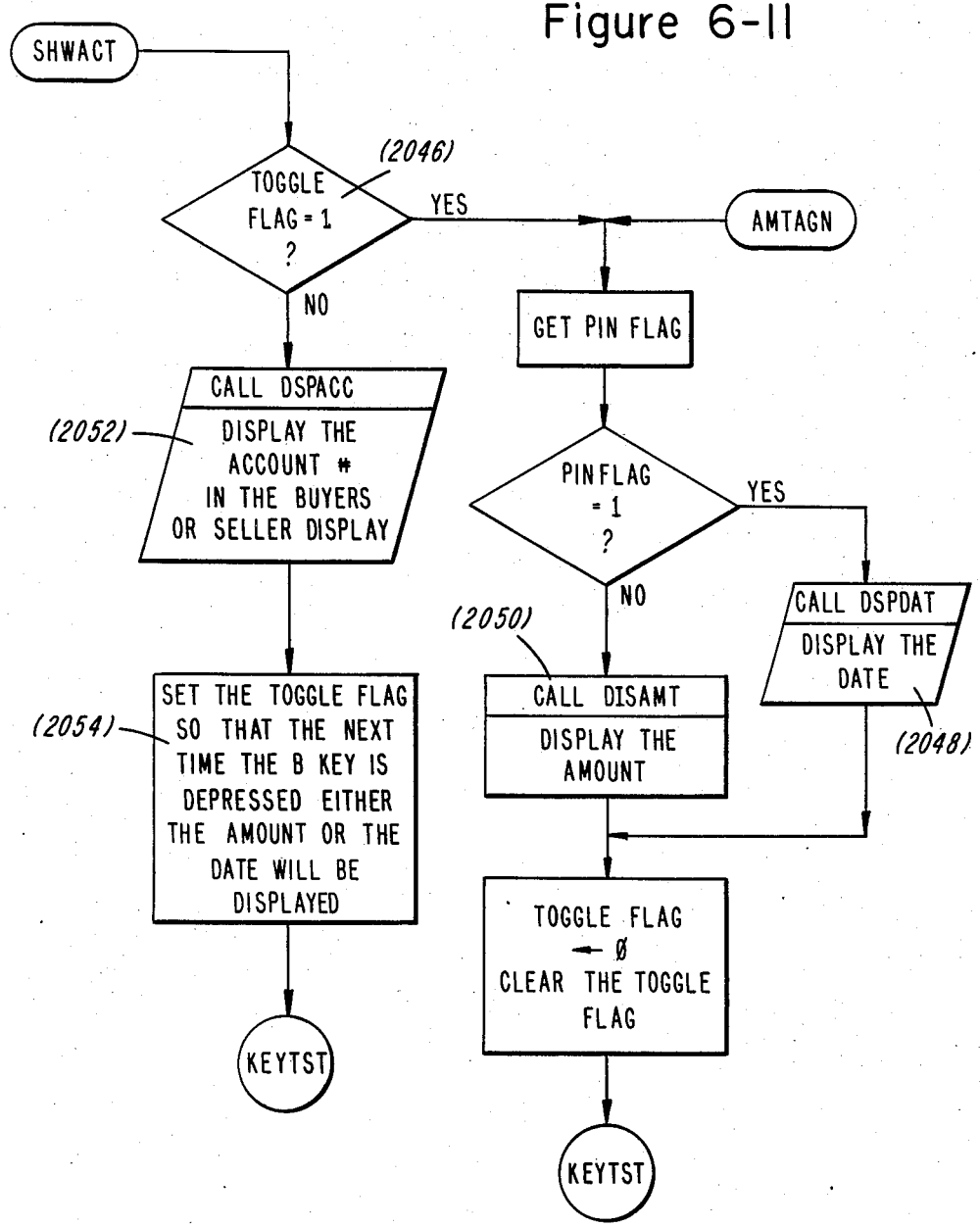
Figures 6, 7, 8, 9, 10, 11, 12:
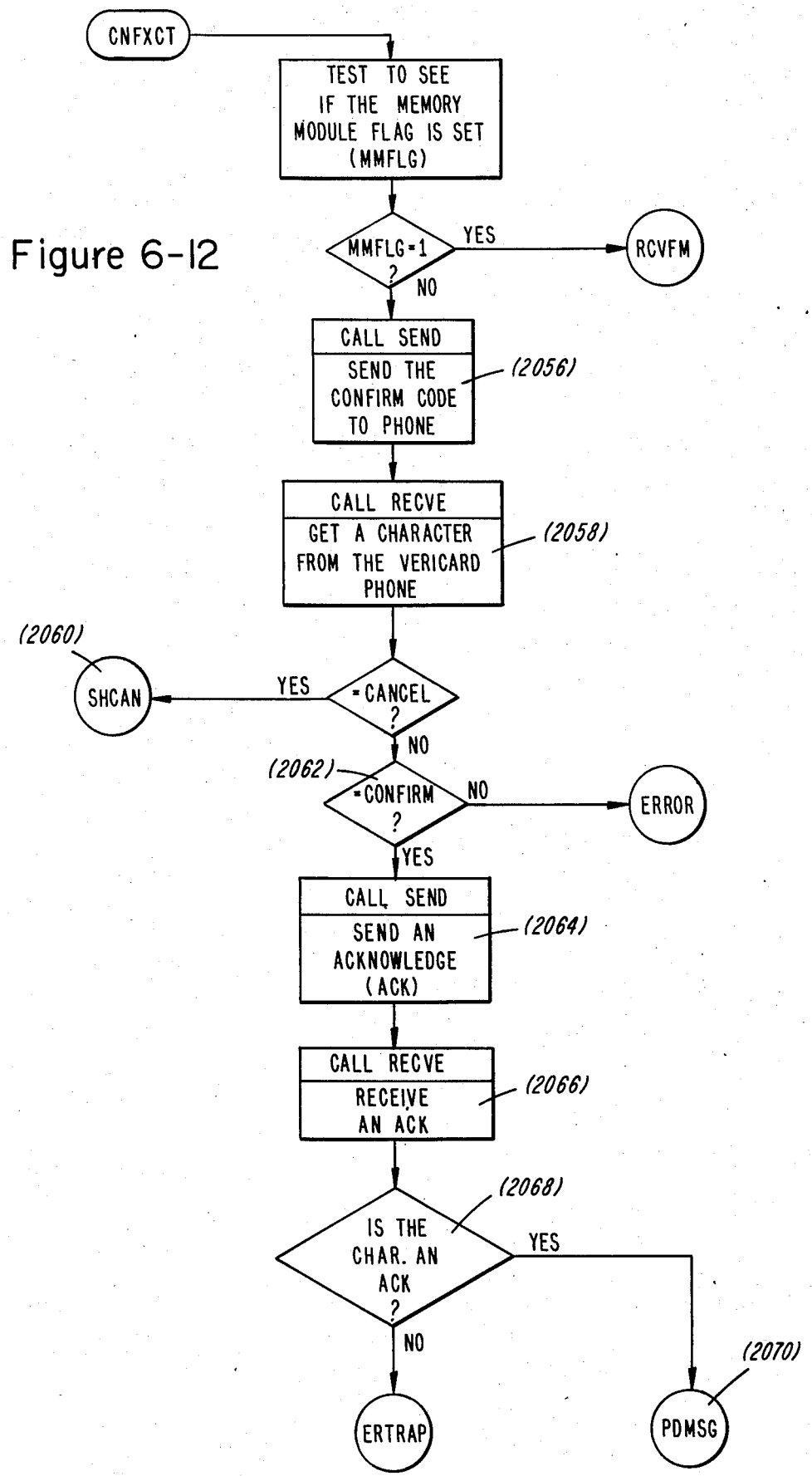
Figures 6, 7, 8, 9, 10, 11, 12, 13:
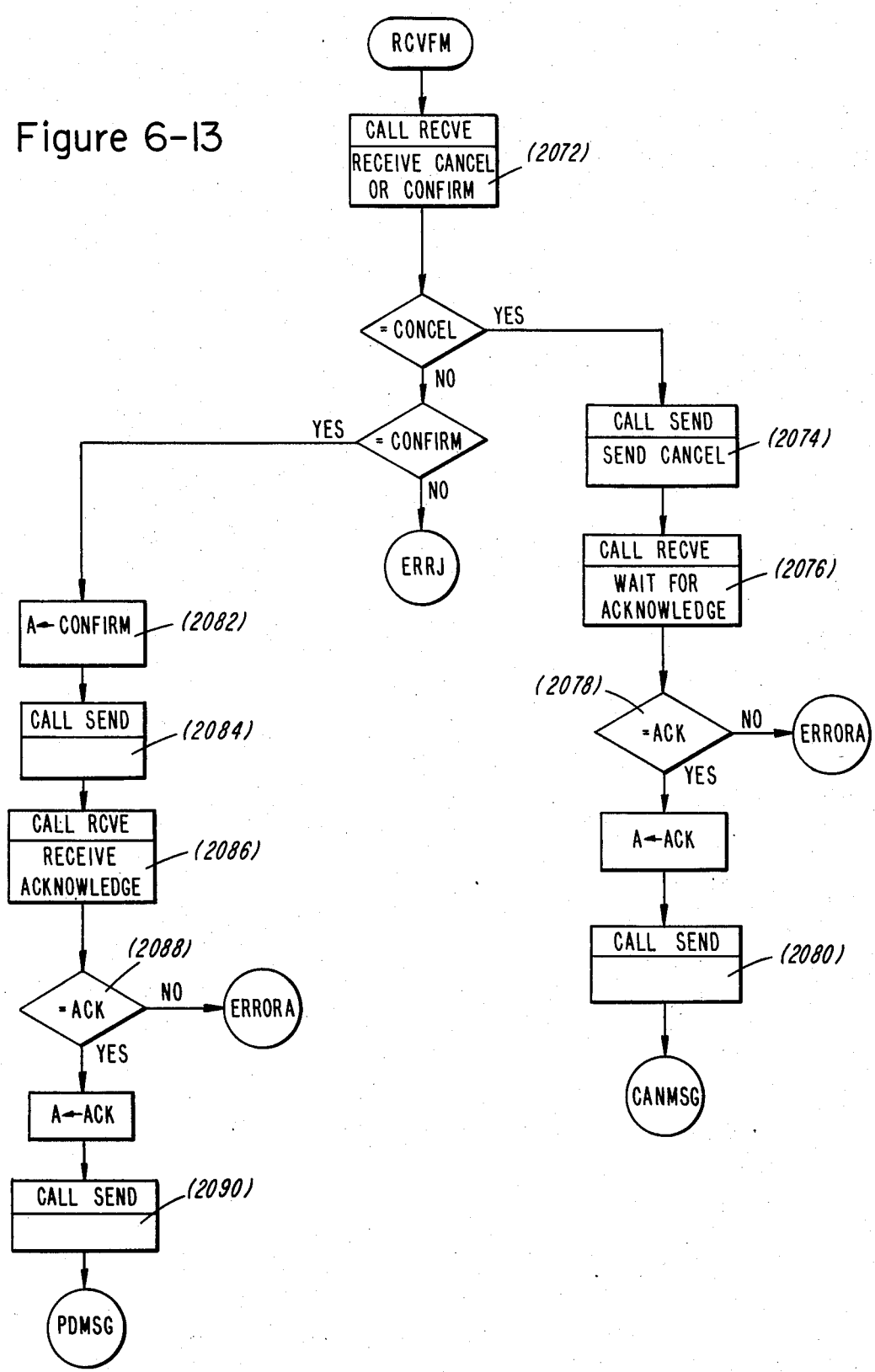

Returning now to FIG. 6-8, assuming that the incoming signal is determined to originate from a resident unit, the program jumps to IDBUY in FIG. 6-10. If the incoming data havenot originated from a resident unit, the incoming character is tested to determine whether it has originated from another module (2004). If the incoming character has originated from another module, the MMFLG flag is set and an acknowledge is sent to the remote module, as illustrated in FIG. 9. Referring to FIG. 6-8A, the module now receives input data from the remote module (2006) including the seller's date and the seller's account number. These data received by the module are moved to respective storage locations in memory 44 (2008). The received character is checked to determine whether it is an inquiry character (2010) and the buyer's account number and balance are moved to the output buffer of the module (2012). The buyer's module now transmits the account number and transaction amount to the seller's module (2104) and the program jumps to CNVRG in FIG. 6-9.

In the SELL mode SELLMD, identified by a reset PINFLG, the optical interface is interrogated (2016) to respond to an incoming character and to identify the source of the character, i.e., a module or resident unit, as discussed above with respect to the waveform shown in FIGS. 8 and 9. Thus, the incoming character is tested to determine whether it is a framing error (2018). If the incoming character is not a framing error, a test is made to determine whether the incoming character is a resident unit identification number, i.e., characterized by alternating 1 and 0 bits (2020). If the incoming character has been generated by a resident unit, a SELL code is loaded into a transmit data register of the module (2022). If the character source is another module, on the other hand, the receiving module transmits an identifier MMID (2024) to the sending module, following a two character time delay (2026).

The SELL code or module identifier is applied to the optical interface for transmission to the remote module or resident unit (2026) and the module switches to its receive line to wait for an acknowledge signal from the remote module or resident unit (2028).

Referring to FIG. 6-9, the seller's account number and data are moved to the output buffer of the microprocessor 38. In the buy mode, the buyer account number and amount are moved to the output buffer (2030) using subroutine MOVBUF.

Subroutine TXBLK (2032) transmits a string of data preceded by a STX character and terminated by a CHKSUM. When used together with RXBLK, TXBLK performs acknowledge, negative acknowledge handshaking based upon the result of the transmitted CHKSUM. TXBLK does not return from a call sequence until it has received a valid ACK character.

The module transmits an inquiry character and executes subroutine RXBLK (2034) to receive data from the remote module or unit.

Subroutine MVIBUF (2036) is called to move data to the location where the corresponding variables are stored. In SELL mode, the buyer's account number and transaction amount are moved to the respective variable location; in BUY mode, the seller's account number and seller's date are moved to the current locations where these variables are stored.

The PINFLAG is now tested (2038) to determine whether the module is in the BUY mode or the in the SELL mode. If the module is in the BUY mode, identified by a set PINFLG, DSPDAT is called (2040) to display the seller's date in the display of the buyer's module. The program now waits for depressions of the key in the KEYTST routine shown in FIG. 6-10. If the module is in the SELL mode, identified by a reset PINFLAG, control of the program jumps to SHWAMT, shown in FIG. 6-10.

The SHWAMT subroutine displays either the AMOUNT or the CURBAL (current balance) based on the setting of SELSWT (select switch). If the SELSWT is reset, the transation amount is displayed; if SELSWT is set, the account balance is displayed (2042).

At KEYTST, the module is waiting for a confirm or cancel from the user. The transaction is confirmed by operating the E key of the keyboard 26 or cancelled by operating the C key (2044). Specifically, if the C key is operated, the program jumps to CANXCT in FIG. 6-5. If the B key is operated, the toggle flag is tested to determine whether the account number or the date/amount should be displayed at this time (depending upon whether the module is in the BUY or SELL mode). Thus, referring to FIG. 6-11, if the toggle flag is set (2046), the PINFLAG is tested; if the flag is set, the display date subroutine DSPDAT (2048) is called. If the PINFLAG is reset, on the other hand, the subroutine DISAMT is called (2050) to display the transaction amount. In either case, the toggle flag is reset and program control returns to KEYTST in FIG. 6-10.

If the toggle flag is reset, in step 2046, the subroutine DSPACC is called to display the account number in the buyer or seller module display (2052). The toggle flag is set so that the next time the B key is depressed, either the amount or the date will be displayed, depending upon the mode (2054). Control of the program is now returned to KEYTST.

When a pair of modules 20 are trading via a resident unit 62, both the (human) buyer and seller are temporarily out of voice contract with each other over the telephone, after the transact key T has been operated. The buyer and seller remain out of voice contract until both have either cancelled or confirmed the transaction. Since both parties are out of personal visual and voice contract, all information regarding the transaction must be reviewed by both individuals prior to making the decision to cancel or confirm. The modules must also receive internal confirmation that the cancel/confirm codes have been successfully received by either side. Since the mirror image of the transaction data is stored in both devices, it is imperative that each device "know" that the device has a valid copy of the transaction information.

Thus, referring to FIG. 6-12, in the transaction confirmation routine (CNFXACT), accessed by operating the enter key E during step 2044 in FIG. 6-10, module flag MMFLG is tested to determine whether the flag is set, recalling that if the MMFLG is set, communication is being established between a pair of modules rather than between a module and resident unit. If the flag is set, indicating that communication is between modules, control of the program jumps to RCBFM in FIG. 6-13, to receive either a cancel or confirm command via the keyboard. If MMFLG is reset, on the other hand, the confirm code signal is sent by the module to the resident unit (2056), and the optical interface of the module is accessed to receive a character from the resident unit (2058). The incoming character from the resident unit is now tested to determine whether the character is a CANCEL or CONFIRM code.

If the incoming character is a CANCEL, the module displays the term "CANCEL" (2060). If the incoming character is neither a CANCEL nor a CONFIRM, an ERROR prompt is displayed, indicating that an incorrect response was received (only CANCEL or CONFIRM is appropriate at this point in the sequence). An acknowledge character is now transmitted by the module (2064) to confirm that the CONFIRM character transmitted by the remote module was received.

The module now addresses its receive line to wait for a further acknowledgement from the remote module. This is particularly important since the information in both modules must be agreeable to both parties in the transaction prior to recording the data in the transaction memories of the modules (2066). If no acknowledgement is received by the module (2068), an error message is displayed. If the acknowledgement is received, however, the message "PAID" is displayed in display 24 (2070).

Transaction confirmation or cancellation that occurs during the RCDFM routine, shown in FIG. 6-13, causes the module to address its receive line (2072) to wait for a CONFIRM character or a CANCEL character. If a CANCEL character is received, the program branches to step 2074 wherein the module transmits a cancel character to the remote unit and waits for an acknowledgement to be received (2076). If no acknowledge character is received, an error prompt is displayed (2078). If an acknowledge character is received, however, the module transmits the display "CANCELLED" to the remote module (2080), using the MSGOUT subroutine 2082 shown in FIG. 6-15.

If the CONFIRM character is received, however, the receiving module echos the CONFIRM character back to the remote module, using branch 2082 of the program. A CONFIRM is echoed by loading it into the A register, calling the SEND subroutine (2084) and waiting for an acknowledgement from the remote module (2086). If no acknowledge character is received, an ERROR prompt is displayed (2088), otherwise, the acknowledge character is echoed back to the remote module (2099).

In the PDMSG routine, the date, account number of the transacting device, the amount and the transaction type are stored in packed BCD format (2090). Two error detection bytes are stored with the data; one of the bytes is a CHKSUM and the other is a longitudinal parity byte. The message "PAID" is now displayed on the module display 24 (2092).

A keyscan subroutine is called (2094), and PINFLAG is tested to determine whether the module is in the BUY mode or in the SELL mode, bearing in mind that only the buyer must keyboard enter his personal identification number (PIN) prior to making a transaction on module 20. If the PINFLAG is reset, indicating that the module is in the SELL mode, control of the program returns to ENTER in FIG. 6-2 at the seller input section. If the PINFLAG is set, on the other hand, control of the program returns to DISXCT in the buyer branch of FIG. 6-3, to display the current transaction count.

The routine CANXCT is executed in FIG. 6-15, accessed by operating the clear key C in step 2044 of FIG. 6-10. Recall that it is important that the remote module acknowledge receipt of a cancellation character transmitted by the local module. When both modules are separated by a long distance, it is further important to know that the remote unit has actually received the cancel character. Thus, the MMFLG bit is tested (2096) to determine whether the remote unit is a module or a resident unit. If the MMLG is set, indicating that the remote unit is another module rather than a resident unit, the (human) buyer and seller are both physically present at the point of transaction. Thus, the transaction is cancelled if both the buyer and seller press the cancel key C. This enables the individuals to discuss the reason behind the cancellation. In this branch, a dummy RECEIVE subroutine is called, followed by a SEND subroutine that transmits a cancel character to the remote unit (2100). The module is now placed in a receive mode (2102) to await an acknowledge character transmitted by the other module. If no acknowledge character is received, an error is displayed. If an acknowledge is received, on the other hand, the module echos the acknowledgement to the other unit (2104) and a cancel message is displayed (2106).

If the MMFLG is reset, on the other hand, the cancel code is transmitted to the remote module (2108) and the module is placed in a receive mode to await receipt of a cancel or confirmation from the remote module (2110), bearing in mind that one user may cancel the transaction while the other user confirms the transaction. If a cancel character is received, meaning that the other user has cancelled the transaction, the transaction is aborted (2112). The receipt of the cancellation character is acknowledged to the other module (2114) and the module awaits an acknowledgement from the other module (handshaking) (2116). If no acknowledgement is received, an error message is displayed (2118): otherwise, the message "CANCELLED" is displayed (2082).

If a confirm character, rather than a cancel character, is received by the module, the two modules undergo a handshaking routine as described with respect to the cancel character. If neither a cancel character nor a confirm character is received, however, an error message is displayed (2120).

The initialization routine INIT, shown in FIG. 6-16, handles the loading of the account number, the personal identification number (PIN) and the starting balance provided by the sponsoring institution. The subroutine RXBLK (2122) reads in a 12 character identification string and compares it against a stored initialization code. This string, if equivalent to that stored, will "unlock" the device and permit loading of initialization data into the RAM 44 of module 20. The received code is tested, using subroutine test code TSTCOD (2124), and if there is equality, the program proceeds to control loading in of the account number, PIN and starting balance (2126). In step 2128, the variables BANKSTR, UNIT and CURBAL are defined to represent the PIN, account number and starting balance, respectively. The status code is set (2130) and the transaction count TRANCT is cleared (2132). The page and byte pointers to the transaction storage memory are now initialized, and the program branches to ENTAMT, in FIG. 6-4.

In FIG. 6-17, the routine TXBANK handles the downloading of the transaction memory from the module to the resident unit. There are two significant cases to be considered. The first case involves simple unloading to the resident unit of the transaction memory for general review or transaction reconciliation. This is a local mode operation, wherein the resident unit is on-hook and a simple listing of the transaction stored in the module memory is desired. The module transmits packed data to the resident unit which in turn unpacks it and generates a formatted listing showing the transaction number, transaction date, transaction count number, transaction amount and the transaction type. The second case involves unloading the transaction memory to the resident unit, followed by either automatic or manual transfer of data to the remote transaction clearing computer. In this case, the resident unit goes on-line to the central computer by either auto-dialing or manually dialing. When the resident unit establishes a modem linked communication pathway to the central computer, the transaction records inside the resident unit are sequentially transferred, using ACK/NAK handshaking, STX/ETX flow control and error detection. Once the transaction data have been successfully uploaded to the central computer, a code string is sent to the resident unit which in turn sends a code to the module. This code causes the module to initiate a sequence that resets the transaction count. The module signals the central computer via the resident unit that its transaction count has been successfully cleared. After this has been accomplished, the resident unit logs off the central computer and goes off-hook.

Thus, referring to FIG. 6-17 in detail, the subroutine received (2136) generates a request to send (RTS) pulse on its optical transmit line. In step 2138, the resident unit detects this pulse and transmits an identification code indicating requested action by the resident unit. The code then instructs the module whether to unload local, unload remote or unload other internal information.

The unload flag ULFLG (2140) indicates that the module memory transfer will be followed by a transfer of data to a remote computer and a clearing of the transaction count (assuming that the transfer is successful).

If the resident unit indicates an unload ID command, the program jumps to the XDMP routine, in FIG. 6-17. If the bank ID is required by the resident unit, the program jumps to OUTBNK in FIG. 6-21 to enable an external device to query the internal parameters of the module (except the personal identification number). If the resident unit has requested a transfer of data to an external destination (2142), the EXDUMP character is placed in the output register of the module, (2144) and transmitted to the resident unit (2146).

The program continues in FIG. 6-18, wherein the module waits for a character transmitted by the resident unit (2148). If the character received from the resident unit is an acknowledge character, the module display is cleared (2150); otherwise, an error message is generated at the module. The module unit number, account balance and absolute transaction count are now applied to the optical output buffer of the module (2152) and the relative transaction count is moved (2154). The data in the optical output buffer are transmitted to the resident unit (2156). In step 2158, relative page counter PAGCNT and the absolute page counter PAGE are set to 1; the record counter RECRD is reset. The page counter ranges from 1 to 7 and the record counter ranges from 1 to 255.

Thus, the module maintains an absolute transaction count as well as a relative transaction count. The absolute transaction count reflects the total number of transactions since the unit has been initialized, whereas the relative count reflects the number of transactions since the unit was last uploaded by the sponsoring institution. The relative count never exceeds 99, whereas the absolute count can be as high as 99,999.

The program continues to BEGXMP in FIG. 6-19. A start transmission bit STX is transmitted by the module (2160), the CHKSUM is reset and the index register X is set to $7F_{16}$ ($18_{10}$). Subroutine GETMFN (2164) returns the byte pointed to by the page counter PAGE and the record counter RECRD. This is sent to the optical interface (2166), and the index register is decremented (2168). When the index register is at 0, the complemented CHKSUM is transmitted (2170) and the module switches to receive mode to receive a character on the optical interface (2172). If the receive character is not an acknowledge character but is a negative acknowledge, control of the program returns to BEGXMT; if the received character is neither an acknowledge character nor a negative acknowledge character, an error is displayed in the module display (2174).

If the received character is a "0" record count indicating that no records are available, a "null" symbol is displayed (2176) and the record counter RECRD is loaded (2178). Control of the program returns to BEGXMT.

If the record counter RECRD is not at 0, indicating that transactions are available to be dumped a "-" is displayed (2180), the page counter is incremented (2182) and the record counter is reset (2184) as shown in FIG. 6-20. If the page count PAGCNT is not equal to the loaded value of 8, control of the program returns to BEGXMT in FIG. 6-19; otherwise, an unload ULFLG flag (2186) is tested to determine whether an unload to the remote computer is required. If an unload to a remote control is not required, the message "end" is displayed (2188). If an unload to the remote control computer is required, on the other hand, the module awaits an acknowledge character to be received (2190). If no acknowledge character is received, an error message is generated (2192). If an acknowledge character is received, the acknowledge is echoed back in a "double acknowledge" or handshaking sequence (2194) before clearing the transaction count (2196).

Referring to FIG. 6-21, the routine OUTBNK allows an external device to query all of the internal parameters of the module, accessed at step 2138 in FIG. 6-17. All of the internal data are accessible to the external device except the personal identification number. In addition, the module can be "deactivated" if the correct external command sequence is executed. Thus, in step 2198, the DMPBNK code is transmitted to the resident unit, following receipt by the module of the BANKID. The module waits for an acknowledgement from the resident unit (2200). If no acknowledgement is received, an error message is generated (2202). Assuming an acknowledge character is received from the resident unit, subroutine TSTCOD is called (2204) to accept the 12 character key and continue; otherwise, stop. In step 2206, the PIN, account number current balance and data are moved to the optical output buffer and transmitted (2208) to the resident unit. The module now waits to receive a "proceed or kill" code from the resident unit. If the receive code is a proceed code, the control of the program branches back to ENTAMT in FIG. 6-4. If the kill code is received, an error message is generated (2210). The USTAT flag is now reset to require the unit to be reinitialized.

The send and receive subroutines to establish optical communications are shown in FIG. 6-21SR to 6-25SR.

The send routine beginning in FIG. 6-21SR loads register A with the data to be transmitted (2212). The current CHECKSUM is added to the data to be transmitted (2214) and a request to send (RTS) bit on port B is awaited (2216). Upon receipt of an RTS bit, the timer interrupts are enabled, 8 bits of serial data are loaded (2218) and the start bit DATAOUT is set (2220). A delay of one bit (1/120 second) is established and the least significant bit of TXBUFF is shifted into carry (2222). The carry is now tested for set or clear. If the carry is set, the output bit is made equal to the carry (2224); otherwise, the start bit is reset (2226).

Referring to FIG. 6-22SR, the count is decremented and after all 8 bits are transmitted, an additional bit delay is established (2228). The start bit is now reset (2230) and a one bit delay for the stop bit (2232) is established.

In the receive subroutine beginning in FIG. 6-23SR, the optically transmitted data are converted from serial to parallel format. Initially, the framing error flag is cleared (2234) and the request to send (RTS) bit is set. The count to receive 8 bits is set to 8 (2236) and the A register is cleared. The state of the received bit DATIN is tested for a start bit, identified by DATIN being set (2238). The A register is incremented and tested for a content of 96. If the content of the A register is 96, the request to send bit is reset. If the content of the A register is not 96 but is 254, the counter CNT is set to 40 (2240) and a single bit delay is established (2242) shown in FIG. 6-24SR. The state of the DATIN flag is tested to determine whether a start bit has been received. If no start bit has been received, the counter CNT decrements toward 0 and branches back to RECVE in FIG. 6-23SR (2244). When an RTS bit is received, a one half bit delay is established (2246), followed by a two bit delay in 2248. The state of DATIN is copied into the carry flag (2250) and a serial to parallel conversion is established by rotating the carry flag CY right into RXBUFF (2252). The COUNT is decremented to 0.

Referring to FIG. 6-25SR, the RTX request pulse is turned off (2254), establishing a 2.5 millisecond pulse width and a one bit delay is established. The state of the DATAIN is tested to determine whether a stop bit is equal to 0 (2256); otherwise, a framing error is presumed to have occurred, and the error flag ERRORFLAG is set.

Finally, the CHECKSUM is updated with received data (2258) and the received data is returned to the RXBUFF (2258).

Resident Unit Block Diagram

With reference to FIG. 5, a microprocessor 200, which may be a Z80 microprocessor, is programmed by a control program resident in a read only memory (ROM) 202. The read only memory 202 may be, as one example, a type 2764 8K EPROM (erasable programmable read only memory) programmed in accordance with the flow charts to be described in detail below in the section entitled "Resident Unit Programming". The ROM 202 is, for the purposes of this invention, considered non-alterable and non-volatile. A pair of random access memories (RAM) 204 and 206, on the other hand, are provided to process alterable data, that is, to store data, such as electronic funds data, received from the local or a remote portable module 20 or from a bank or other sponsoring financial institution. The memories 204, 206 function as a buffer for data to be transmitted over the telephone lines or to be printed by a local or remote printer. Storage of data in the memories 204, 206 is controlled by decoders 208, 210, driven by the I/O and control terminals of microprocessor 200.

The microprocessor 200 and memories 204, 206 are interfaced to peripherals by a programmable peripheral interface 208 as a type 8255 PPI connected to a standard DTMF keyboard 70 (see FIG. 3), status lamps such as 58 and 62 and a printer port 210. The PPI 208 is also connected to credit/debit switch 30 and low speed modem 212 that interfaces with phone line interface unit 214 enabling the resident unit to transfer data bi-directionally via the telephone lines. PPI 208 controls the keyboard, printer, status lamps and telephone control, including the handpiece.

A second parallel peripheral interface (PPI) 216 interfaces the microprocessor 200 with the optical interface 66, which comprises an infrared light emitting diode 218 and an infrared light responsive photo-transistor 220. The PPI is also connected to a standard DTMF touch-tone generator 222 that applies standard dual tone multifrequency signals to the telephone lines through telephone line interface 214, and provides control and status monitoring or modem 212, which is preferably a 300 baud modem module such as a 49208-1 module.

A programmable counter 224 driven by microprocessor 200 controls the baud rate for serial interface controller 226 that in turn controls modem 212. Serial interface controller 206 controls bi-directional communication between the telephone lines and memories 204, 206. A second channel provided in the serial interface controller may be used to interface with additional peripheral devices through RS232 interface 228. The serial interface controller 226 may be, for example, a Z8442A device.

Resident Unit Programming

When the resident unit 62 is first turned on, programming stored in EPROM 202 performs an initiation subroutine (2000) shown in FIG. 7-1, which initializes all I/0 devices in the system, that is, the parallel peripheral interfaces 208, 216, programmable counter 224, serial interface controller 226 and serial I/0 controller 228. This sub-routine is not described in detail for brevity since such sub-routines are commonly used. Throughout this disclosure, common or well known sub-routines or routines will not be described in detail; non-conventional routines or sub-routines, however, shall be set forth in detail.

In portion 2002 of the flow chart of FIG. 7-1, the memory is tested to determine if it has previously been configured. It is important not to initialize all system variables and clear work areas after a power on reset has been generated since the memory circuitry, that is, RAM 204, 206 are energized by a back-up battery. If a memory has been previously configured, the status flag USTAT is at 1. Assuming that USATAT is a 0, all system variables are initialized and working storage is initialized; the flag USTAT is set at 1; otherwise, there is no initialization.

The telephone handpiece is now tested by a subroutine OFHTST (2004), which sets the carry flag if the handpiece is off-hook and clears the carry flag otherwise. If the carry flag is at 1, indicating that the handpiece is off-hook, the resident unit circuitry, shown in FIG. 5, is placed in an off-hook mode. If the carry flag is a 0, indicating that the handpiece is on-hook, the optical input at 218 is scanned by a sub-routine RXBTST (2006), which tests for the presence of a request to send (RTS) pulse. If a high level is detected, this sub-routine measures the time difference between pulses to insure that a portable module 20 is present, and the receive pulses are not spurious pulses. If a valid module is present, the RXBTST routine sets the carry flag. The RXBTST sub-routine is shown in detail in FIG. SR-1. The sub-routine tests the state of the optical input at 218 and sets the carry flag (2008) if the optical signal received is a request to send (RTS). If the receive pulse is not data, the carry flag is reset (2010); otherwise, the carry flag is set to 1. The incoming data pulses are monitored at parallel peripheral interface 216 (2012); if the receive bit returns to 0, the counter is reset (2014). The counter is initiated at 2016 and the incoming pulses are again read at parallel peripheral interface 216 (2018). When the incoming pulse again returns to 0, a sub-routine DELMS (2020) is called which measures the time interval between pulses. If the pulse time interval falls between a fixed range, the pulse is assumed to be a valid pulse; otherwise the pulse is rejected as constituting noise (2020). The timer CARONT is incremented (2022) which determines the time between successive request to send pulses. The program now returns to the main program at the bottom of FIG. 7-1.

If the carry flag is set, the incoming signals are presumed to be generated by a module requesting service, the program jumps to MMREQ in FIG. 7-20; otherwise, the program continues to FIG. 7-2.

In FIG. 7-2, the program calls a sub-routine TSTKEY (2024) which checks to see if a key on push button keyboard 70 has been depressed. If one of the keys is depressed, the carry flag is set; otherwise the carry flag is cleared.

The carry flag is next tested. If the carry flag is set, the program jumps to GETKEY in FIG. 7-5; otherwise, the telephone is tested to determine whether it is ringing at sub-routine 2026. If the telephone is ringing, i.e., a ring signal is detected at the phone line interface (PLI) 214, the telephone will go on-line via a routine ANSPHN (FIG. 7-21).

A sub-routine TSTBUF (2028) is now called to determine whether there is any data in the phone print buffer that is connected to printer port 210 via PPI 208. If there are characters currently in the buffer, the status of the printer is tested to determine whether the printer is ready to receive characters. As long as the printer is capable of receiving characters, data are transferred, FIFO, to the print buffer and then to the printer.

The phone is tested to determine whether it was previously off-hook and is now on-hook (2030). If the phone had previously been off-hook, identified by a set off-hook flag OFHFLG, the program continues to FIG. 7-3 of the flow chart; otherwise, the program branches back to BEGIN in FIG. 7-1.

Referring to FIG. 7-3, the telephone counts the number of telephone numbers dialed while the phone is off-hook (2032). Assuming that a number has been dialed while the phone is off-hook, the last telephone number dialed is stored in variable OLDNUM; the telephone number account is stored as variable OLDCNT (2034). Otherwise, clear the off-hook flag OFHFLG (2036) and also clear the number (2038).

A sub-routine VXOFF is called, to enable the transmitter to be muted when tone dialing or transmitting data via the modem (2040); the phone is placed on-hook using sub-routine ONHOOK (2024). The program now returns to BEGIN (FIG. 7-1).

Referring to FIG. 7-4, the program branches to PUT-OFF from FIG. 7-1, to place the circuitry into an off-hook mode. Thus, phone is tested to determine whether it is already off-hook, to avoid placing the phone off-hook a second time (2044). Routine OFFHK (2046) operates the hook switch relay of the telephone, waits for the telephone line coupler to active low before returning. The coupler cut through (CCT) indicates that a valid analog pathway to the phone line exists. The off-hook flag OFHFLG is set (2050) following affirmation of handpiece transmitter and receiver (2048).

A sub-routine TSTKEY is now called (2052) to determine whether a key of the touch tone dialer 70 is depressed. If a key is depressed, the program jumps to GETKEY (FIG. 7-5) otherwise, sub-routine RXBTST (2054) is called to test whether a request to send (RTS) pulse is present on the optical interface. If so, the program jumps to TSTXMS (FIG. 7-11); otherwise, sub-routine TSTBUF (2056) is called (see FIG. 7-5) to determine whether there are any characters in the buffer, and the program returns to BEGIN (FIG. 7-1). The GETKEY routine is initiated by a KYSCN 1 sub-routine which scans the keyboard 70 and returns with the translated key value (2058). Sub-routine LMTCHK (limit check) now returns (2060) with the carry flag set if the key values fall outside the permissible range 0-9.

If the carry flag is reset, indicating that the key value falls outside the range 0-9, the program jumps to SAVEIT (2062) in FIG. 7-10. The routine SAVEIT causes the keyboard entered numbers to be stored in a buffer. The data * and # are similarly stored in a buffer in accordance with the routine SAVEIT.

The KEYH key causes the program to jump to the redial routine (2064) shown in FIG. 7-9; the KEYF key causes the program to jump to MODEM to configure the resident unit as a conventional 300 baud modem with the serial port as the input. The KEYD key (2068), in FIG. 7-6 places the resident unit on-line to a remote computer. The KEYE key (2070) calls a sub-routine CHECK which turns off the carrier, flashes the status lamps 74 and restarts the program. The sub-routine CHECK is shown in FIG. SR-2.

In the CHECK sub-routine, the error flag is tested to determine if it is set (2072). If the error flag is set, control is returned to the original program at FIG. 7-6; otherwise, the reset key is tested. If the reset key is not depressed, control is returned to the main program; otherwise sub-routine TXOFF turns off the transmitter 2074. If the phone is already off-hook, determined by the status of the off-hook flag OFHFLG, sub-routine VXON is called to turn on voice control of the phone (2076); otherwise, voice control is turned off via sub-routine VXOFF. The stack pointer is now reset (2078), status lights are flashed and the error flag set (2080).

Returning to FIG. 7-6 the keyboard is sampled to confirm that any key has been depressed for a predetermined time period, corresponding to 20 samples (2082) to eliminate the effect of noise, that is, to distinguish between transient noise and key depression. The program now loops back to BEGIN in FIG. 7-1.

FIG. 7-7 illustrates the GEIKY 1 routine accessed at FIG. 7-4. Initially, a key scan KYSCN 1 sub-routine is called (2084) to identify the value of the key on keyboard 70 that was depressed. In response to depression of the PRINT key, a formatted listing of the transaction stored in the memory 204, 206 of the resident unit, downloaded from the module seated in the unit, is printed using an external printer connected to printer port 210 (2086). The print routine shown in FIG. 7-38 controls formatting of data printed out in a columnar fashion. The source data from which printout is generated resides in packed BCD form in the memory 204, 206 of the resident unit. Initially, a data available flag DAFLAG is tested to determine whether data currently reside in the transaction memory of the resident unit. Assuming that test data are available, the credit/debit counter established in microprocessor 200 is initiated, followed by initialization of the line counter, page counter and variables (2090). In a sub-routine MOVBUF, contents of the optical input buffer in PPI 216, are moved to the proper variables. The transaction count (TRANCT), the unit number (UNITNO) and the historical transaction count (XENT) reside in the optical input buffer 2092. The relative count is now subtracted from the historical count to obtain a base count number, from which to start numbering the transactions on the printout (2094). The program continues in FIG. 7-39, wherein the transaction counter is initiated with a number of transactions, with IY pointing to the beginning of the transaction memory (2096). The contents of BC are now temporarily stored on the stack (2098), and the formatted transaction listing location is pointed to by HL at the beginning of the work buffer (2100); this transaction pointer is temporarily stored (2102). The adjusted transaction count XCNT is converted to ASCII and written in the first field of the print buffer (2104). The transaction counter is incremented (2106) and the transaction pointer is restored (2108). Sub-routine WRTXCT (2110) takes the ten byte packed transaction pointed to by IY and formats it into a complete ASCII string consisting of a date, account number, amount and type,(i.e., by or sell). In addition, the WRTXCT also executes a call to OUTPR which results in the data being supplied to the print buffer. WRTXCT further keeps a running count of the total number of buys and sells as well as the total amount of each.

The current line count is now obtained and tested (2112) to determine if a page feed is necessary. If a page feed is necessary, the program jumps to RAGEP (FIG. 7-41); otherwise the program continues to restore IY and then to point to the next transaction (2114) in FIG. 7-40. The current transaction loop counter is restored (2116), decremented and tested for 0 (2118).

The register pair HL points to UNIT summary label data for a report to be printed out. The portion 2120 of the FINISH routine thus controls printout of summary heading (sub-routine OUTRR) and total sells, buys and amounts of each as well as account balance.

The routine NODAV, accessed in FIG. 7-38, controls printout of "no data available". The routine PAGEP, accessed in block portion 2112 of FIG. 7-39, controls printing of page heading, incrementing page count and line count, for controlling printing out of transactions.

Referring again to 7-7, the operation of MESSAGE key executes an electronic message waiting routine WAITMG, set forth in FIG. 7-8 (2122). The reset key (2124) executes the CHECK sub-routine and the STORE key (2126) stores the currently entered phone number for auto dialing and speed dialing using routine STRNUM. On default, the program jumps to RELEAS in FIG. 7-6 to eliminate the effect of key bounce.

The WAITMG routine shown in FIGS. 7-8 tests the message waiting flag (2128). If this flag is set, the resident unit automatically answers and goes on line to the remote, originating computer. If the flag MSGFLG is already set, the flag is reset (2130) and an output subroutine OUTPR is executed (2132) under the control of a pointer developed in step 2130. The pointer is stored in the HL registered pair; the data length is stored in register B. The program now continues to RELEAS.

If the message flag MSGFLG is not set (2128), the flag is set and the message "now waiting for messages" is buffered to the printer (3234). The program proceeds to RELEAS, to expedite a bounce eliminate routine during the time the key is released.

The redial routine shown in FIG. 7-9 redials the last telephone number dialed before the resident unit went on-hook. Initially, any interrupts are disabled (2136), the previously dialed number is pointed to by the contents of register pair HL, and the number of digits in the previous number is stored in register A. If register A (number buffer) is empty, the program jumps to RELEAS, to wait for the redial key to be released. If the number buffer is not empty, the contents of the number buffer are loaded into register B (2138), the contents of register pair BC are stored on the stack (2140) and register A is loaded with the contents of the memory pointed to by the HL registered pair (2142).

Sub-routine GNTON (2144), or "generate tone", dials the DTMF (dual tone multi-frequency tone generator) whose numeric equivalent, i.e., 0-9, *, #, A, B, C, D, is contained in the A register. The next tone is pointed to in step 2146, and the counter is restored (2148). The content of B, corresponding to the remaining numbers to be redialed, is decremented, and if the value of the content of register B is greater than 0, the programs loops back to step 2140; otherwise, the program awaits release of the redial key at RELEAS, at FIG. 7-6.

The SAVIT routine, accessed from FIG. 7-5, stores the keys as they are depressed. The routine first determines whether the key store is full (2150). Loop 2152, to this end, limits storage in the buffer to 48 touchtones. The current address of the next available memory location in the buffer is identified by the variable NUMPTR. The key value contained in the A register is stored at the memory location contained in the HL register pair. The current data pointer is now incremented. Thus, column numbers up to a total of 48 numbers are stored; numbers greater than 48 numbers are dialed but not stored. Finally, the GENTON sub-routine dials the DTMF code contained in the register. The code is dialed by a tone generator that is a software controlled device comprising a parallel port driving a dual two line to four line decoder which in turn drives a tone generator, such as the Motorola MK 5089, coupled to a telephone network via a phone line interface, such as novation PLI.

Referring to FIG. 7-11, routine TSTXMS processes transmissions from modules 20 to the resident unit 62. The program branches to this routine from FIG. 7-4 in response to a determination that a request to send (RTS) pulse is present on the optical interface, as determined by subroutine RXBTST in step 2054, while the resident unit is in an OFF-HOOK mode. Initially, the identification number of the particular resident unit is stored in the C register of microprocessor 200 (2154). Subroutine ENDOP (2156) transmits the binary equivalent of the characters now stored in the C-register through the optical interface of the resident unit, serially, at the rate of 1200 bits per second. Subroutine RECUOP (optical receive) (2158) returns with a character that has been reconstructed from a serial data stream received at the optical interface. This subroutine is shown in detail in FIG. SR-3, wherein the contents of the HL and BC registers are initially stored on the stack (2160). Port C of PPI216 is read. This port receives transmit enable, fast carrier detect, busy and off-hook control signals and develops coupler cut through, ring detect, carrier detect and receive data outputs. The subroutine continues only if the received data bit is low. Assuming that the receive data bit is low (on entry to the received routine) the RTS bit is set (2162), informing the module that it is authorized to initiate transmission.

Returning to FIG. 7-11, the code received is now tested to determine whether it identifies a portable module as being in the BUY mode (2166). If so, the program jumps to the BUY routine in FIG. 7-12. If the portable module 20 is determined to be in the SELL mode (2168), the program jumps to the SELL routine shown in FIG. 7-17. If the portable module is neither in BUY nor SELL mode, but is in a transmission dump mode (XDUMP), the program jumps to routine XFRXCT in FIG. 7-19 to obtain the contents of the module transaction memory. In this mode, the module 20 recognizes that the resident unit 62 is off hook and will wait for an acknowledge cycle pending transfer of data to a remote computer.

If the code received identifies the module 20 as being in none of the buy, sell or transaction dump modes, an error has occurred and the program jumps to routine XMERR in FIG. 7-13, wherein the transmitter carrer is turned off, and the status lights are flashed. Operation of the reset button returns the program to its normal control loop.

Referring to FIG. 7-12, in the buy mode, the mode flag is initially cleared (2172). The subroutine SORIG places the modem into an originate mode. The originating modem transmits data at 1270 Hertz and 1070 Hertz, respectively, for the mark and space frequencies. The modem receives data at 2225 Hertz and 2025 Hertz, respectively, for the mark and space frequencies (2174).

Subroutine XCTHDR synchronizes the receiver and transmitter, and performs initial reception of transaction data. This subroutine specifically obtains transaction data from module 20 in a single block transmission. These data include the buyer's account number and the amount of the account. Subroutine XCTHDR further mutes the handpiece microphone and speaker, and performs synchronization (2176).

Subroutine SEND outputs the data stored in the C register to the A channel of the serial input/output unit 226 and through the modem (2178). The data in register pair HL points to the buyer's transaction data currently residing in the optical input buffer (2180). The B register contains the length of the string to be transmitted.

In subroutine TXBLK (2182), the block of data pointed to by HL having a length in register B is transmitted through the serial interface 226 and modem. This subroutine has checksum error detection with ACK- /NAK handshaking. Subroutine TXBLK is shown in detail in FIG. SR-4.

In FIG. SR-4, the block of data pointed to by the HL register having a length contained in the B register is stored in register C (2184). The variable CHKSUM is reset, and the contents of register pairs HL and BC are stored on the staff (2186). The data now pointed to by the HL register pair is stored in register C (2188), the next data element is pointed to (2190) and the data are sent using subroutine SENDOP (2192). The loop counter is decremented (2194) and a determination is made whether all data been transmitted. If all data have been transmitted, the program continues (2196).

The complemented CHKSUM is stored in register A, and the complemented CHKSUM is transmitted (2198). Subroutine RECVOP is now called (2200) to receive data. If the transmitted data have been acknowledged (2202), the BL and HL registers are restored (2204) and the carry flag is reset (2206). If there has not been any acknowledgement, an error test is made (2208) and an error flag is set followed by restoration of the registers (2210) or the registers are restored (2212) without setting the error flag with control of the program being branched to the beginning of subroutine TXBLA.

Figures 6, 7, 8, 9, 10, 11, 12, 13, 14:
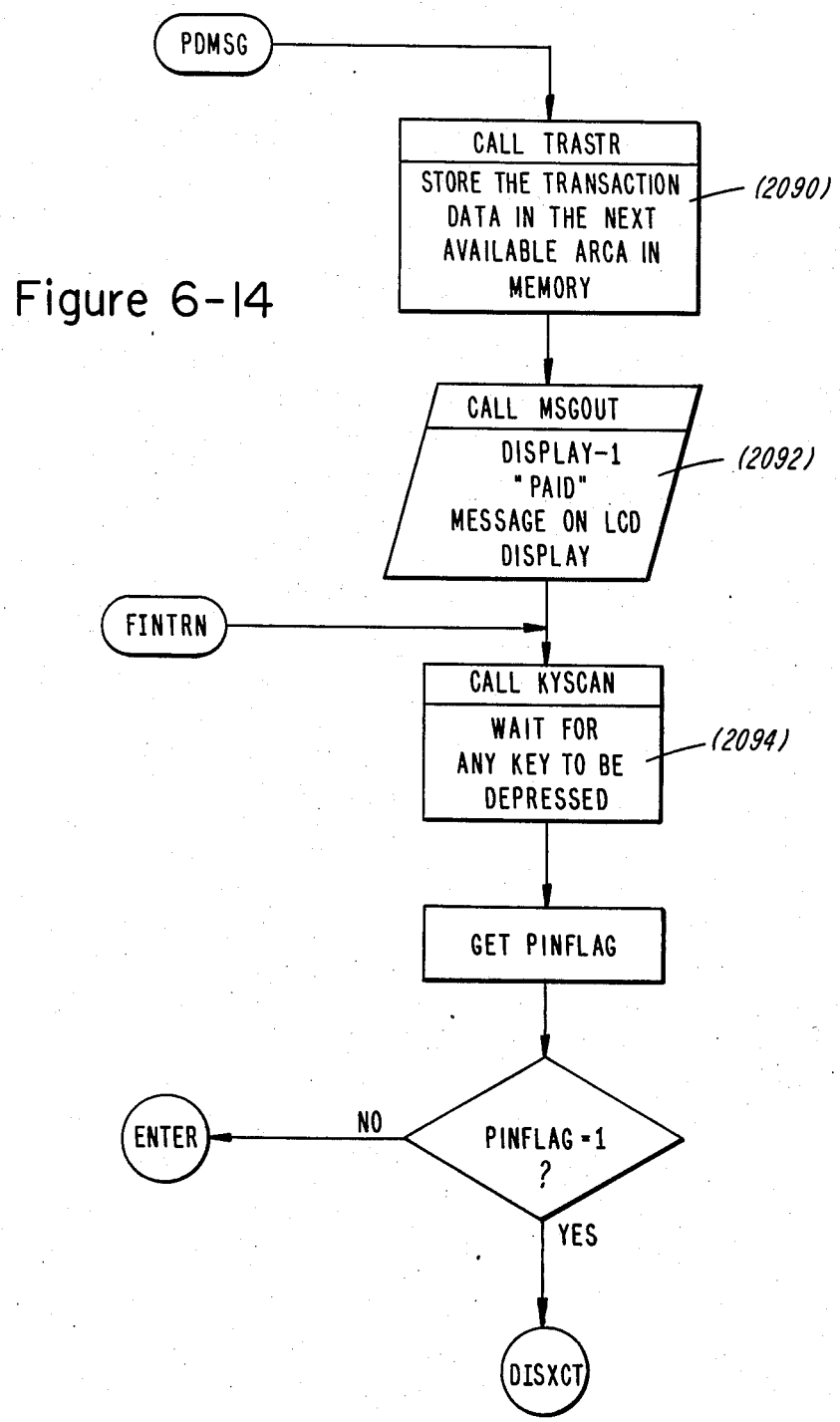
Figures 6, 7, 8, 9, 10, 11, 12, 13, 14, 15:
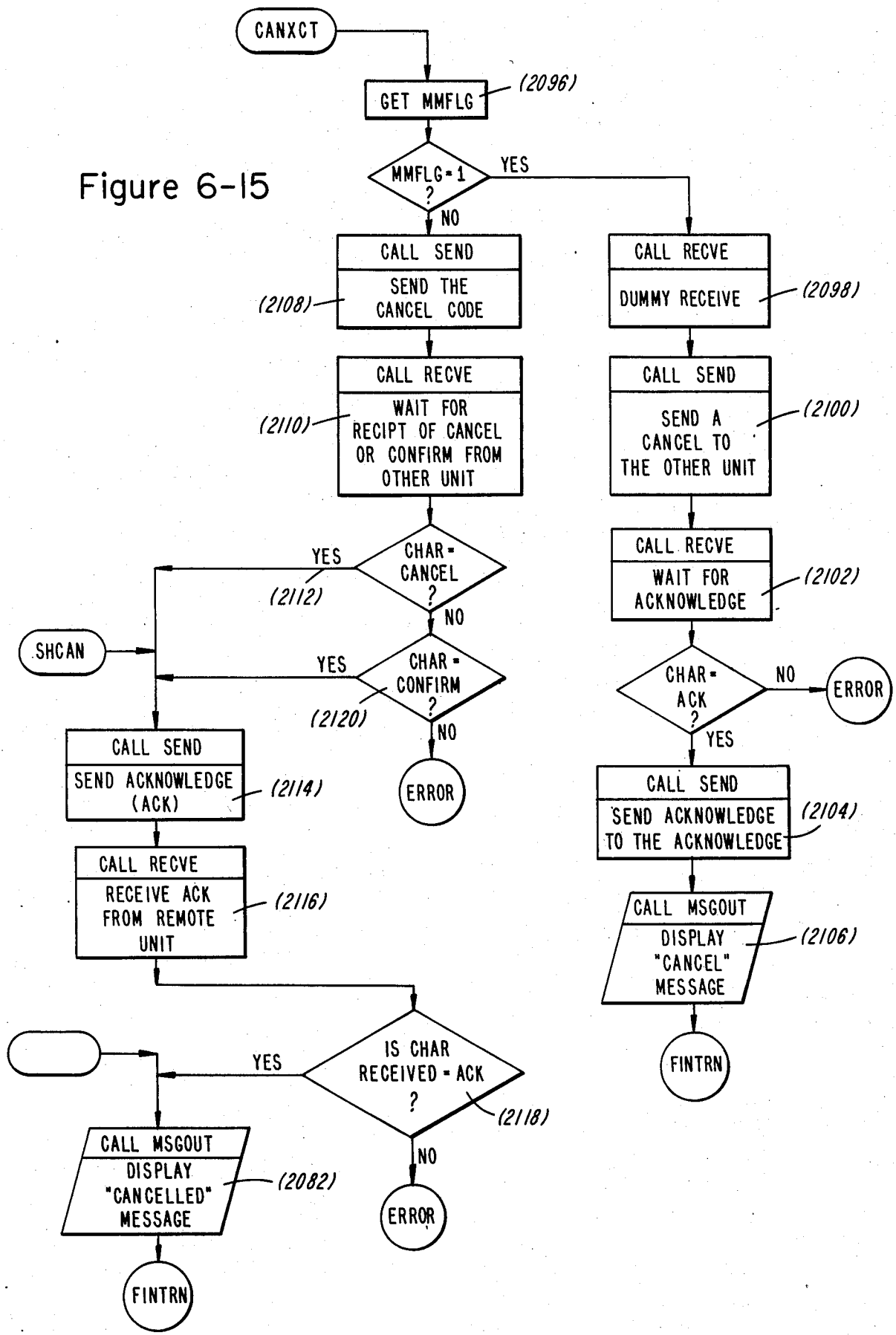
Figures 6, 7, 8, 9, 10, 11, 12, 13, 14, 15, 16:
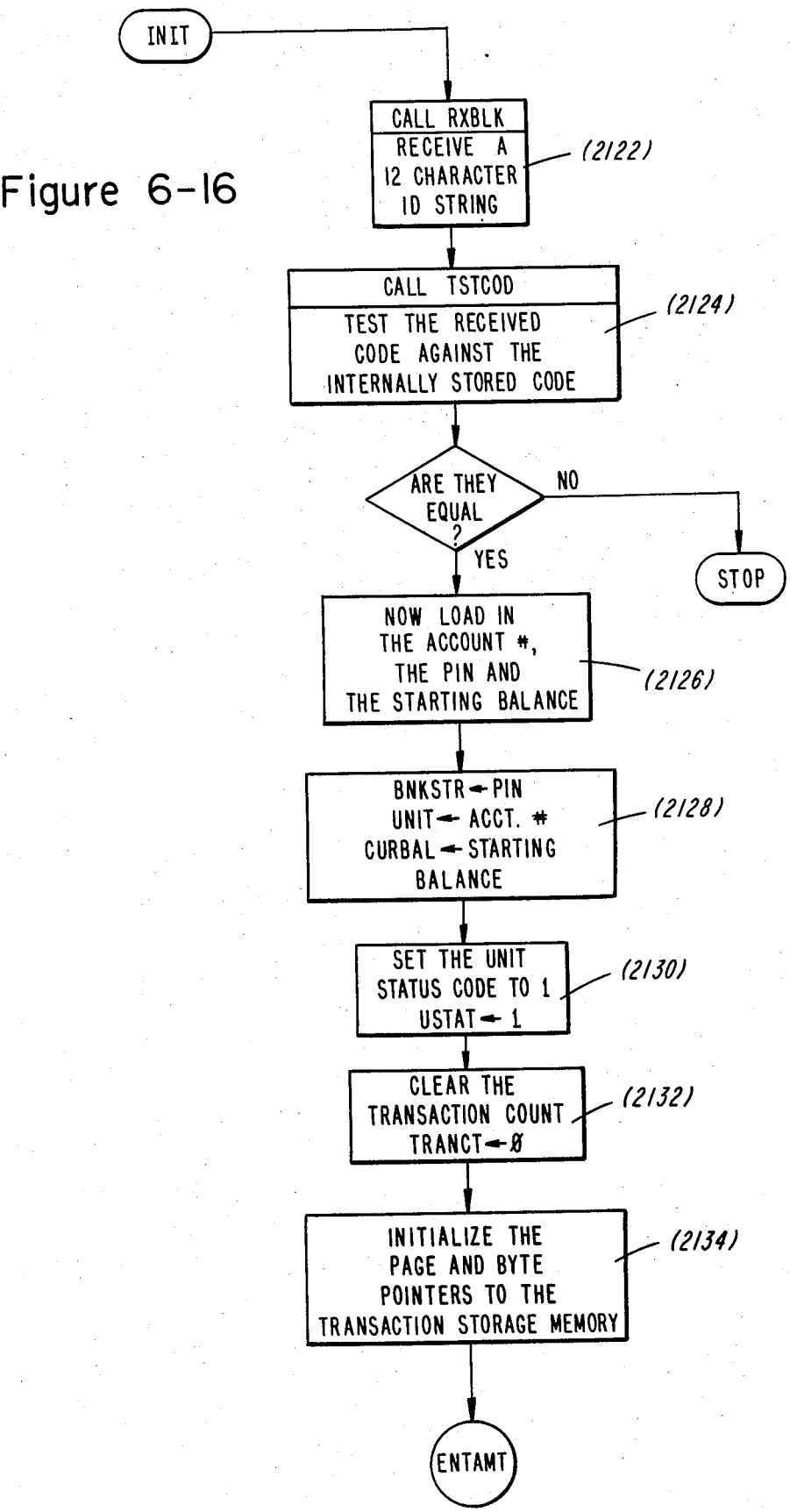
Figures 6, 7, 8, 9, 10, 11, 12, 13, 14, 15, 16, 17:
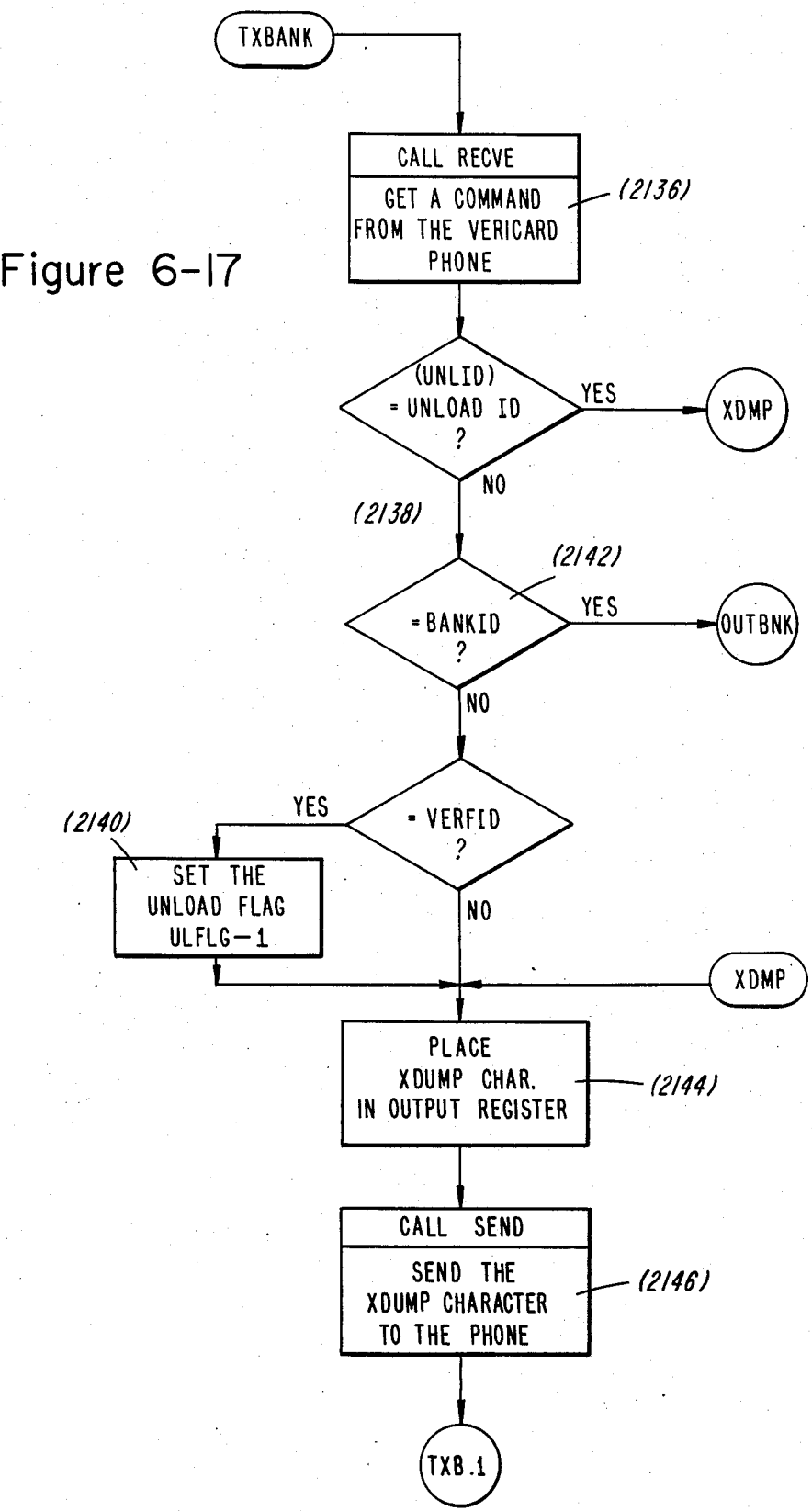
Figures 6, 7, 8, 9, 10, 11, 12, 13, 14, 15, 16, 17, 18:
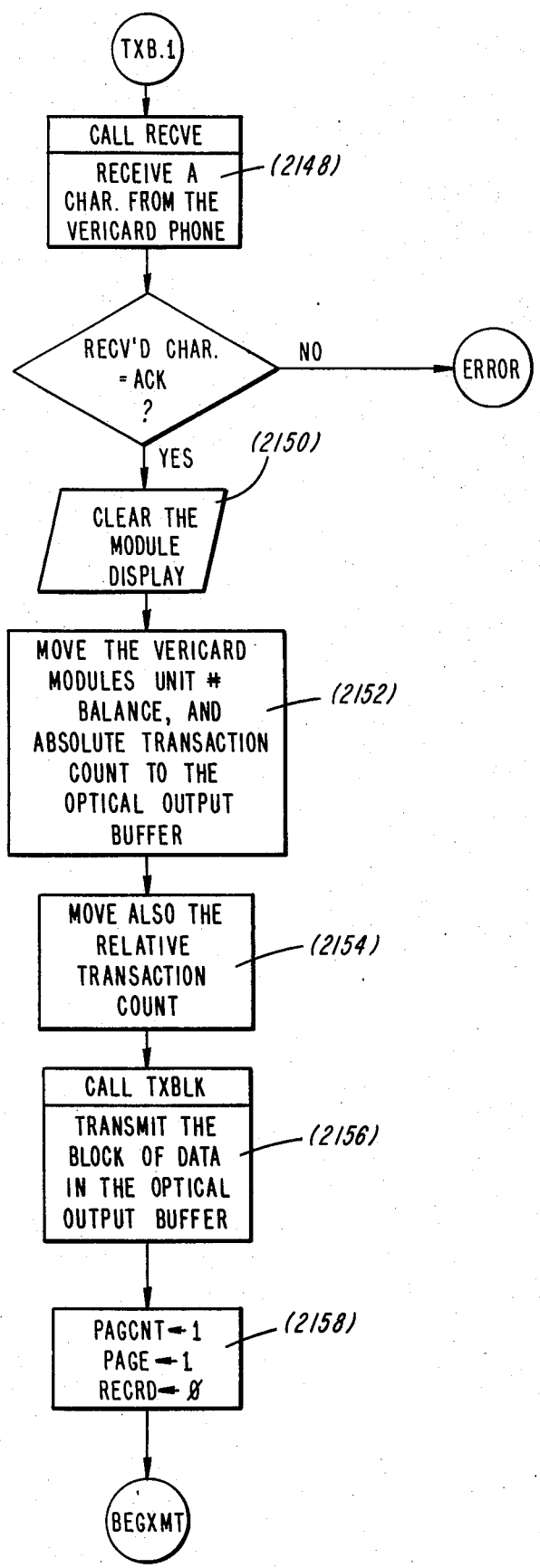
Figures 6, 7, 8, 9, 10, 11, 12, 13, 14, 15, 16, 17, 18, 19:
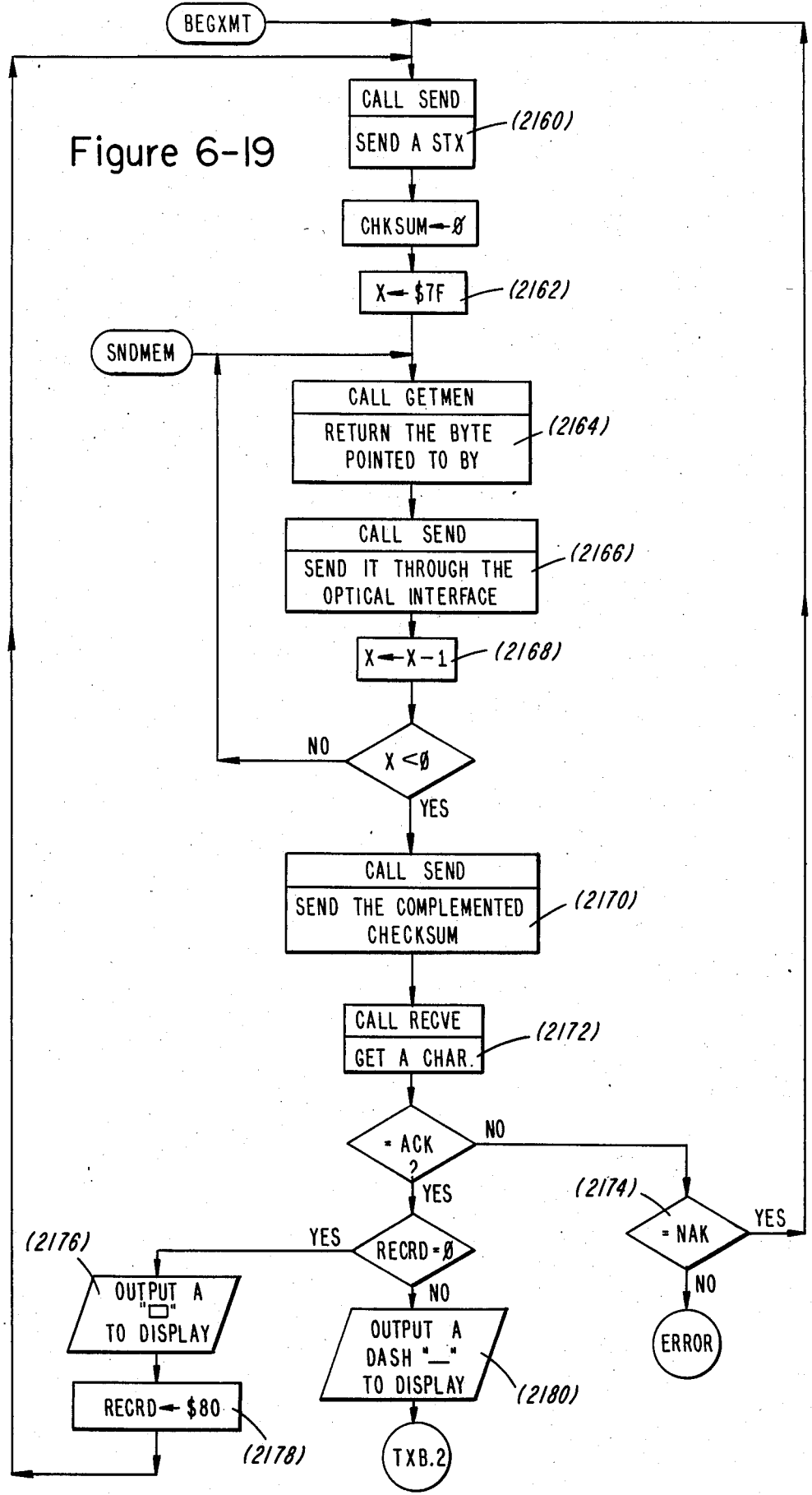
Figures 6, 7, 8, 9, 10, 11, 12, 13, 14, 15, 16, 17, 18, 19, 20:
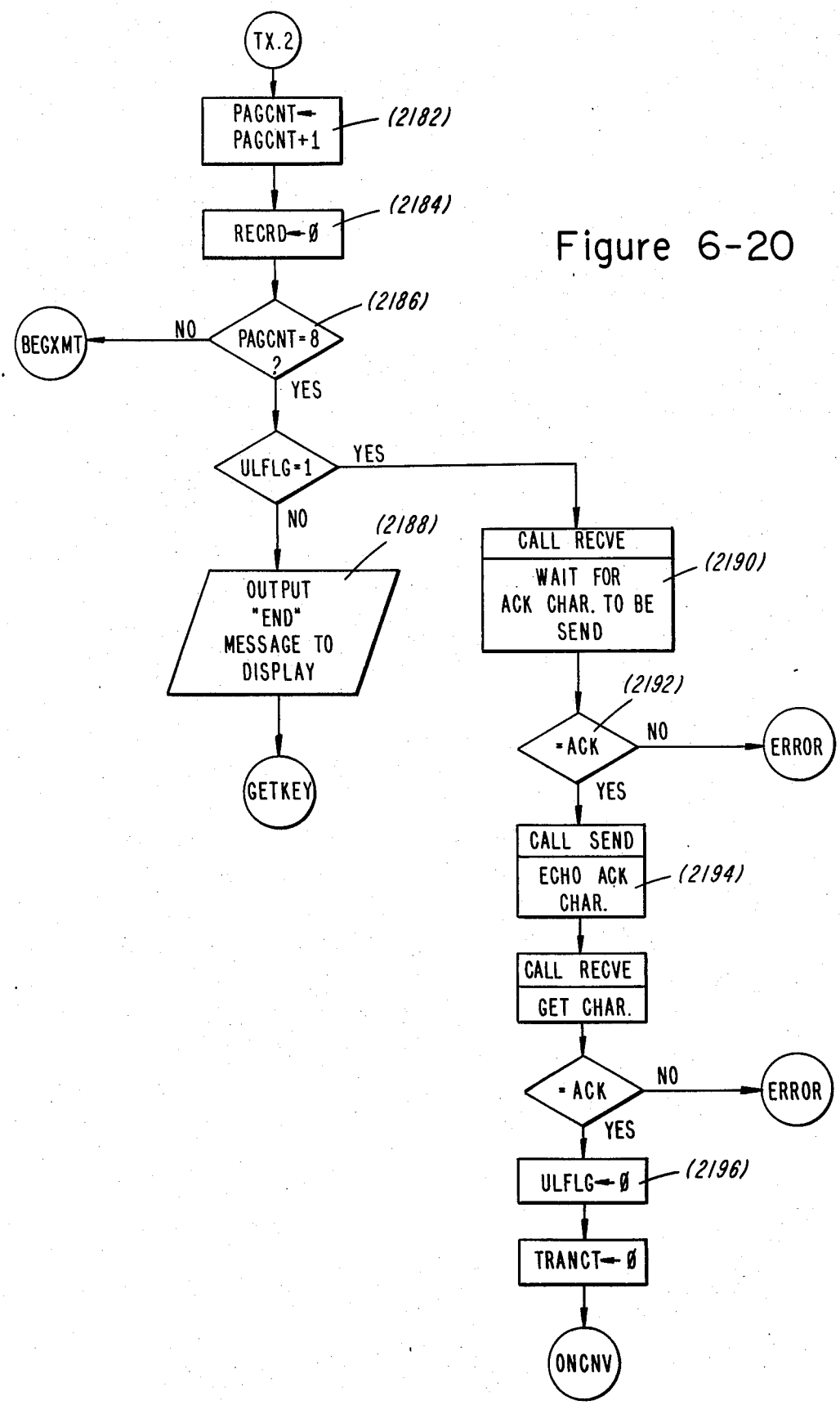
Figures 6, 7, 8, 9, 10, 11, 12, 13, 14, 15, 16, 17, 18, 19, 20, 21:
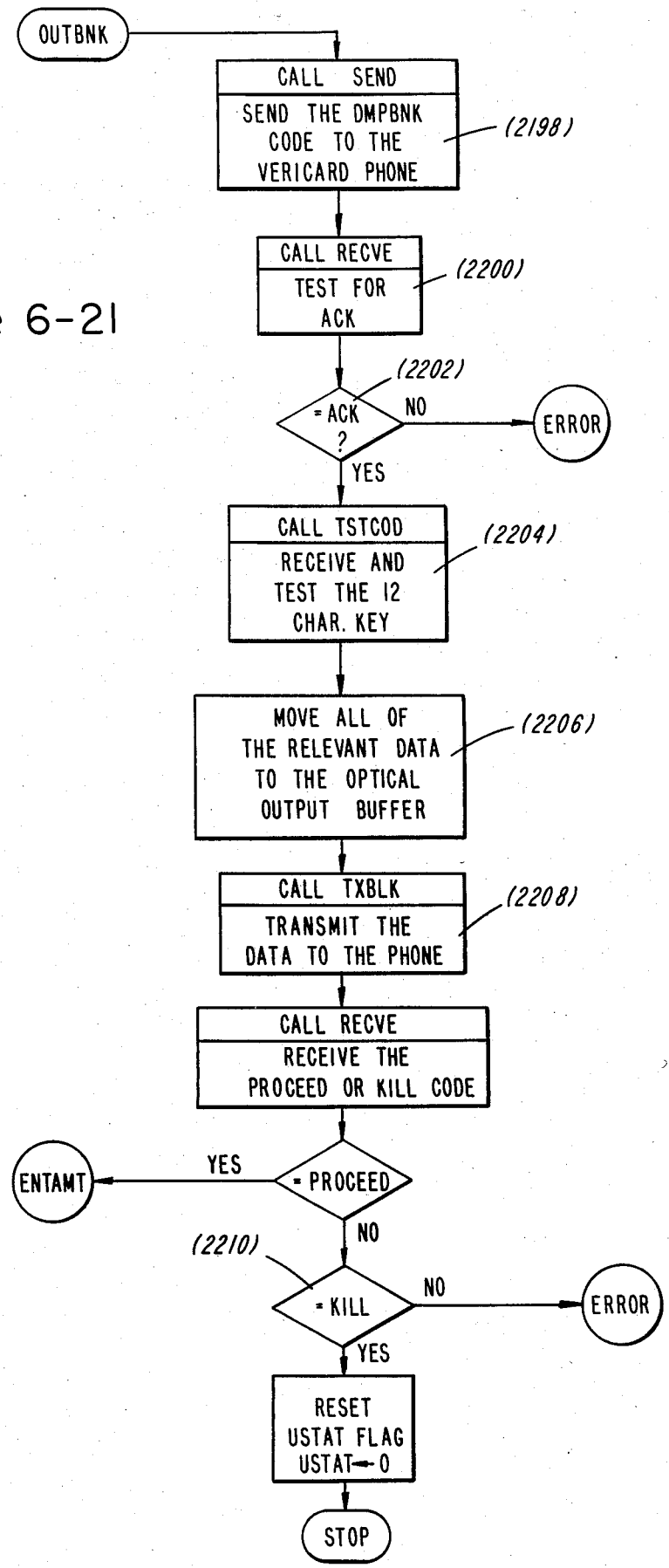
Figures 6, 7, 8, 9, 10, 11, 12, 13, 14, 15, 16, 17, 18, 19, 20, 21, 22, 22S:
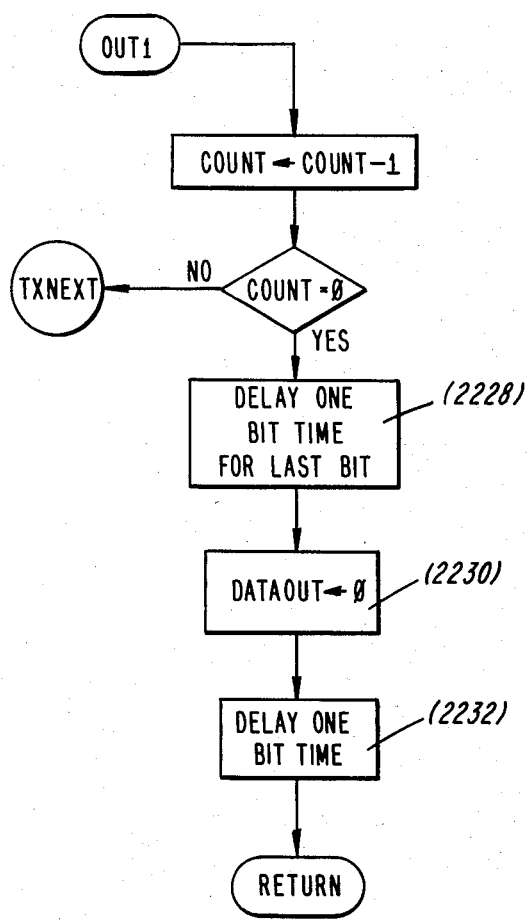
Figures 6, 7, 8, 9, 10, 11, 12, 13, 14, 15, 16, 17, 18, 19, 20, 21, 22, 23, 23S:
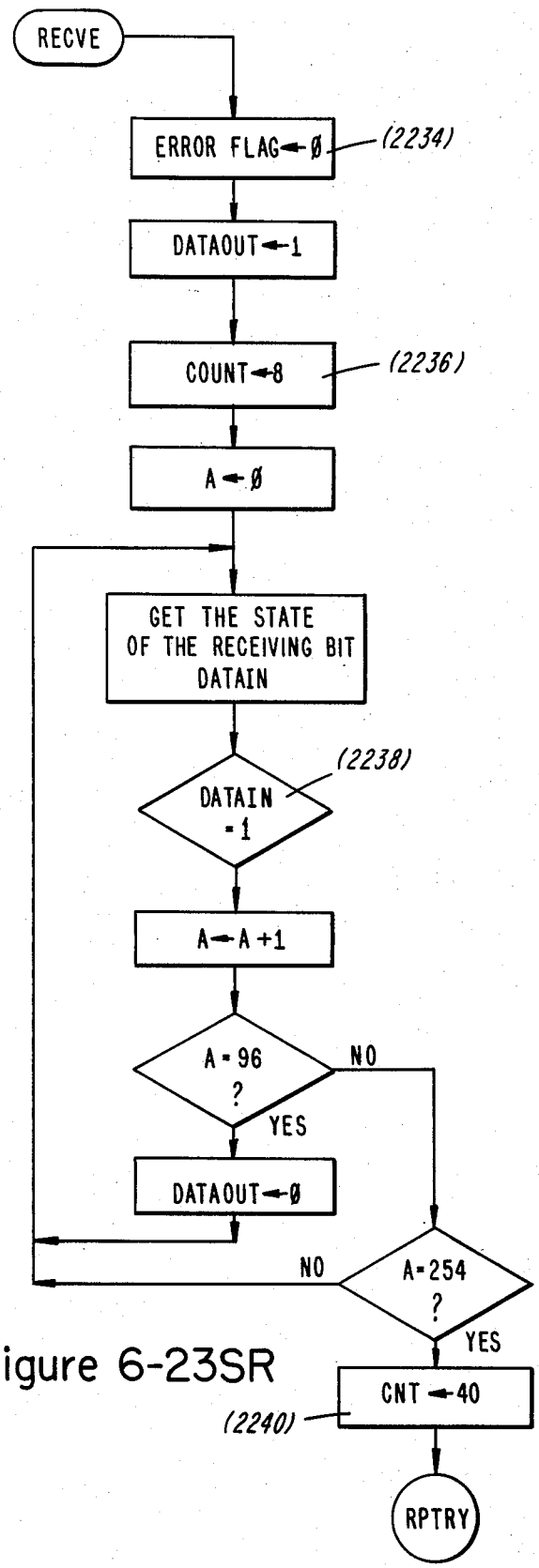
Figures 6, 7, 8, 9, 10, 11, 12, 13, 14, 15, 16, 17, 18, 19, 20, 21, 22, 23, 24, 24S:
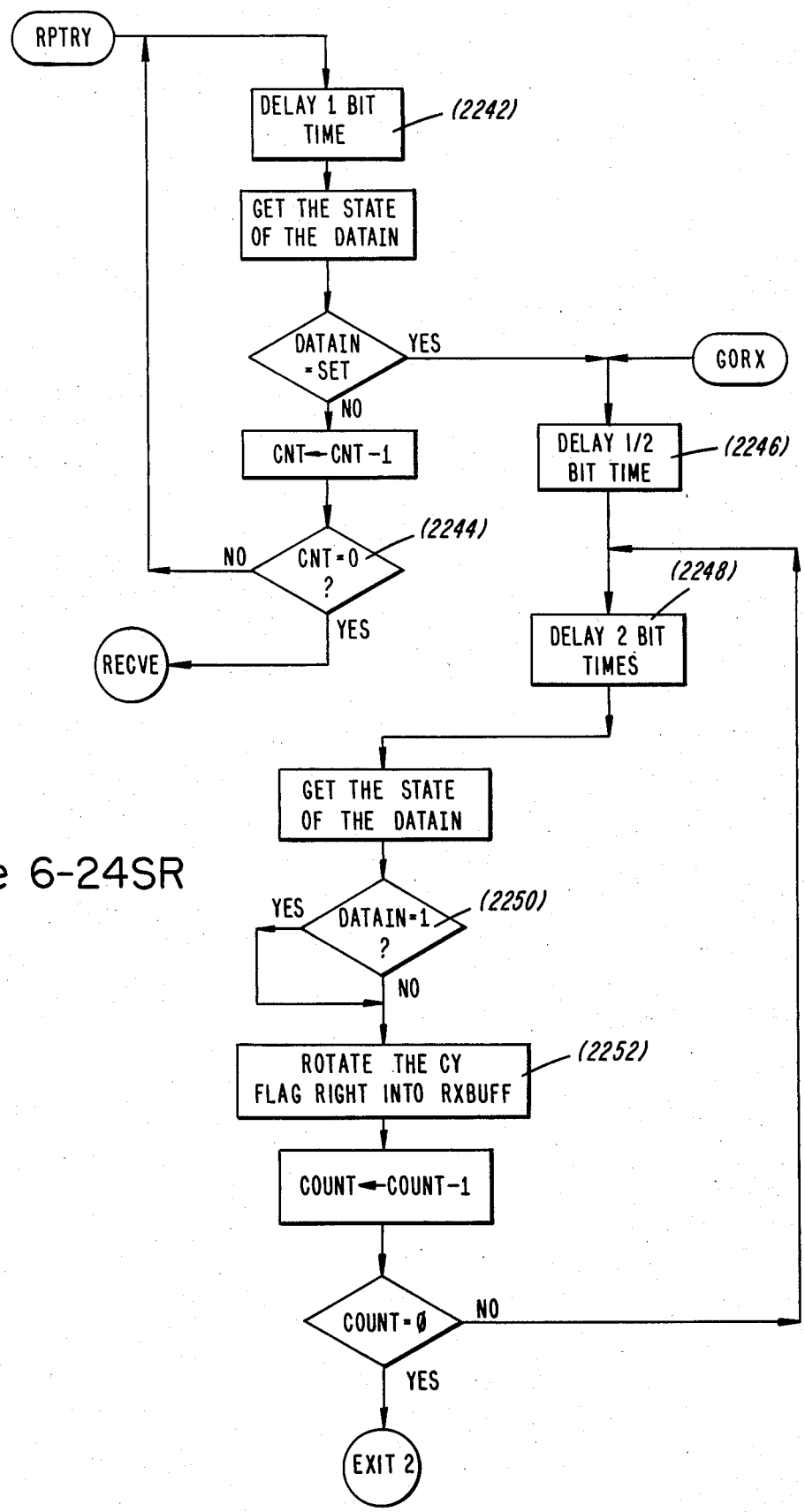
Figures 6, 7, 8, 9, 10, 11, 12, 13, 14, 15, 16, 17, 18, 19, 20, 21, 22, 23, 24, 25, 25S:
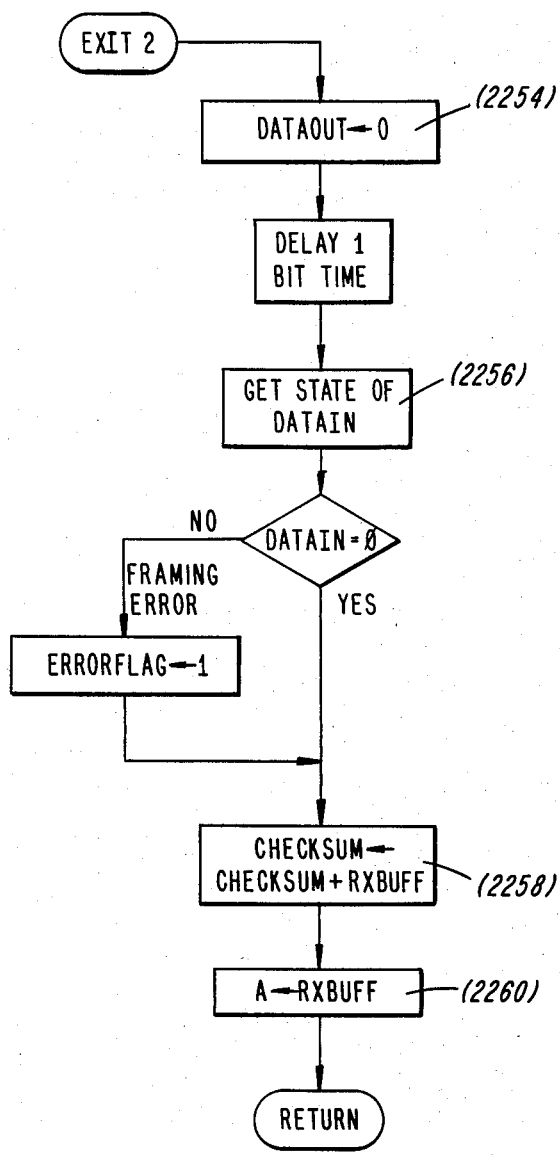
Figures 1, 7:
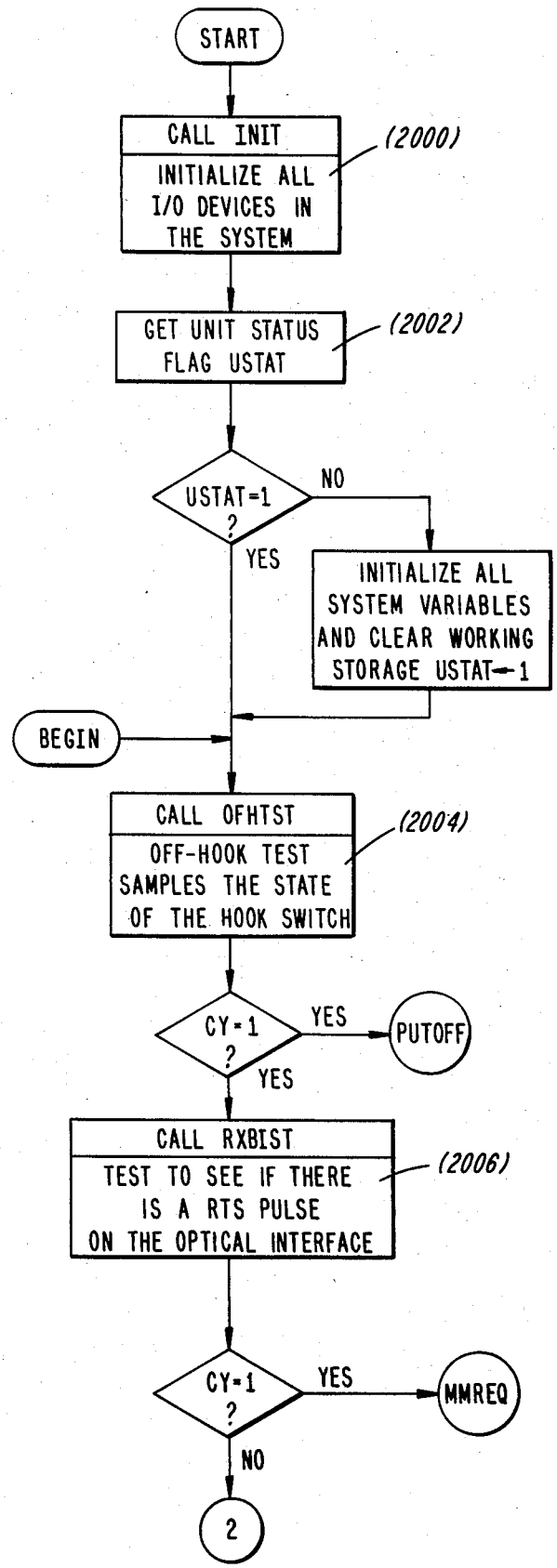
Figures 2, 3, 7:
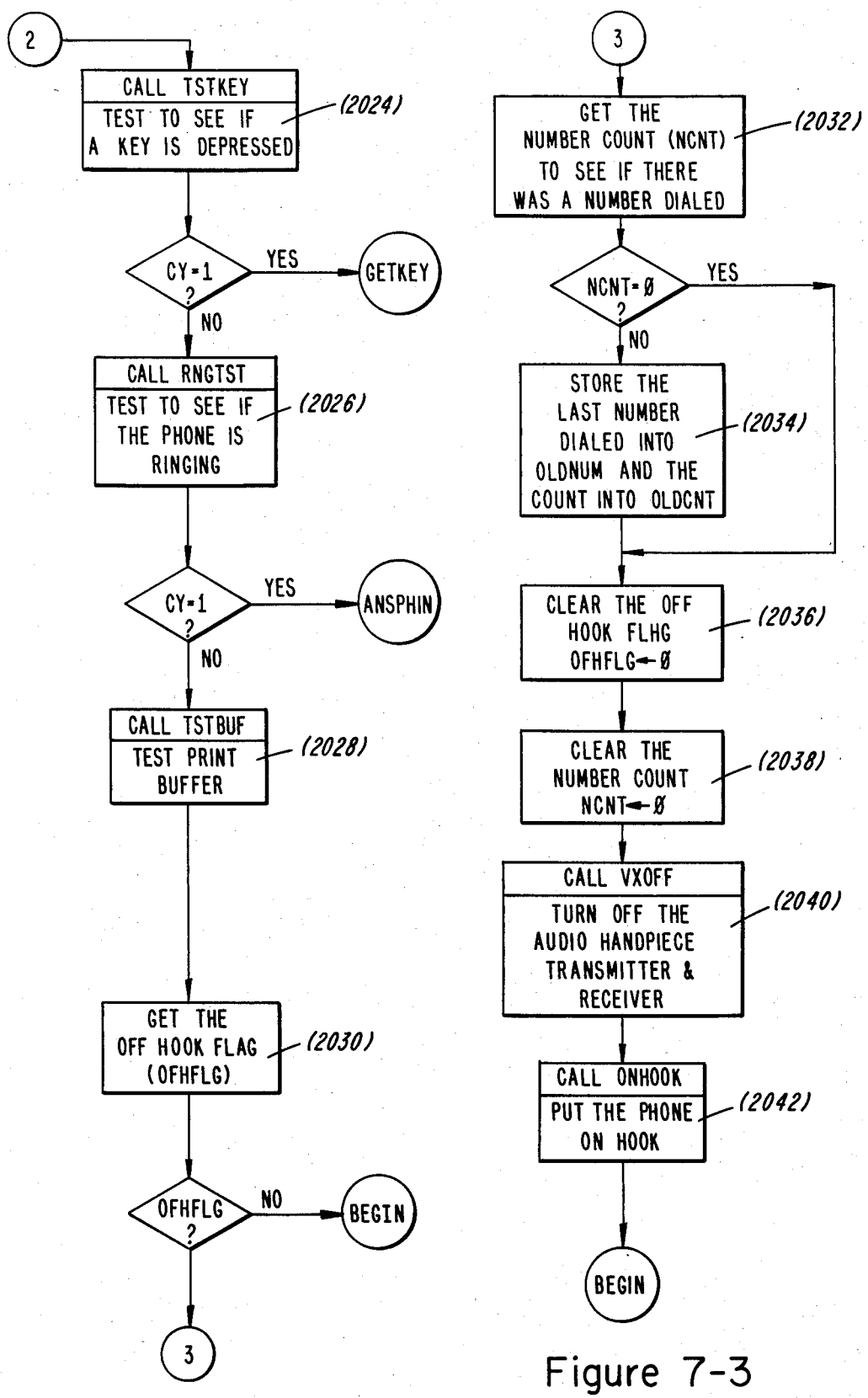
Figures 4, 7:
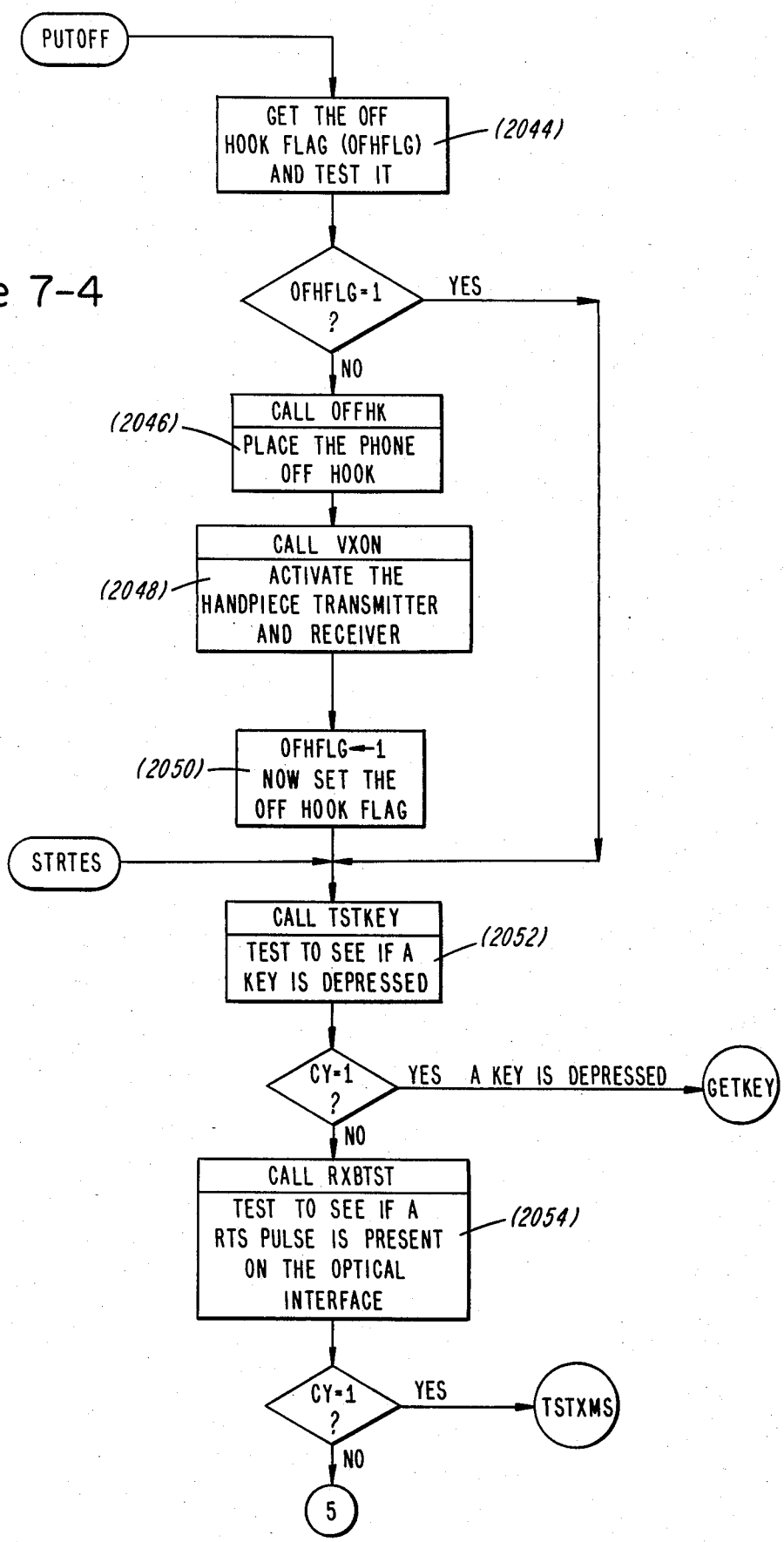
Figures 5, 7:
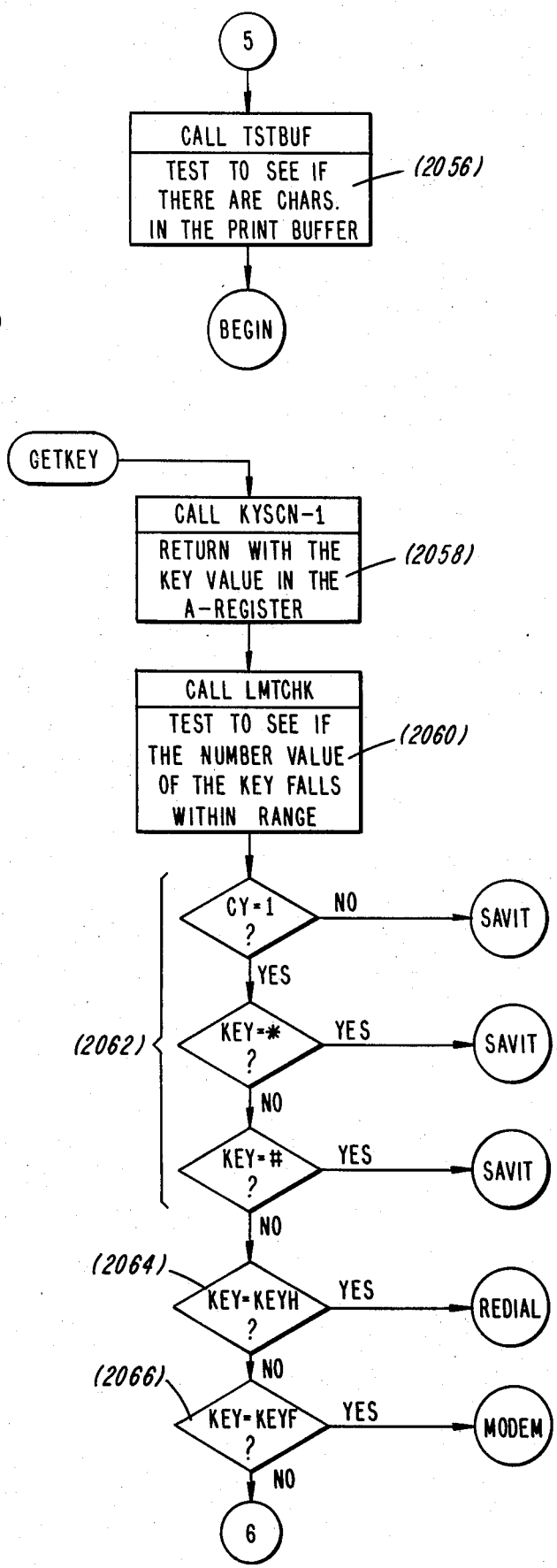
Figures 6, 7:
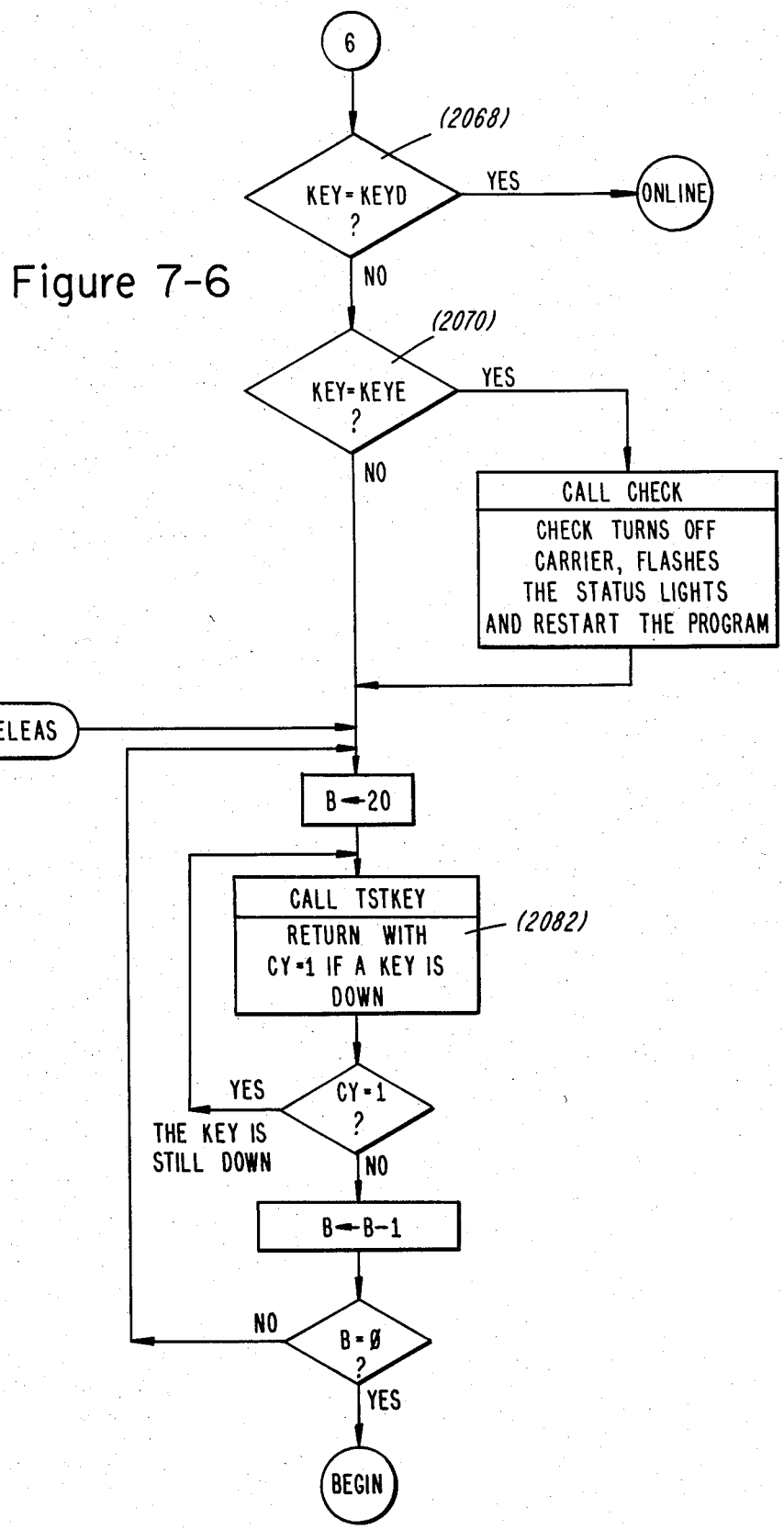
Figures 7, 8:
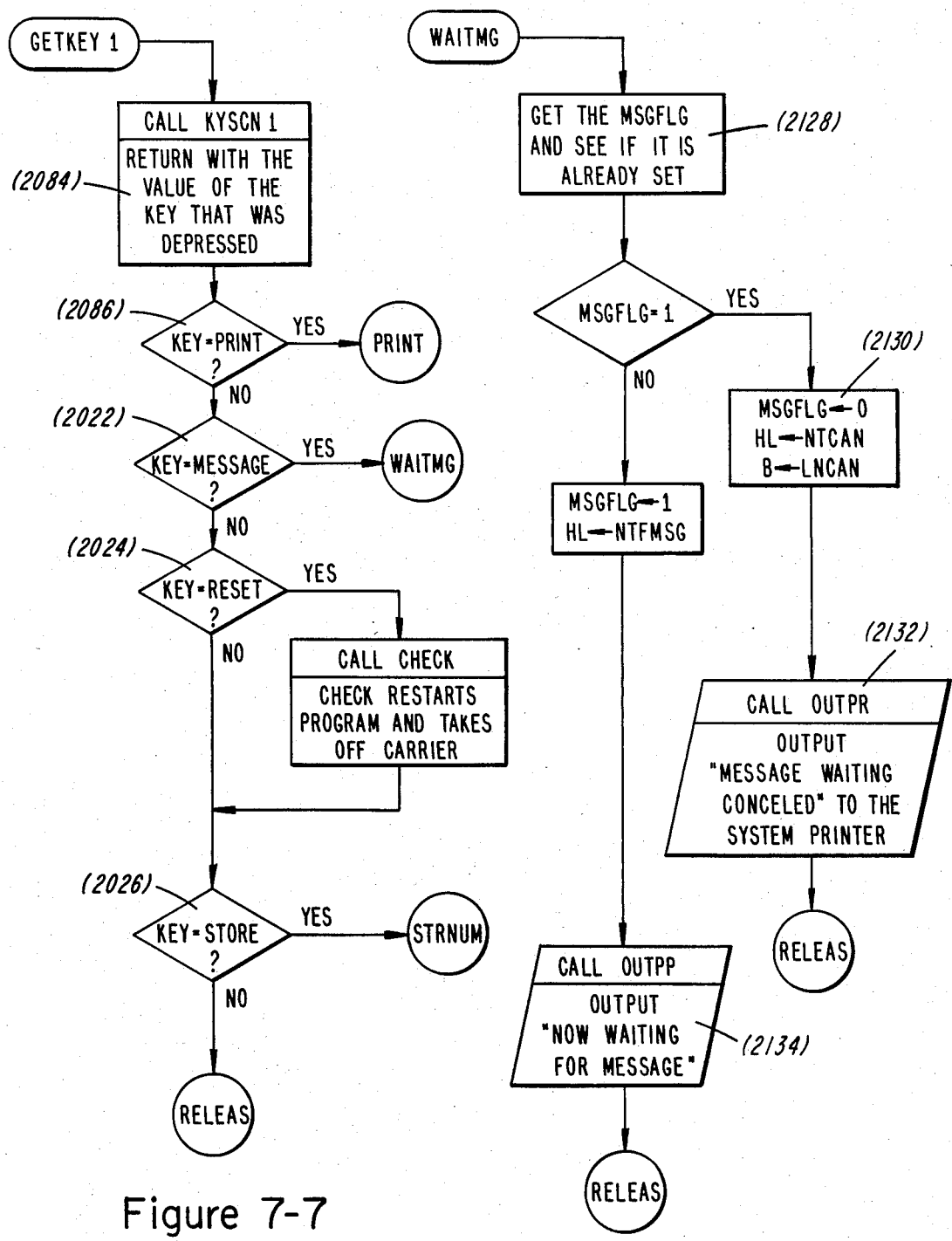
Figures 7, 8, 9, 10:
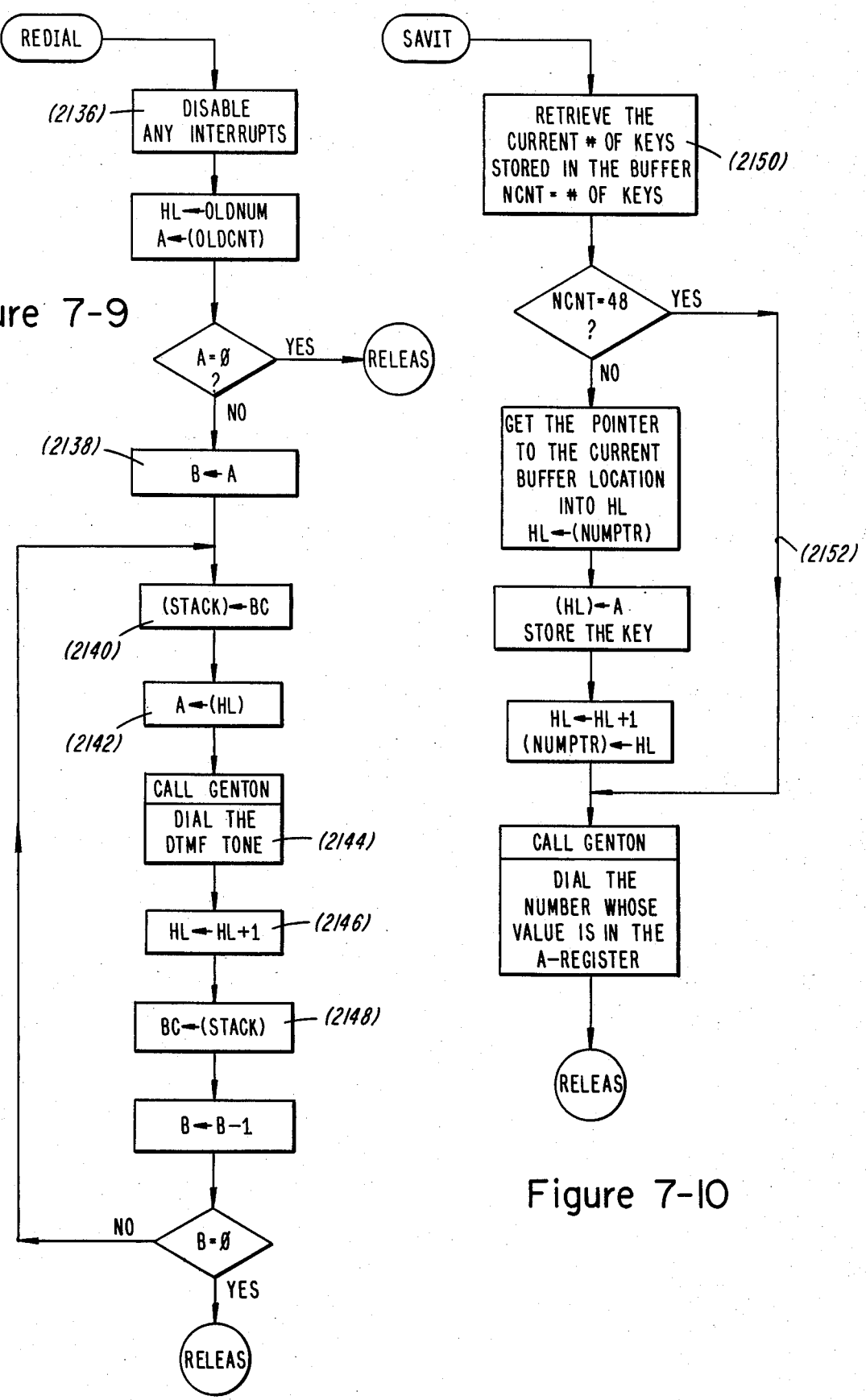
Figures 7, 8, 9, 10, 11:
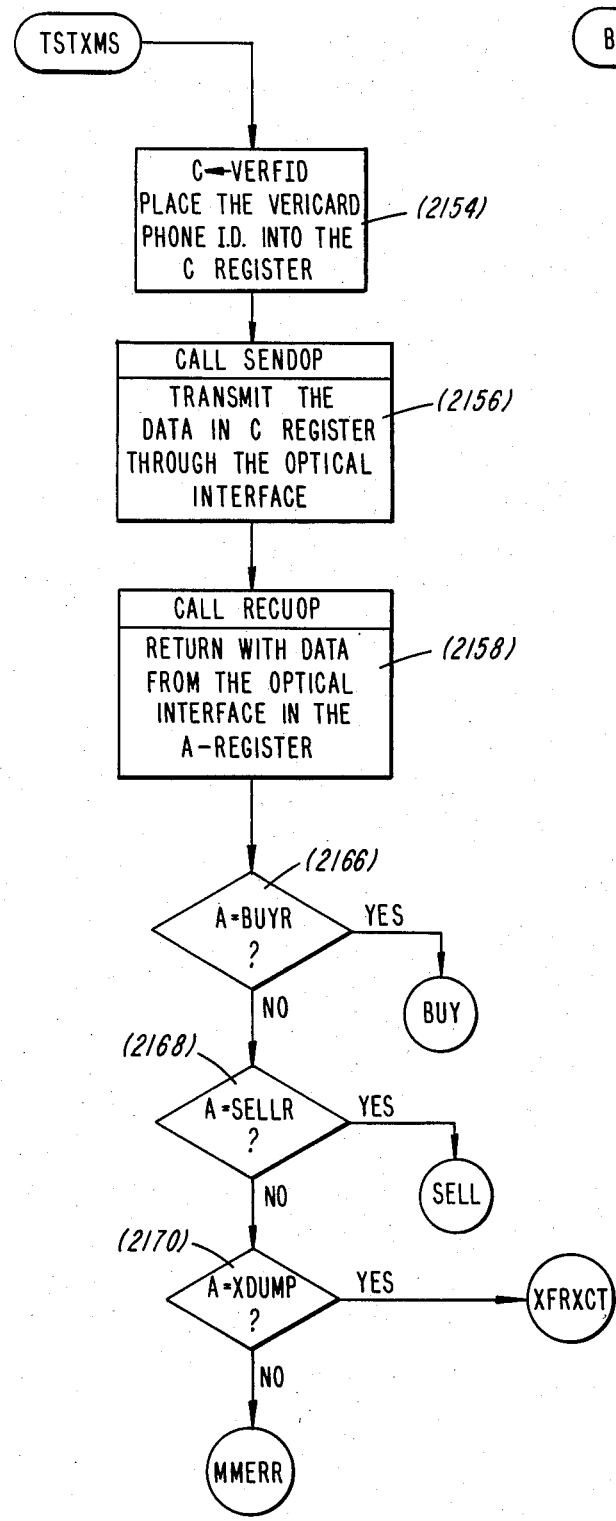
Figures 7, 8, 9, 10, 11, 12:
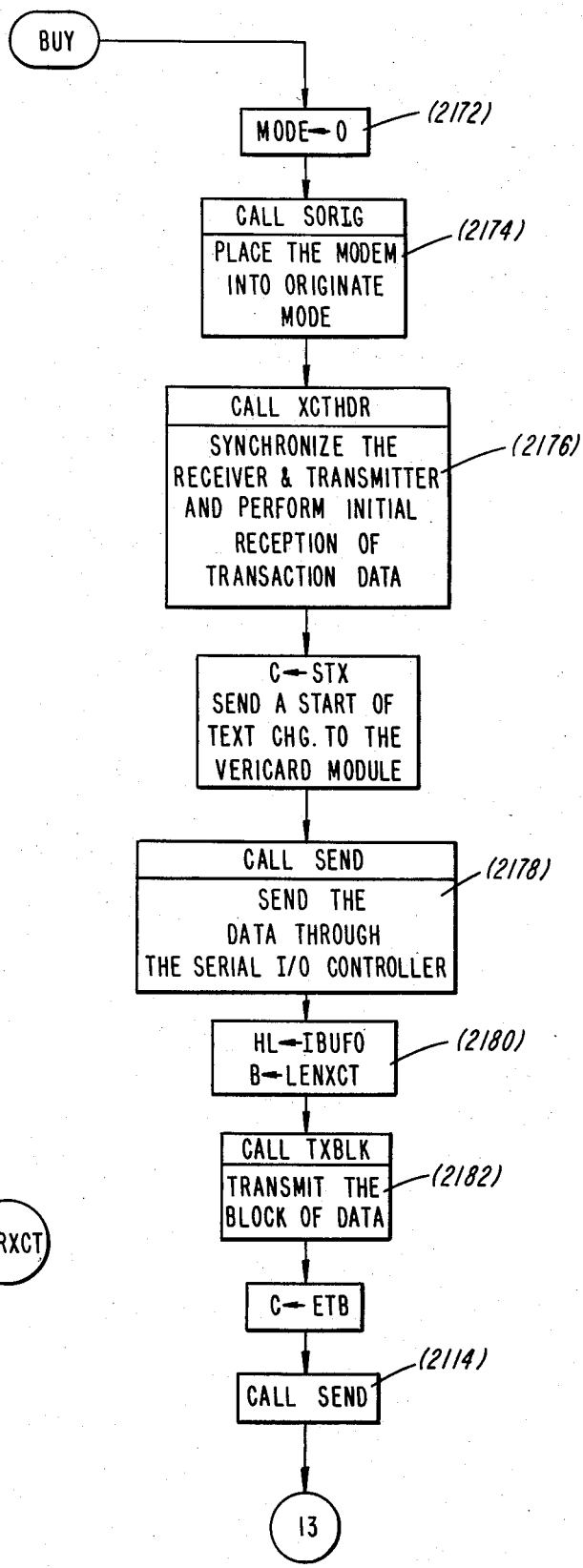
Figures 7, 8, 9, 10, 11, 12, 13:
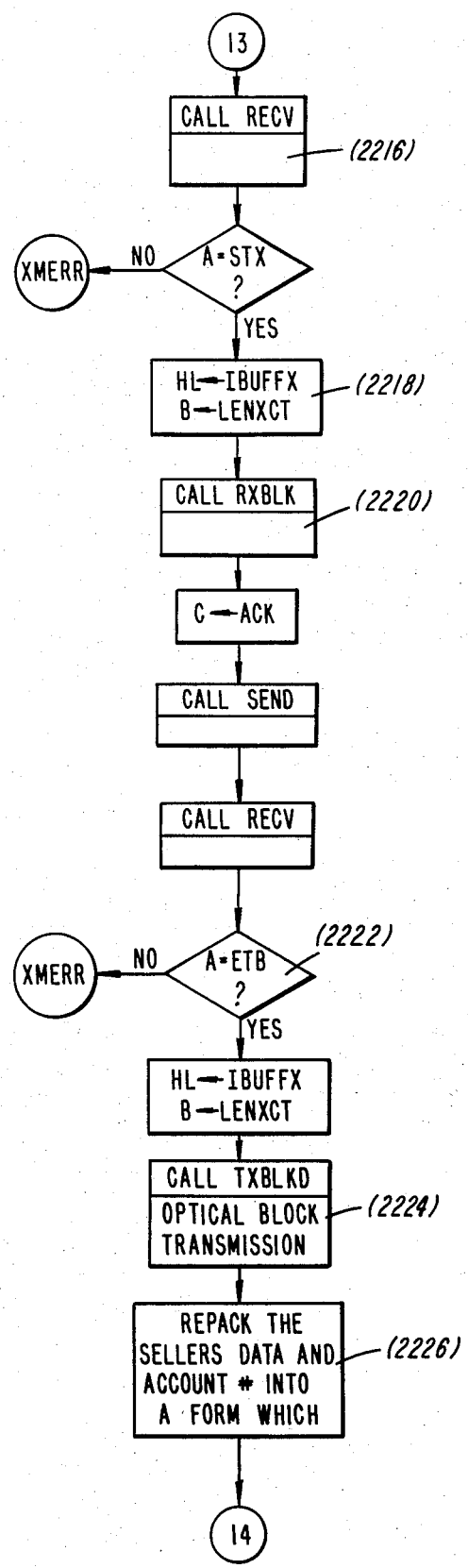
Figures 7, 8, 9, 10, 11, 12, 13, 14:
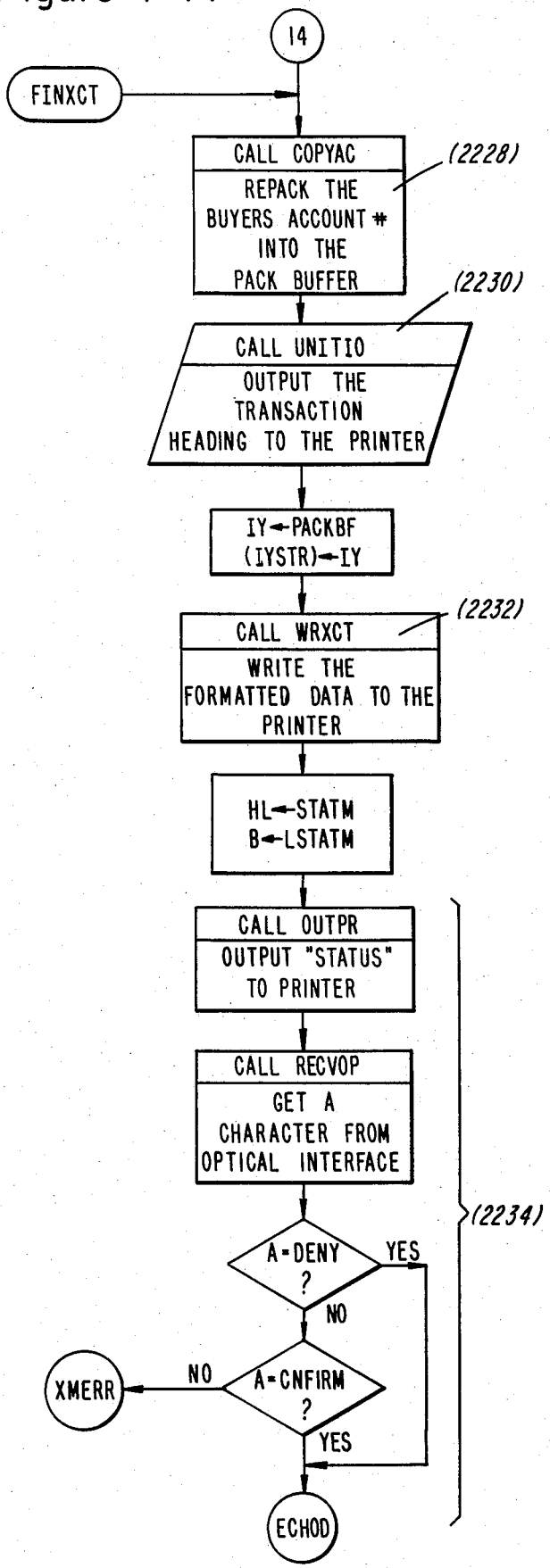
Figures 7, 8, 9, 10, 11, 12, 13, 14, 15:
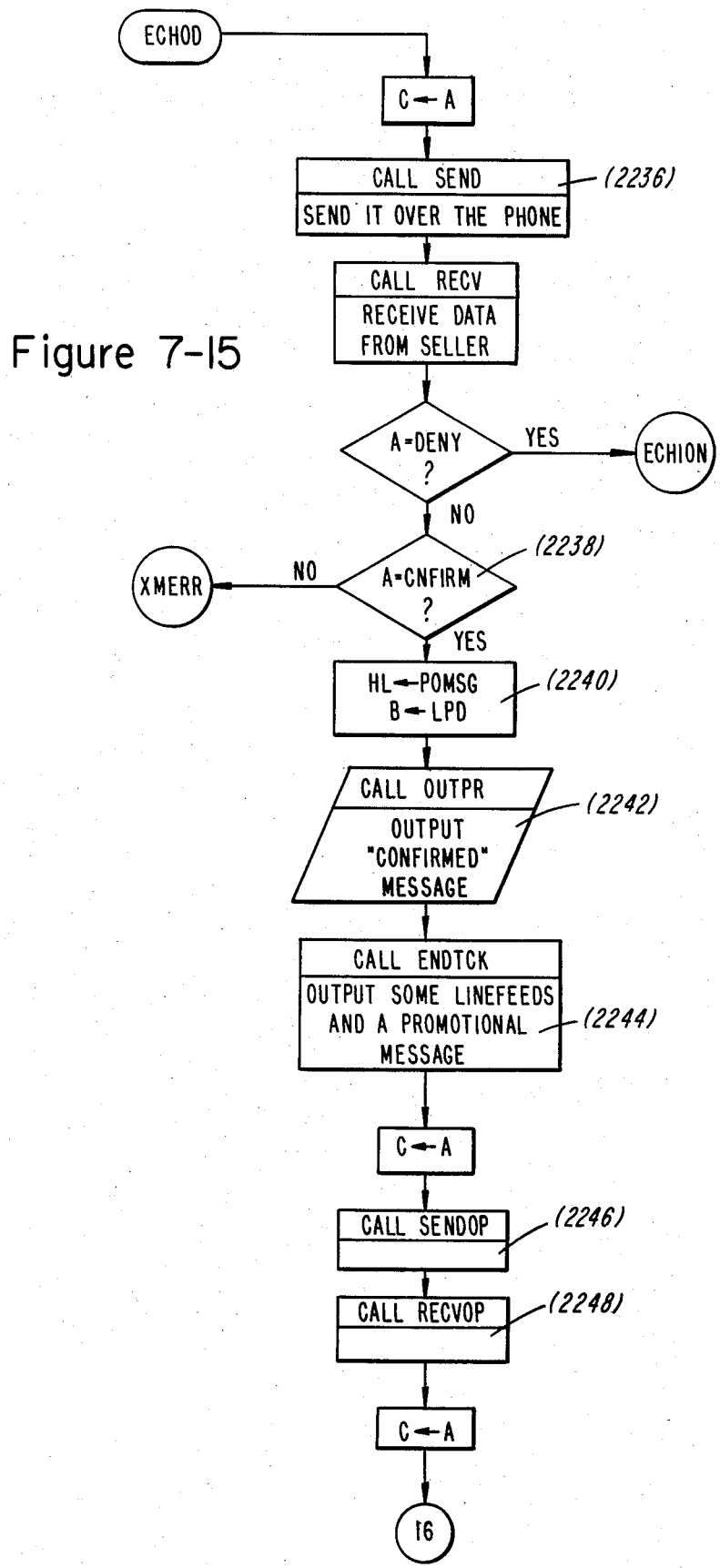
Figures 7, 8, 9, 10, 11, 12, 13, 14, 15, 16:
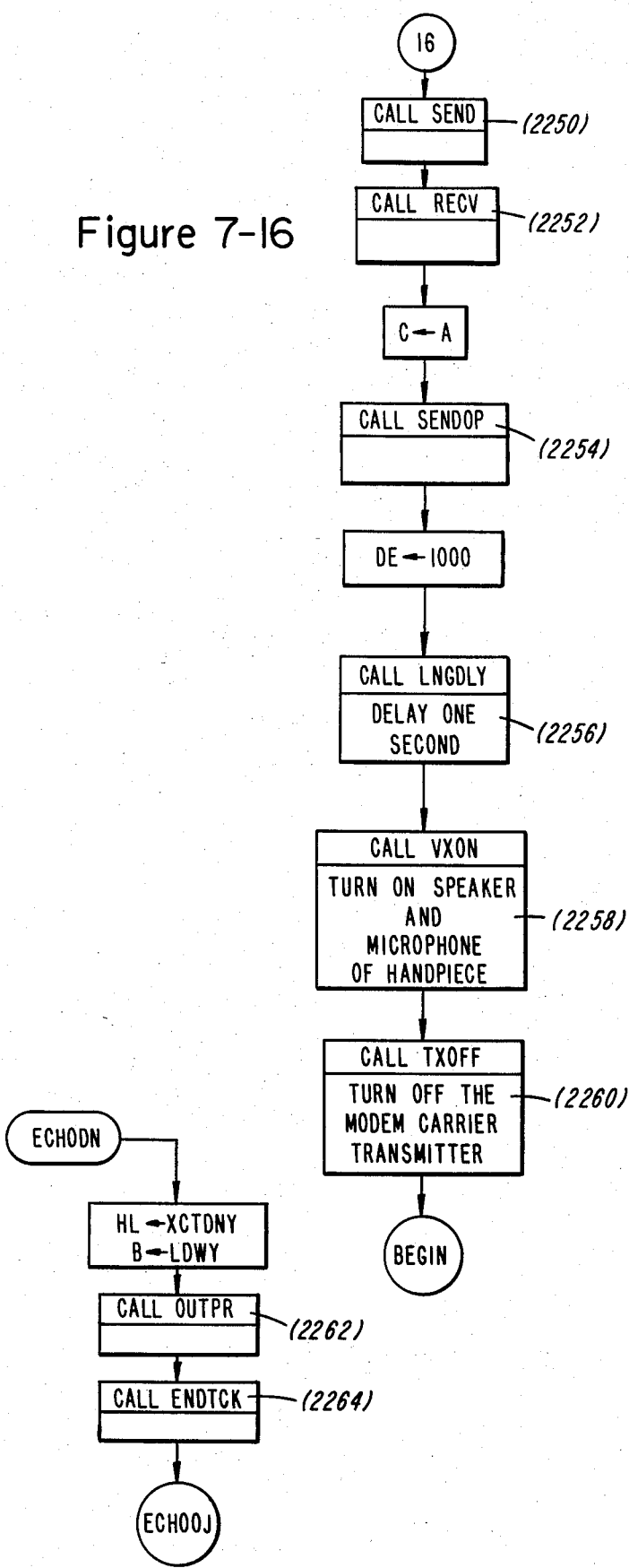
Figures 7, 8, 9, 10, 11, 12, 13, 14, 15, 16, 17, 18, 19:
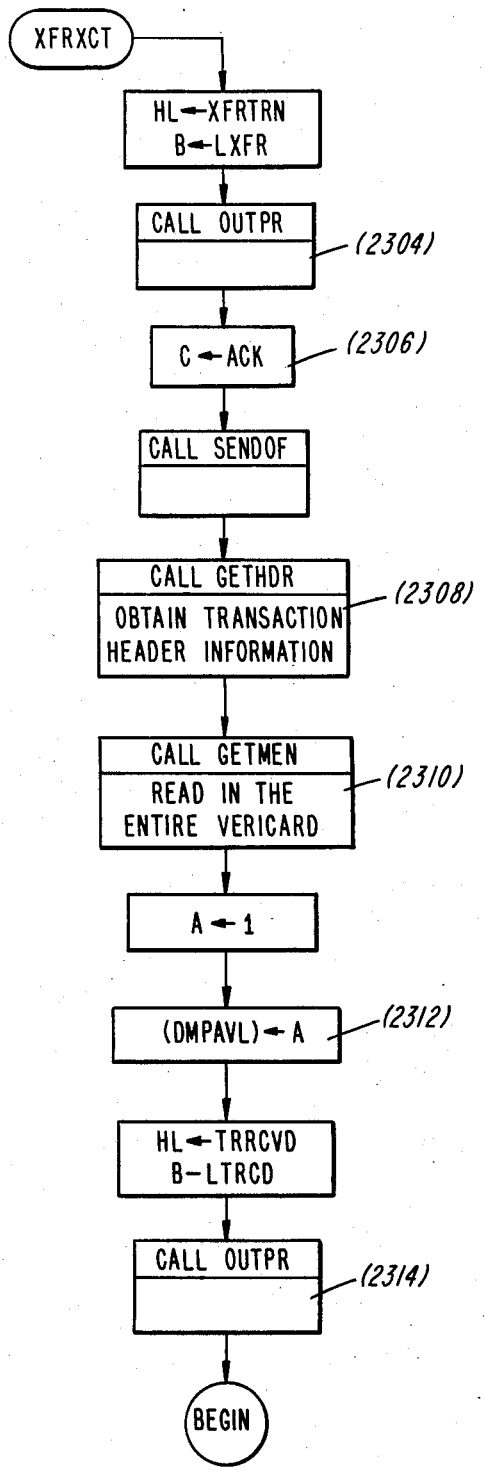
Figures 7, 8, 9, 10, 11, 12, 13, 14, 15, 16, 17, 18, 19, 20:
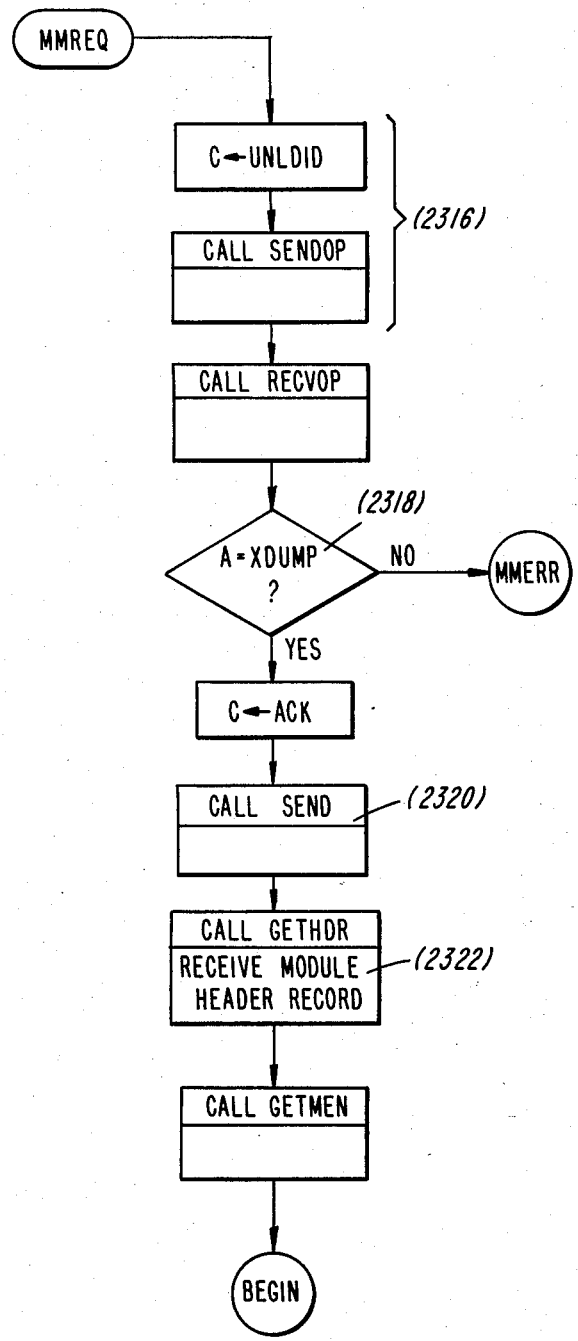
Figures 7, 8, 9, 10, 11, 12, 13, 14, 15, 16, 17, 18, 19, 20, 21:
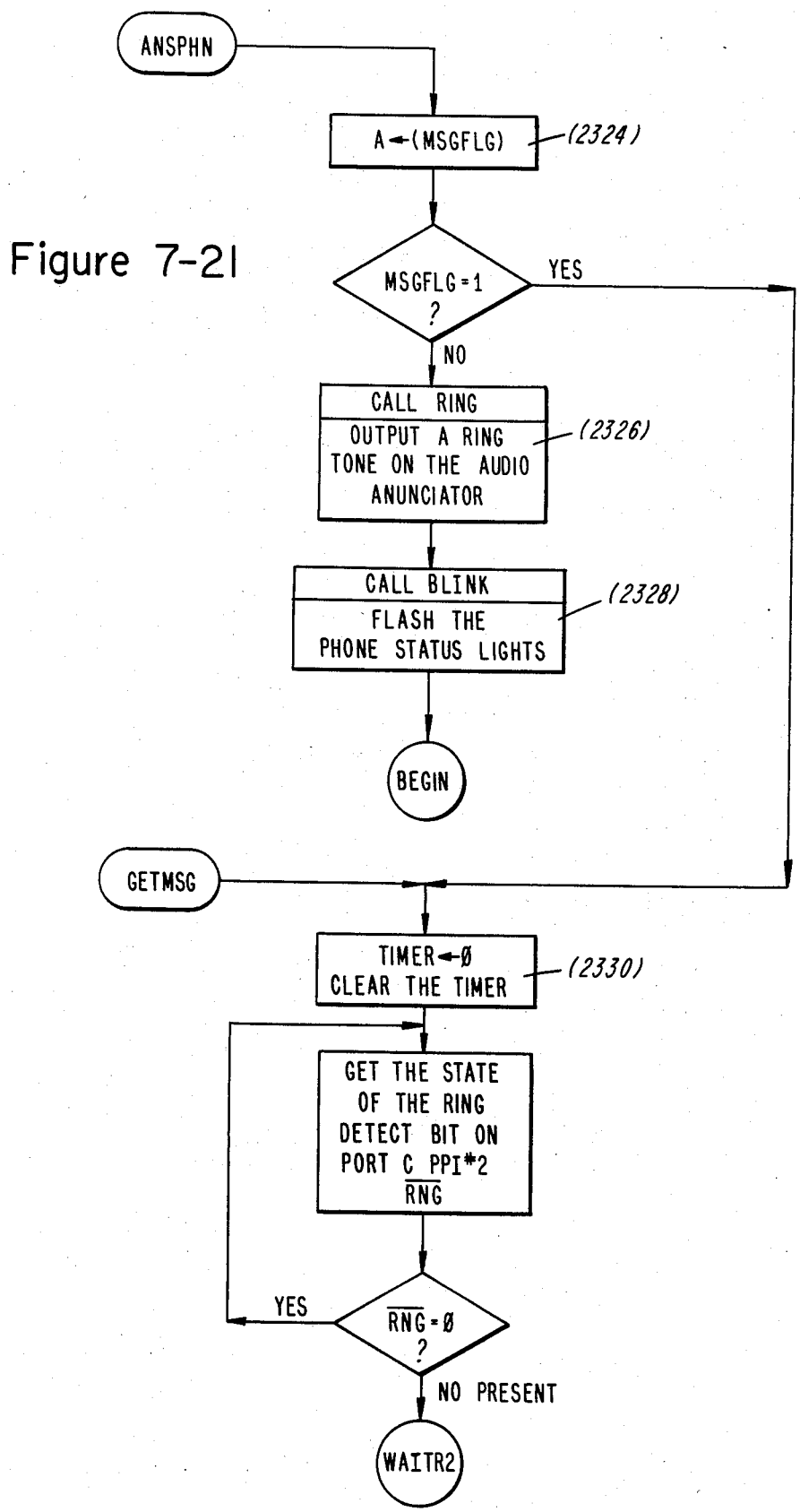
Figures 7, 8, 9, 10, 11, 12, 13, 14, 15, 16, 17, 18, 19, 20, 21, 22:
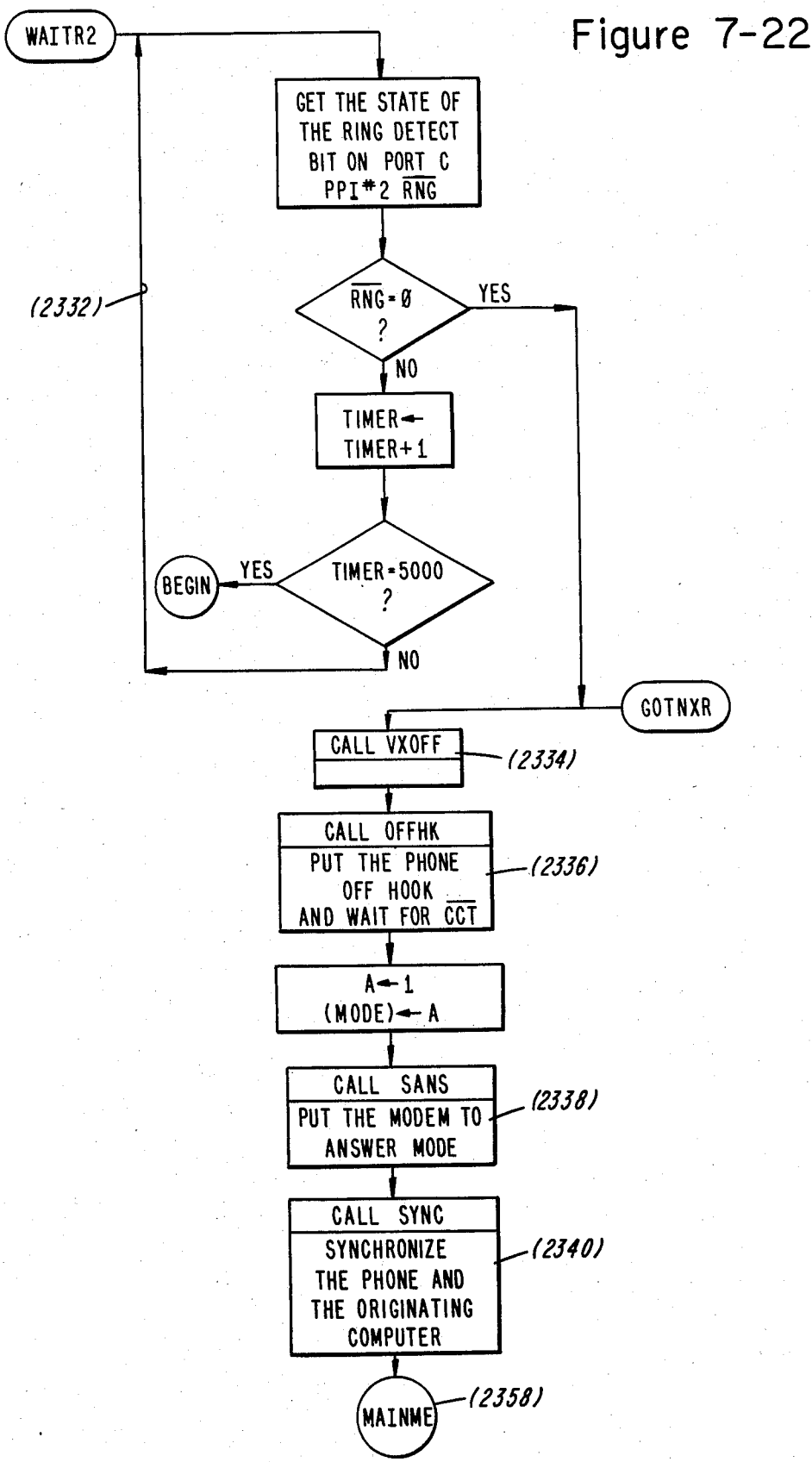
Figures 7, 8, 9, 10, 11, 12, 13, 14, 15, 16, 17, 18, 19, 20, 21, 22, 23:
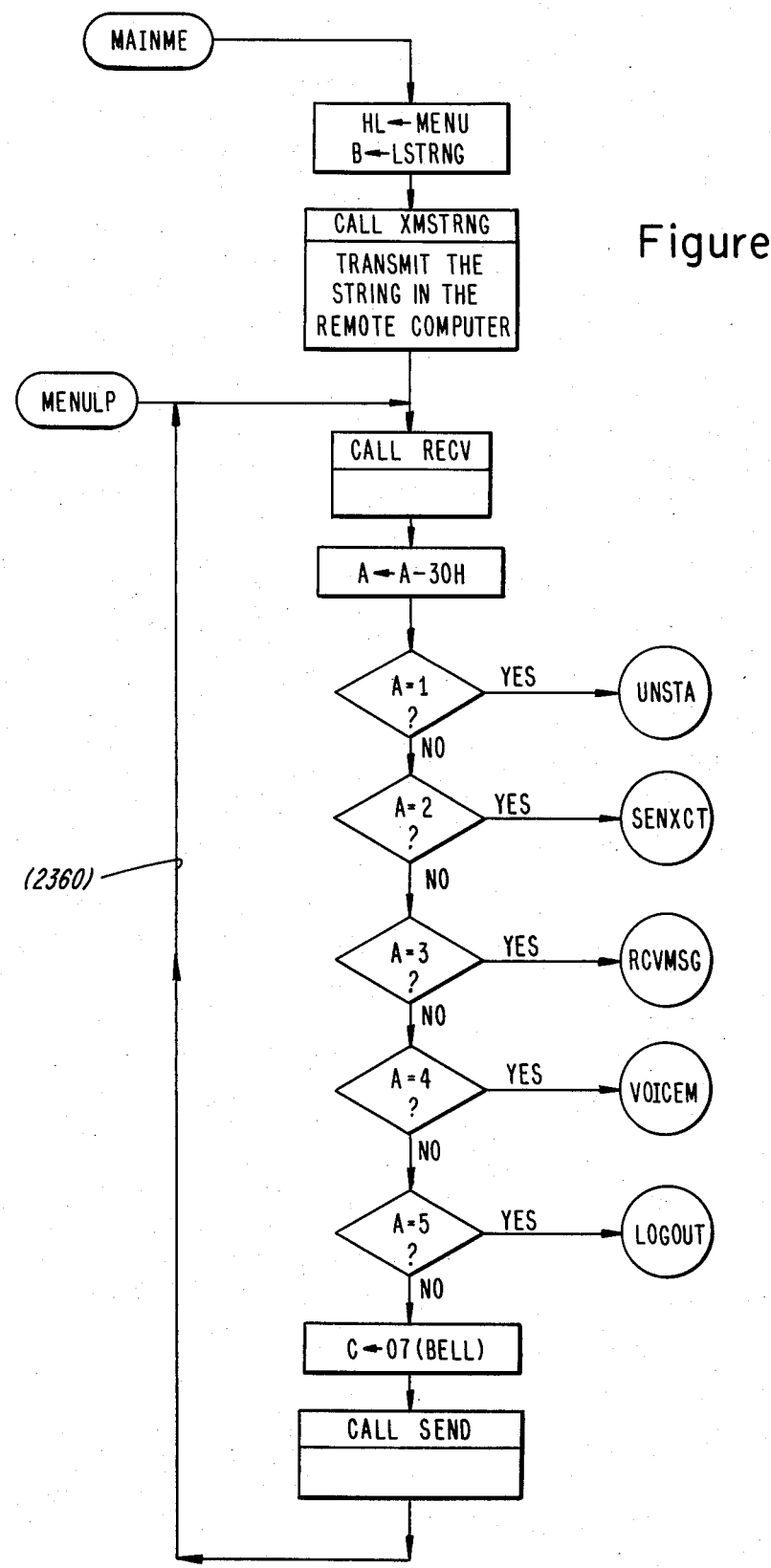
Figures 7, 8, 9, 10, 11, 12, 13, 14, 15, 16, 17, 18, 19, 20, 21, 22, 23, 24:
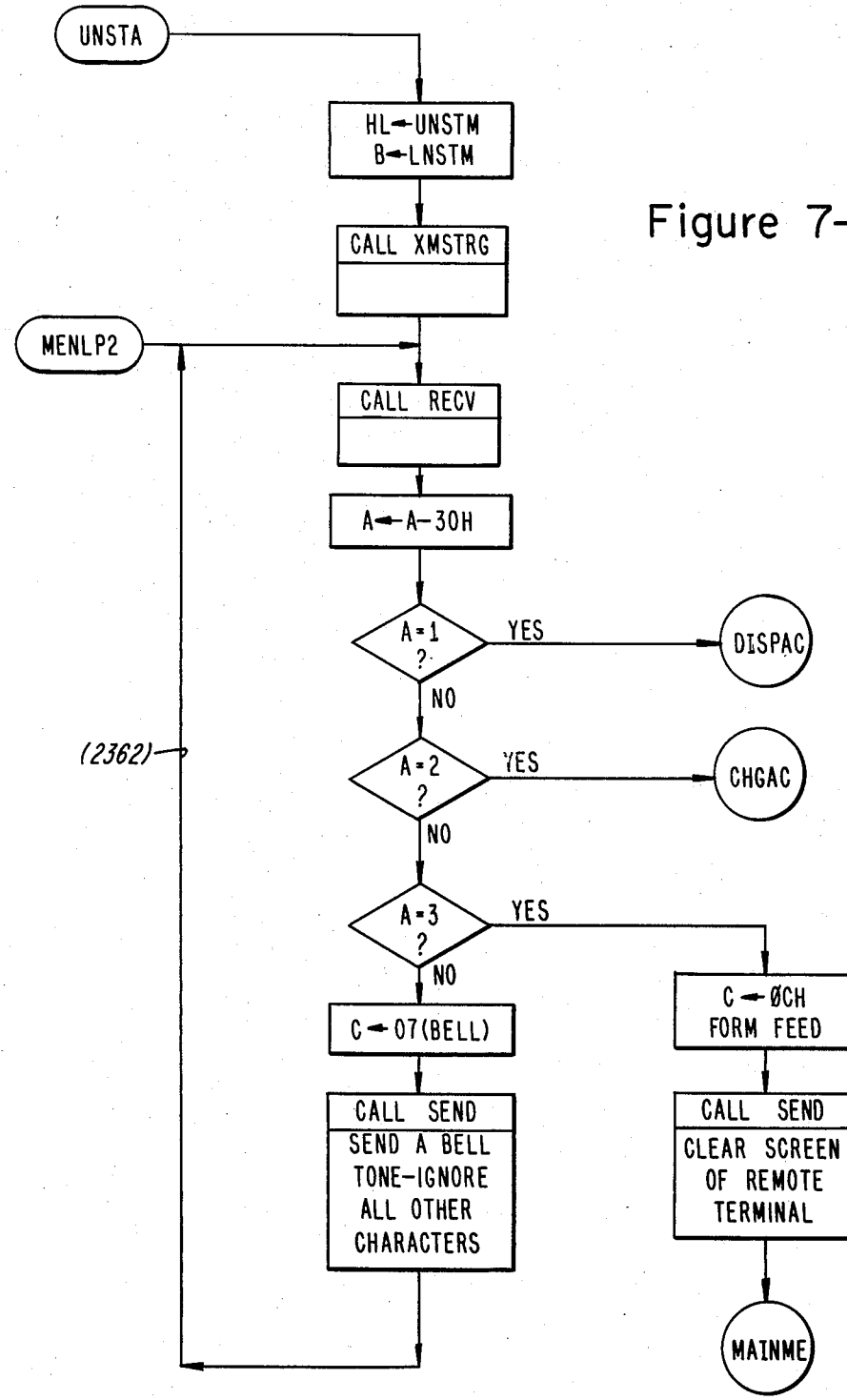
Figures 7, 8, 9, 10, 11, 12, 13, 14, 15, 16, 17, 18, 19, 20, 21, 22, 23, 24, 25:
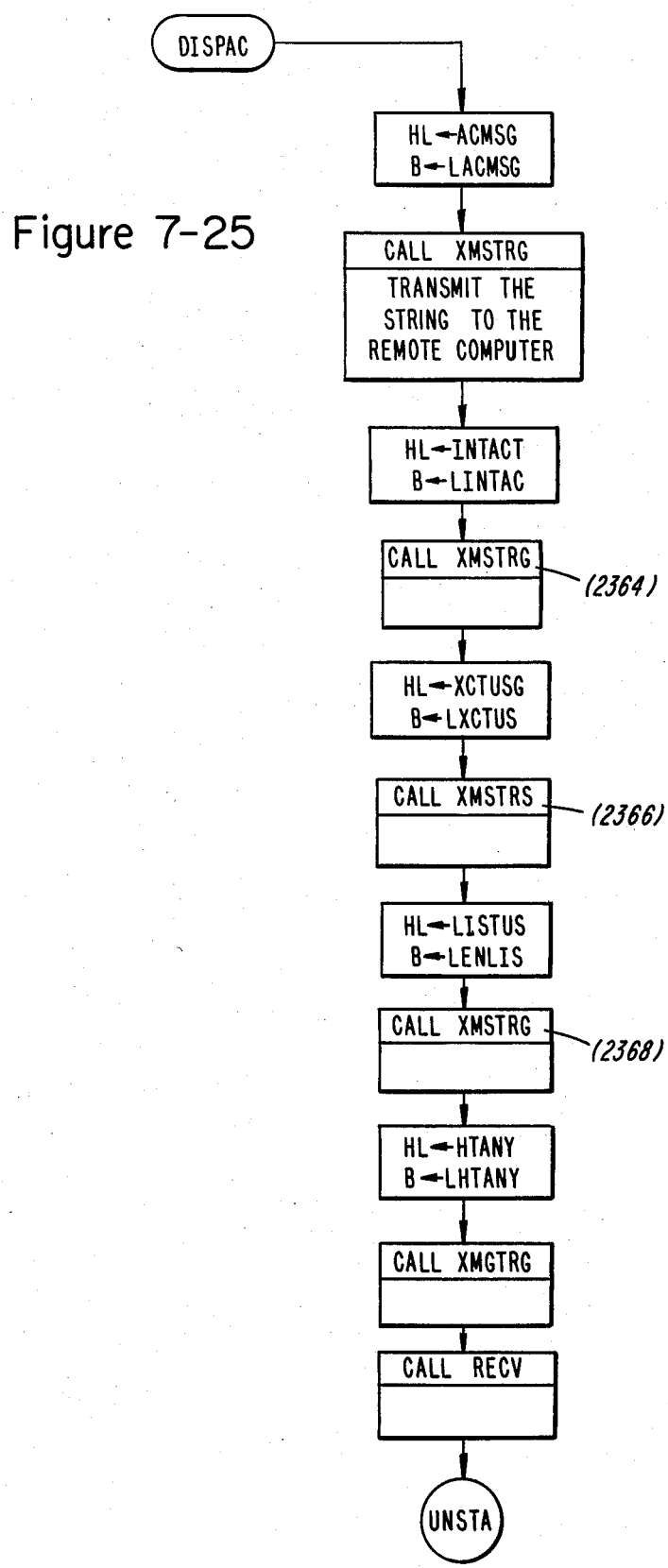
Figures 7, 8, 9, 10, 11, 12, 13, 14, 15, 16, 17, 18, 19, 20, 21, 22, 23, 24, 25, 26:
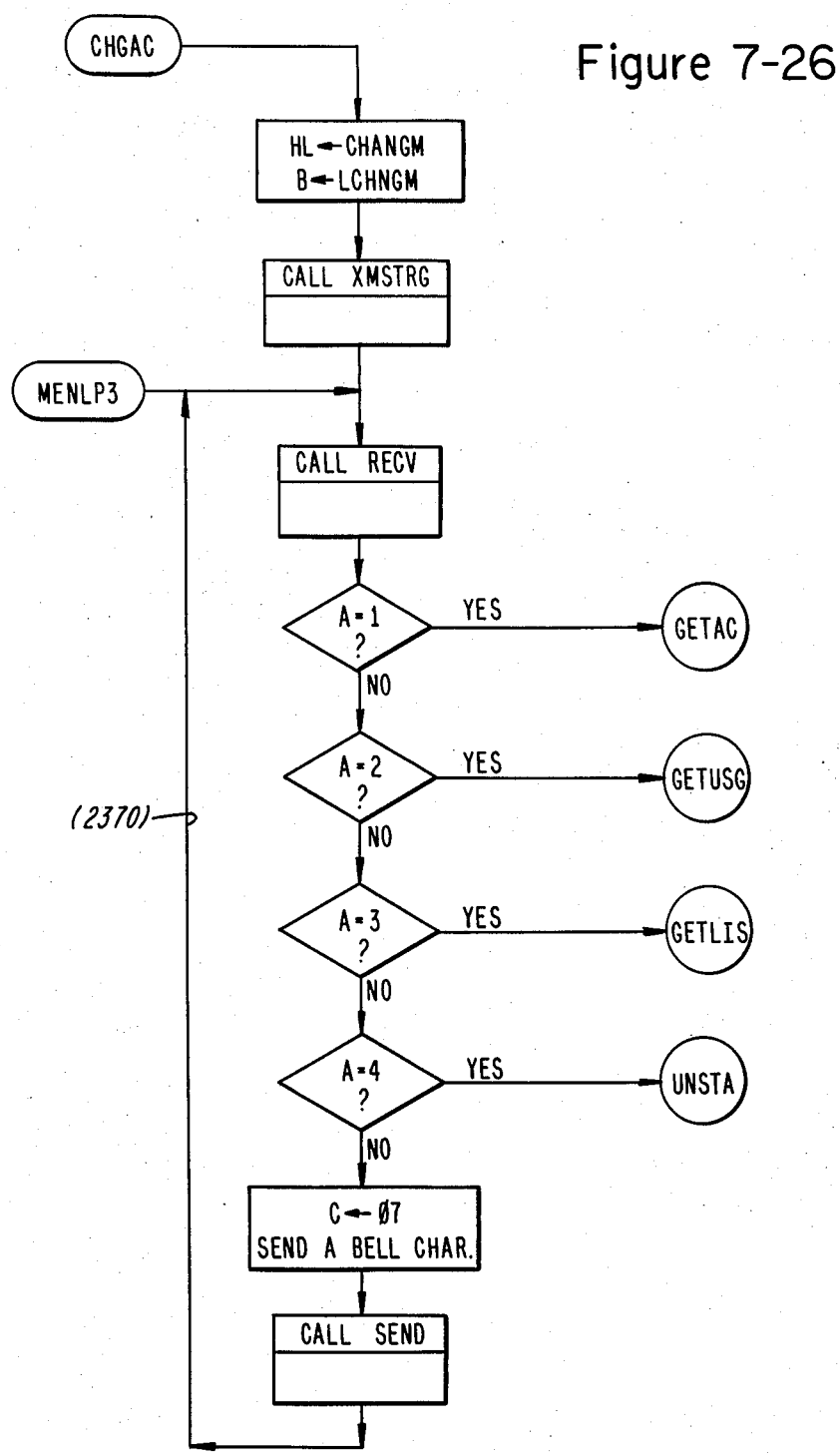
Figures 7, 8, 9, 10, 11, 12, 13, 14, 15, 16, 17, 18, 19, 20, 21, 22, 23, 24, 25, 26, 27:
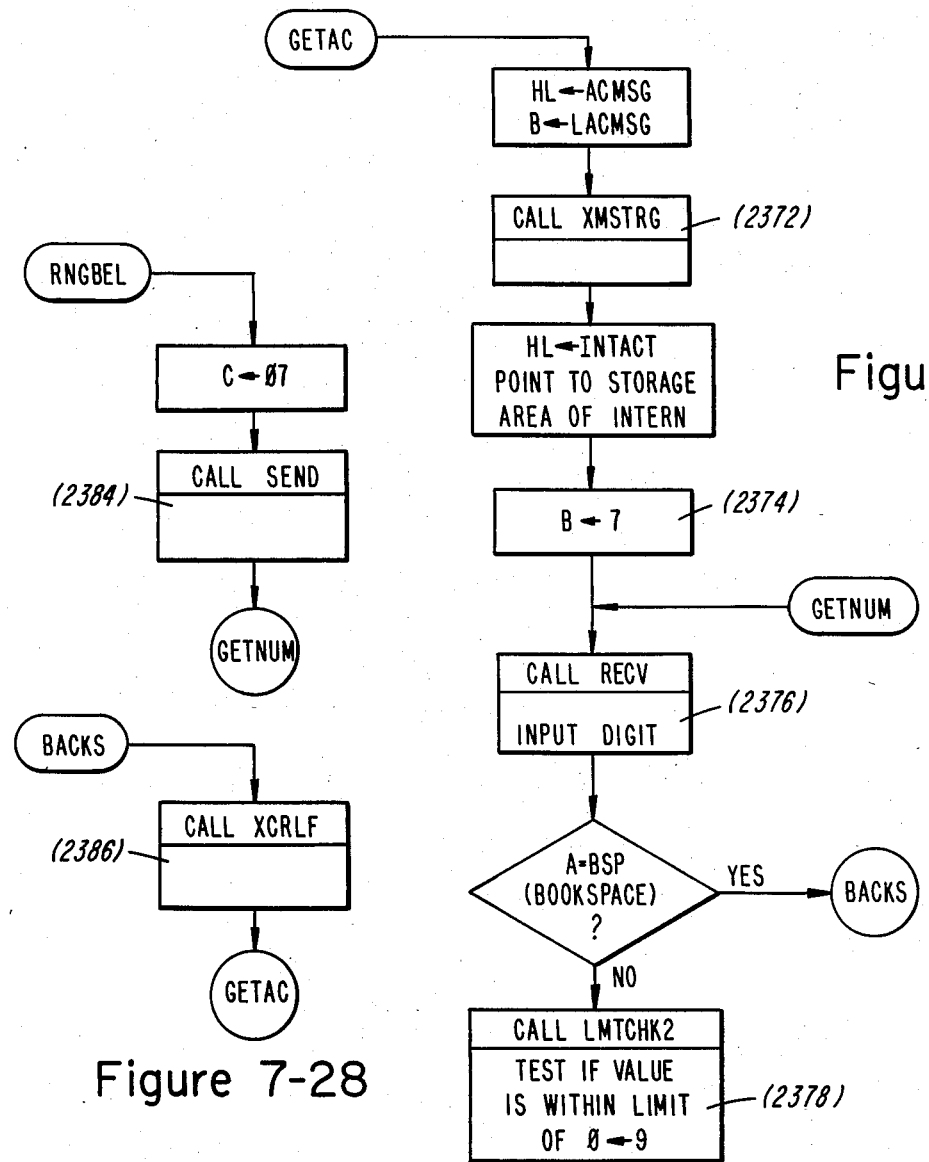
Figures 7, 8, 9, 10, 11, 12, 13, 14, 15, 16, 17, 18, 19, 20, 21, 22, 23, 24, 25, 26, 27, 28:
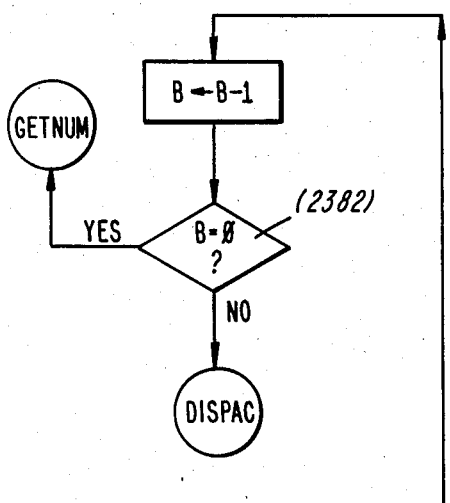
Figures 7, 8, 9, 10, 11, 12, 13, 14, 15, 16, 17, 18, 19, 20, 21, 22, 23, 24, 25, 26, 27, 28, 29:
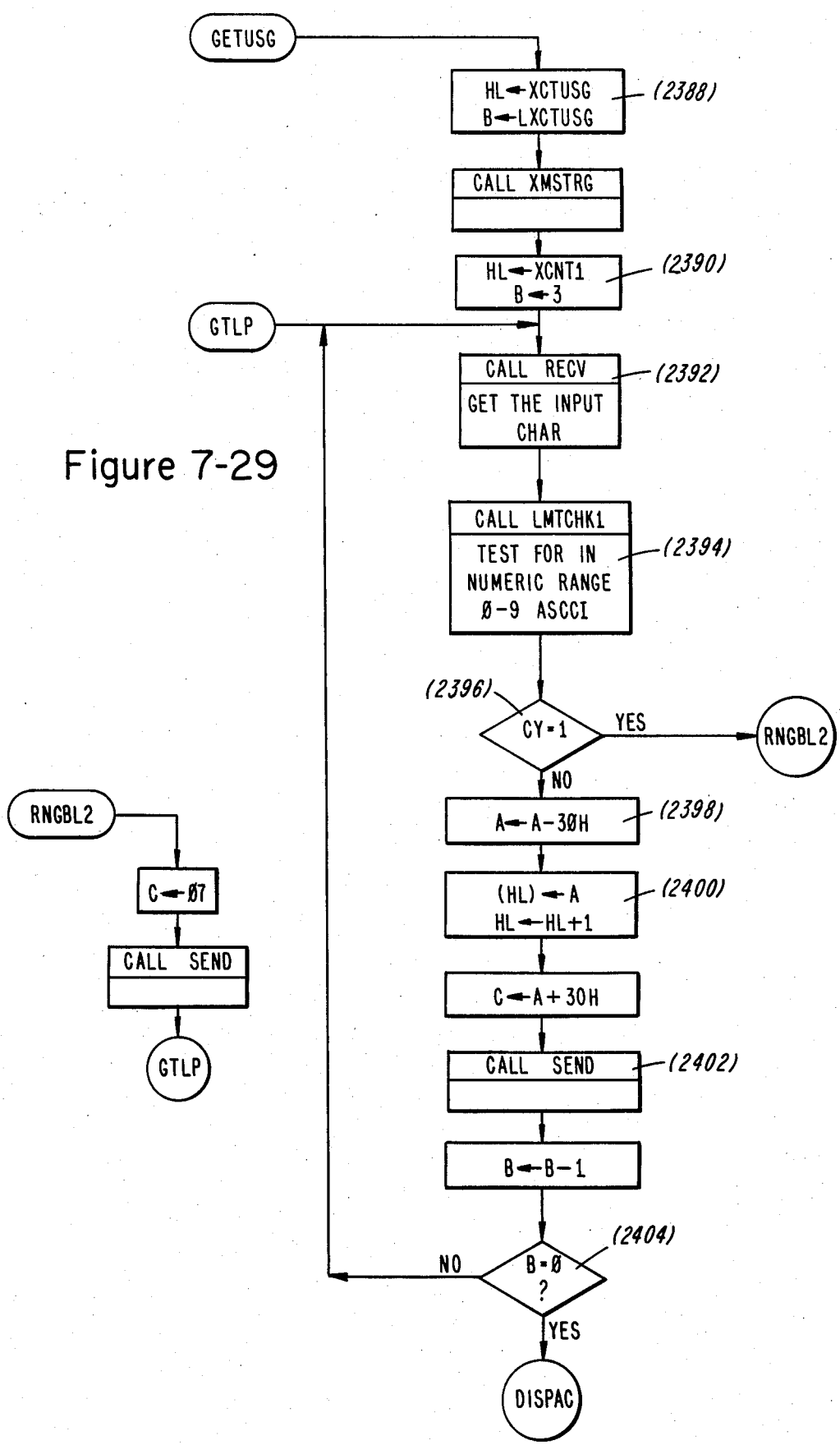
Figures 7, 8, 9, 10, 11, 12, 13, 14, 15, 16, 17, 18, 19, 20, 21, 22, 23, 24, 25, 26, 27, 28, 29, 30:
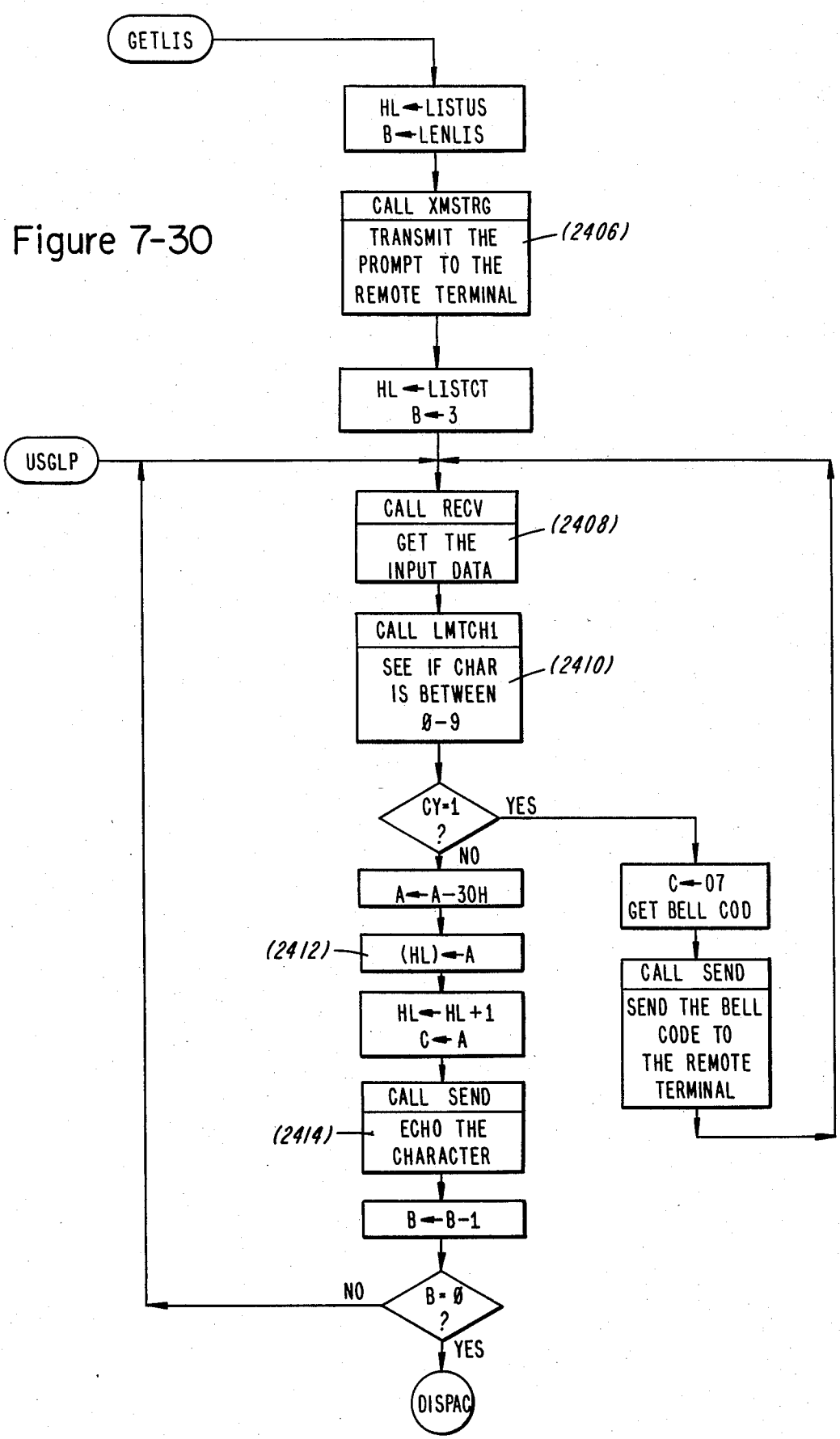
Figures 7, 8, 9, 10, 11, 12, 13, 14, 15, 16, 17, 18, 19, 20, 21, 22, 23, 24, 25, 26, 27, 28, 29, 30, 31:
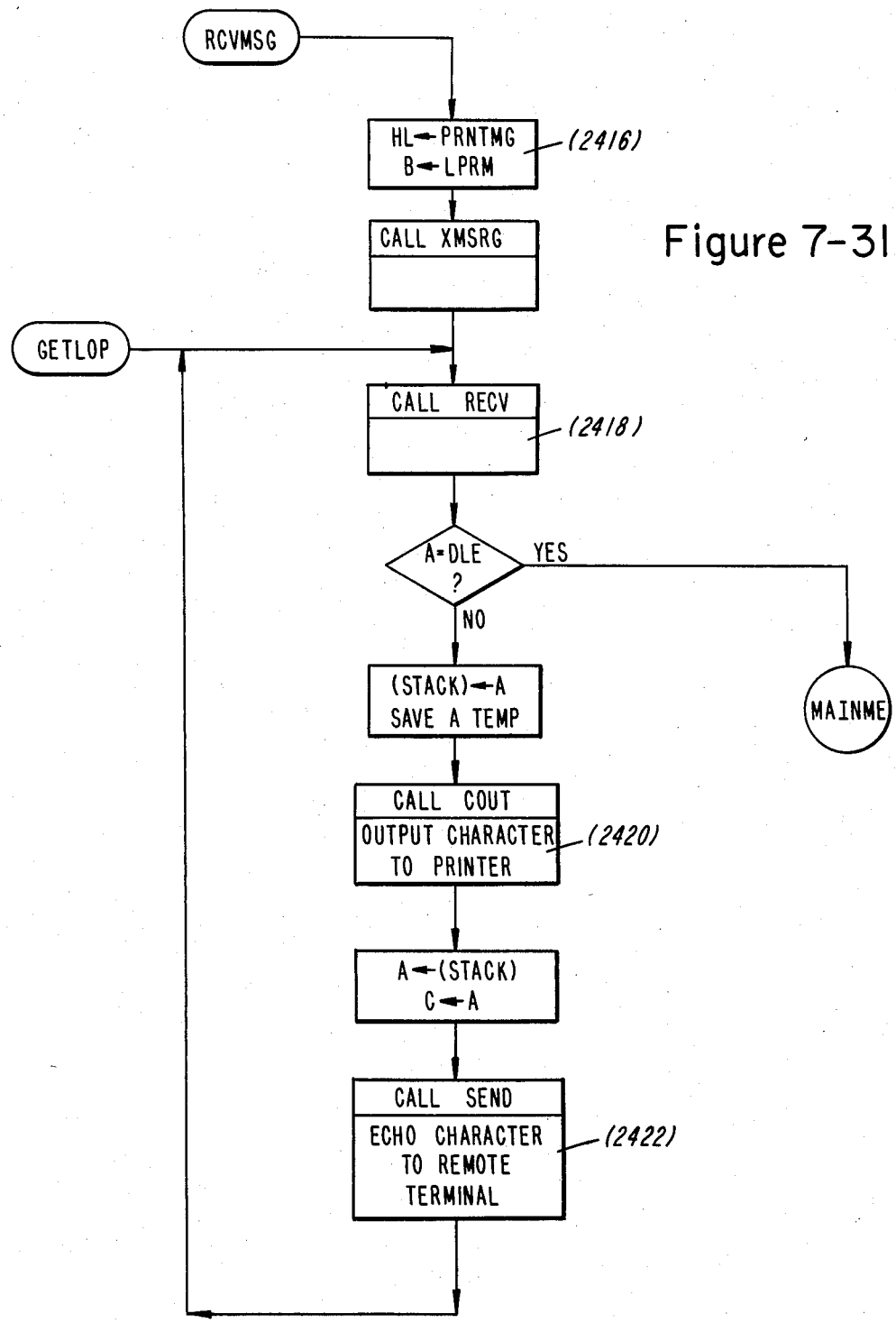
Figures 7, 8, 9, 10, 11, 12, 13, 14, 15, 16, 17, 18, 19, 20, 21, 22, 23, 24, 25, 26, 27, 28, 29, 30, 31, 32:
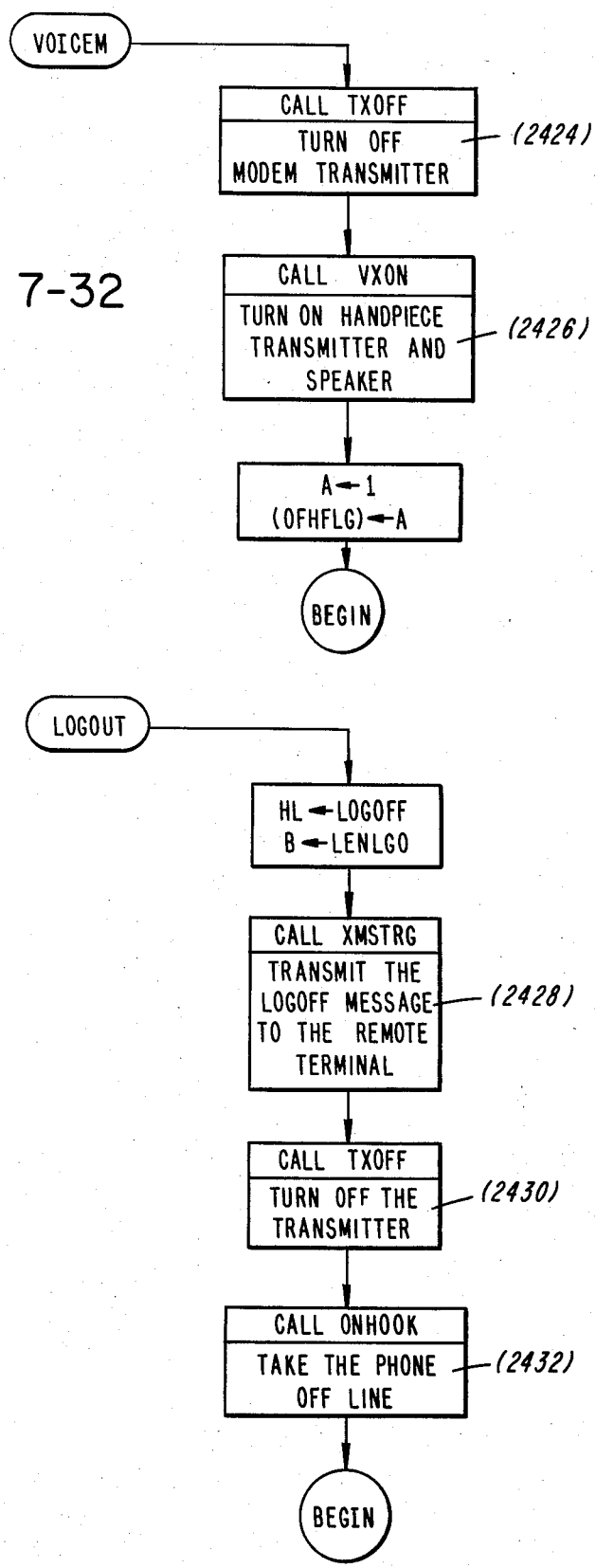
Figures 7, 8, 9, 10, 11, 12, 13, 14, 15, 16, 17, 18, 19, 20, 21, 22, 23, 24, 25, 26, 27, 28, 29, 30, 31, 32, 33:
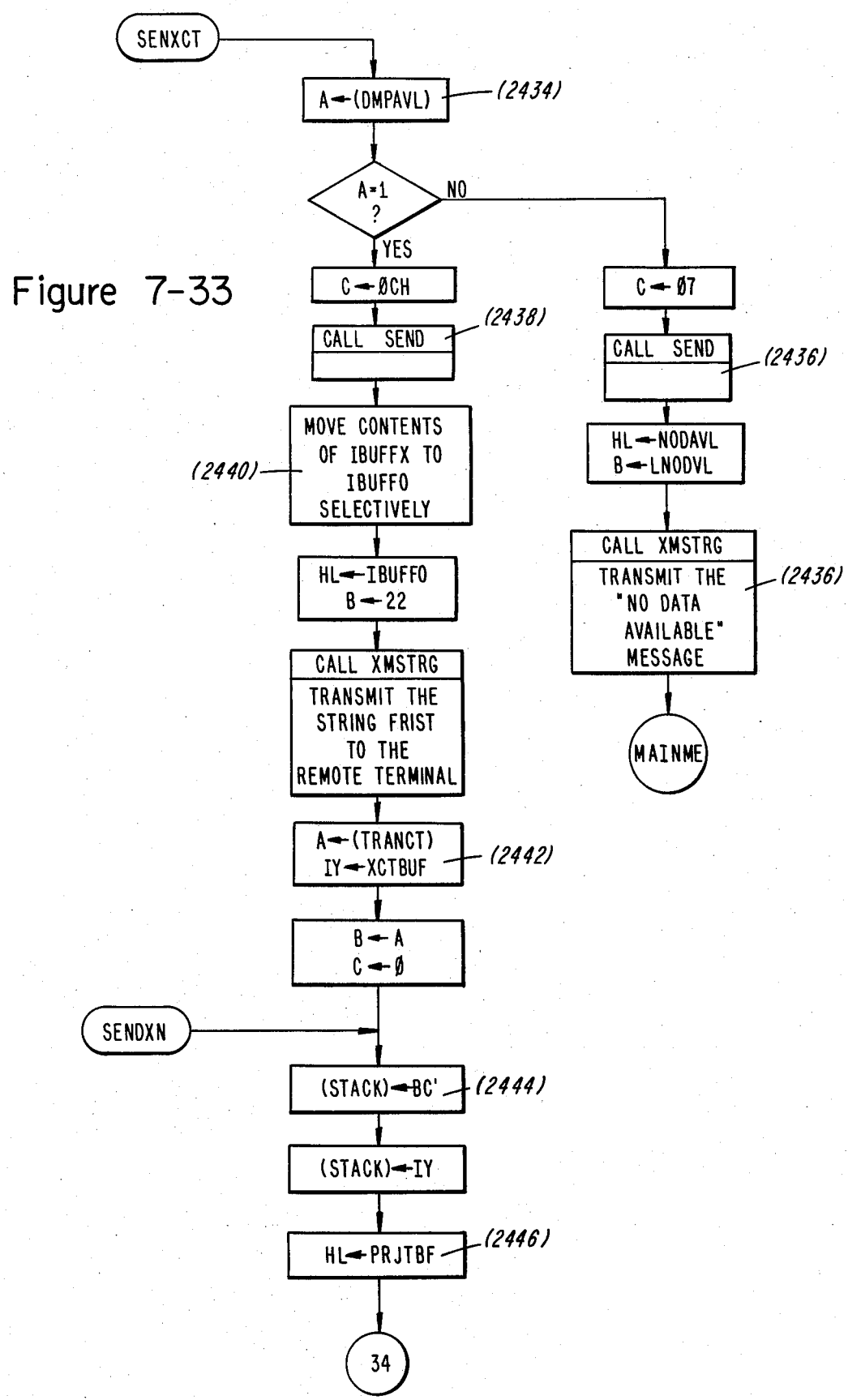
Figures 7, 8, 9, 10, 11, 12, 13, 14, 15, 16, 17, 18, 19, 20, 21, 22, 23, 24, 25, 26, 27, 28, 29, 30, 31, 32, 33, 34:
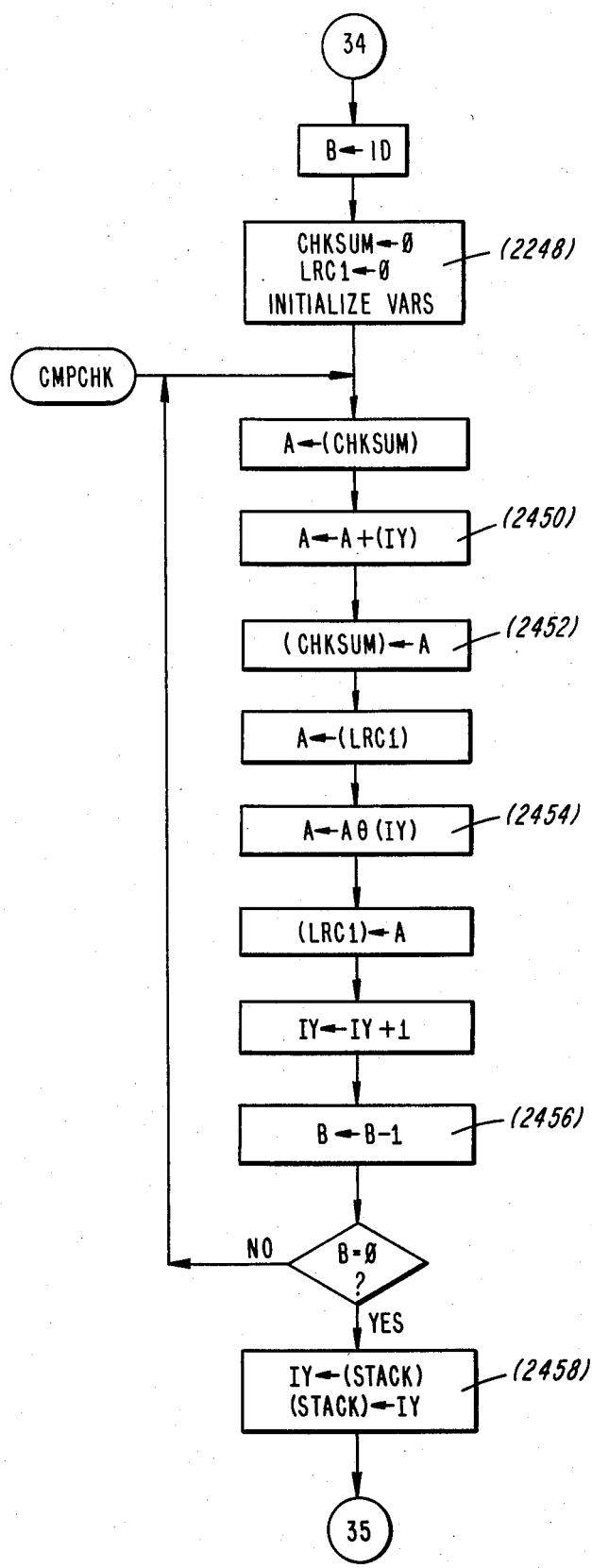
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35:
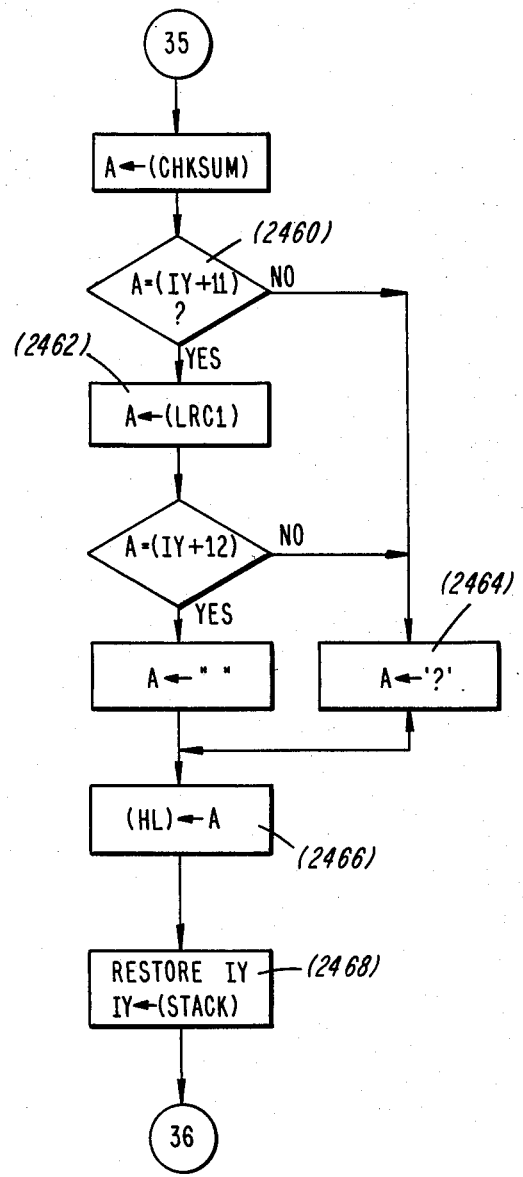
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
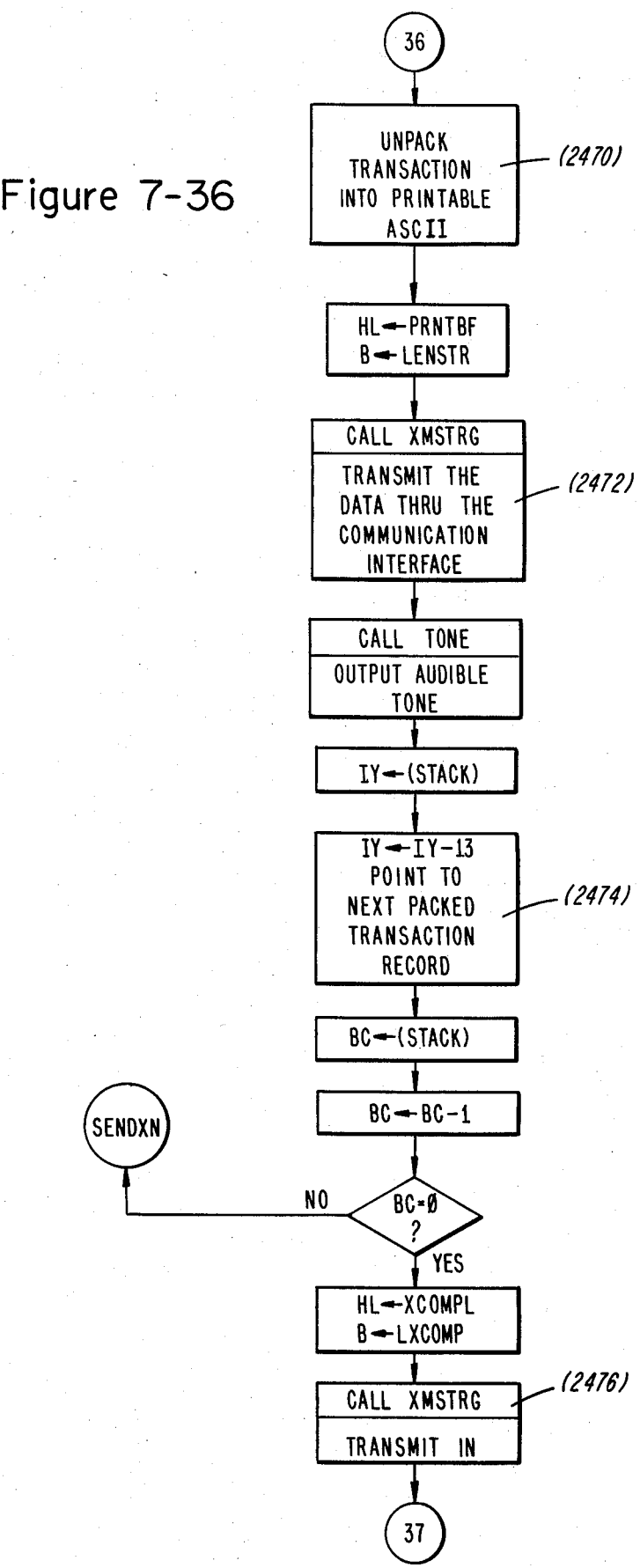
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
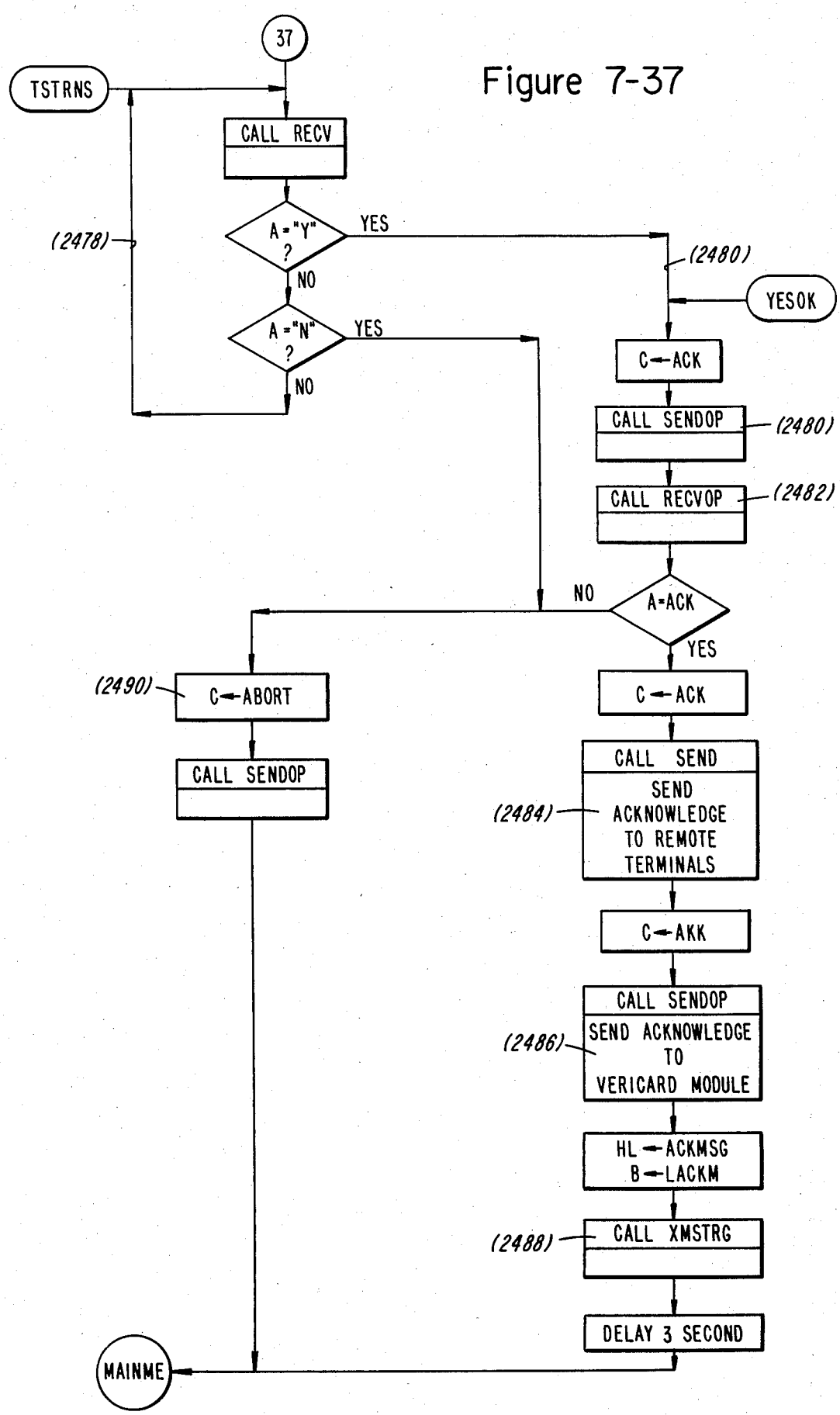
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
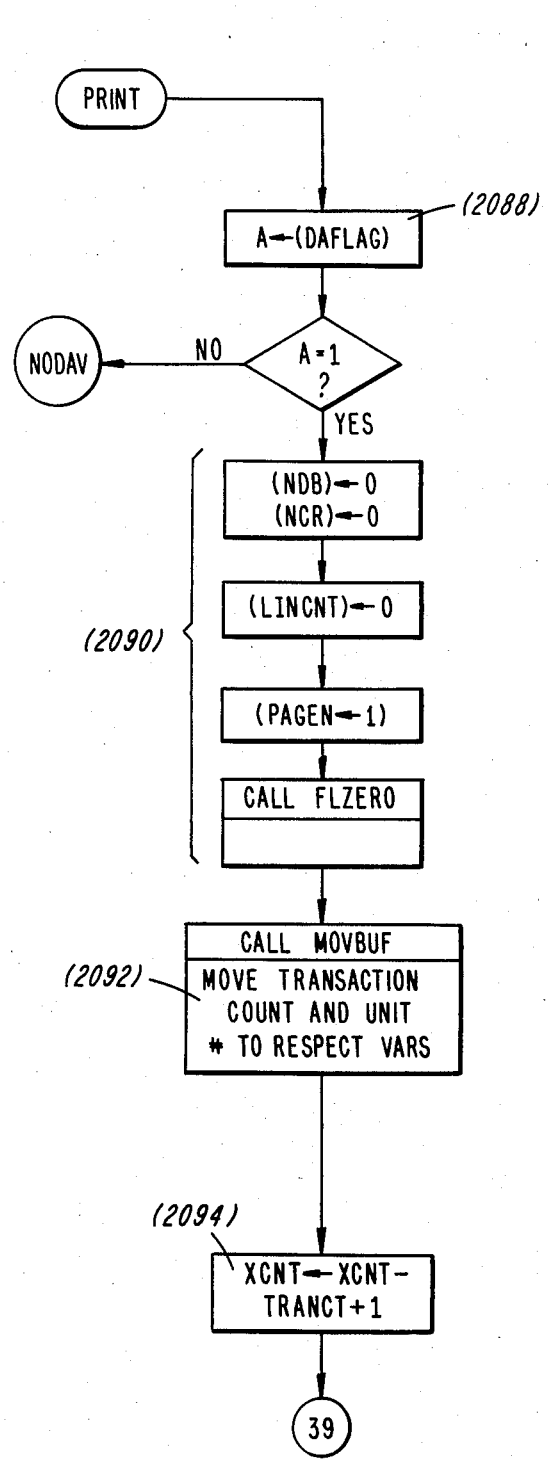
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
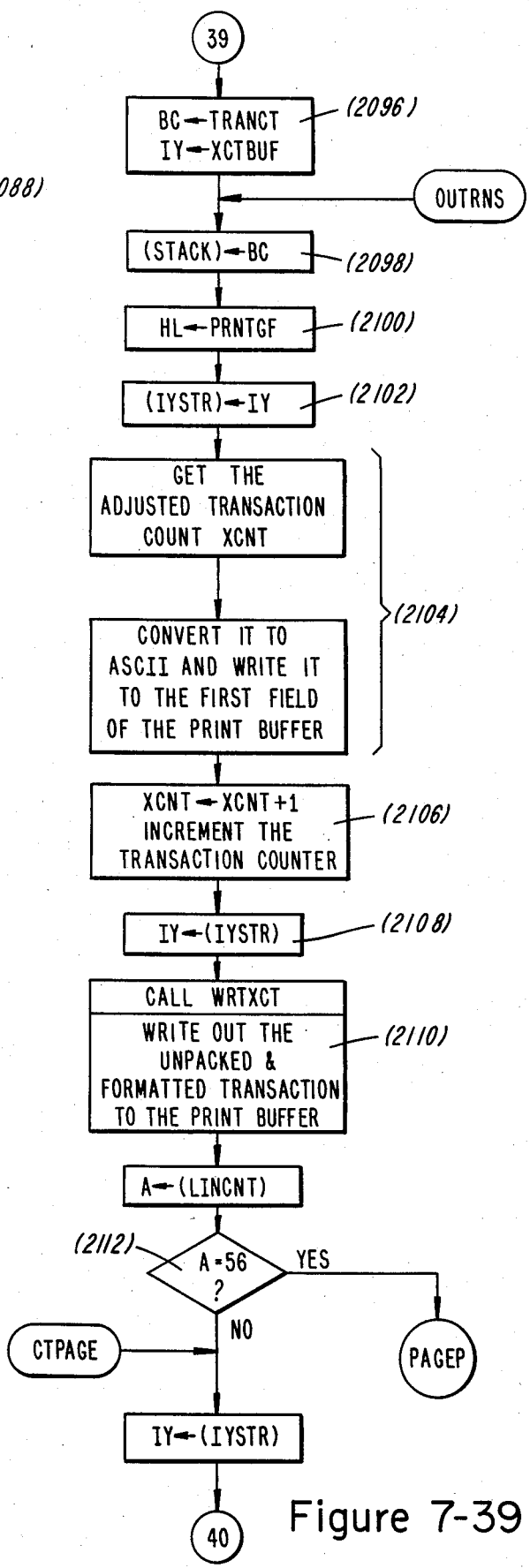
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
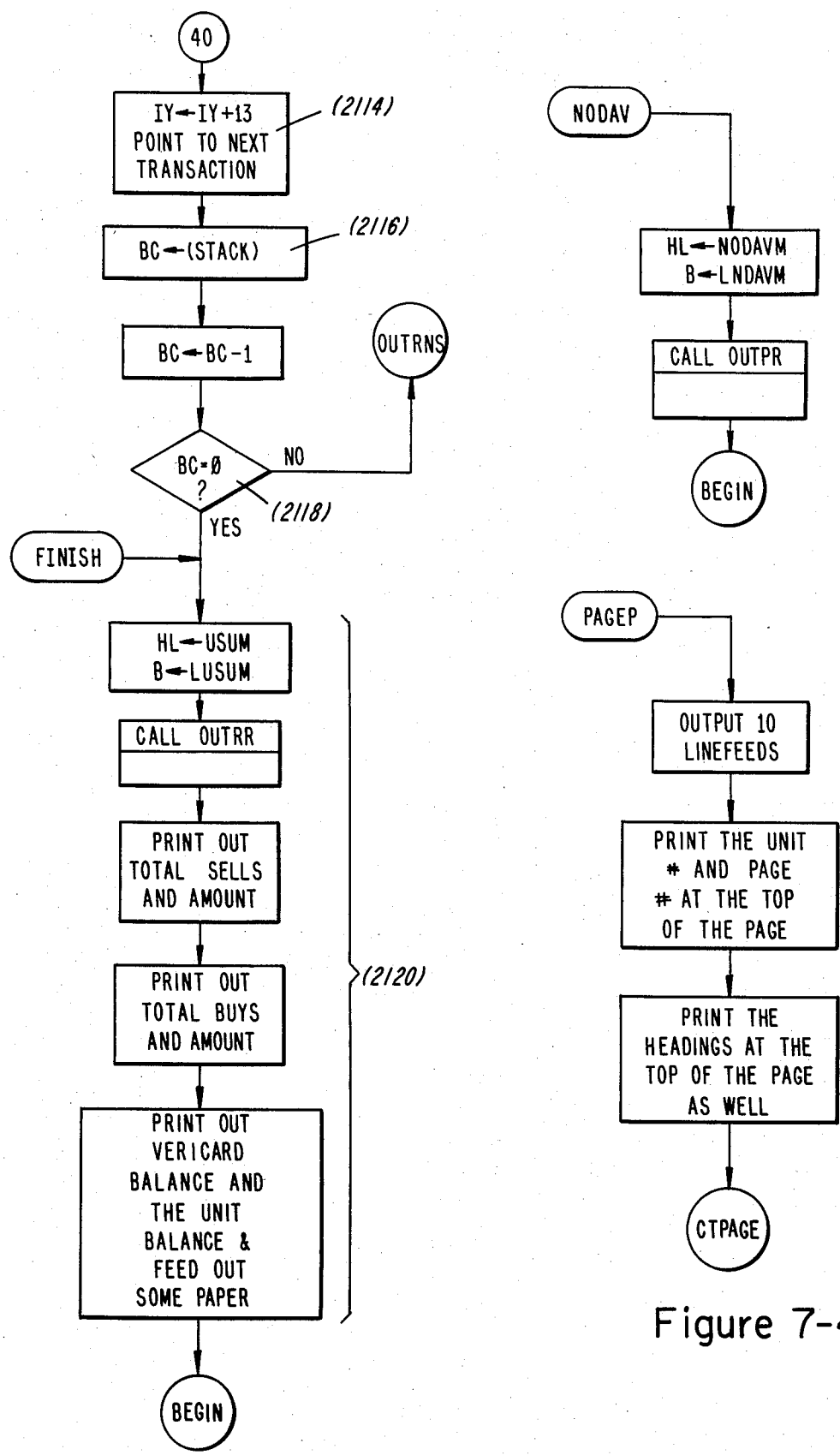
Figure 9A:
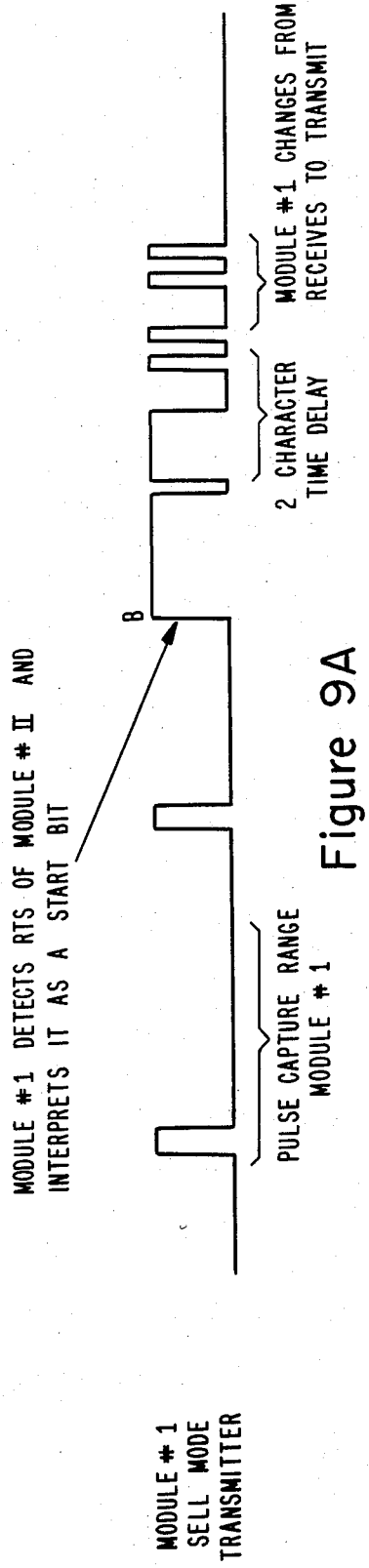
Figure 9B:
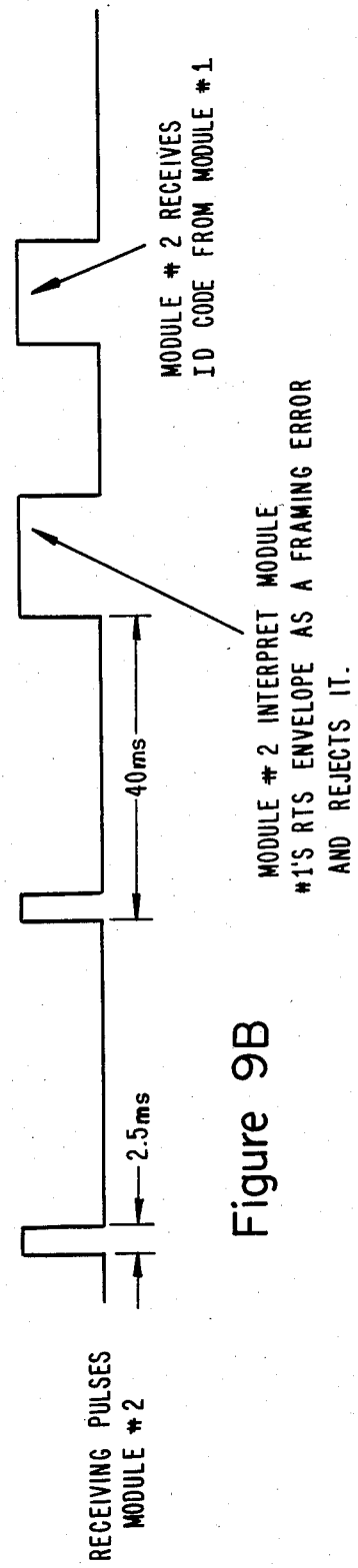

Referring again to FIG. 7-12, the value of the variable ETB is stored in register C, and transmitted using the SEND subroutine (2214). In FIG. 14, the receive subroutine RECV is now called (2216). If the value of STX is not equal to the content of the A register, indicating no start of transmission, the program jumps to indicate a transmission error at routine XMER; otherwise, the receiver input buffer is pointed to (2218) and subroutine RXBLK is called (2220). Subroutine RXBLK operates in conjunction with subroutine TXBLK and utilizes CHKSUM error detection with retransmission on negative acknowledgement.

If there is no end of transmission following subroutine RXBLK, (2222) transmission error is indicated at XMERR; otherwise, the received data are relayed through the optical interface to the module 20 using subroutine TXBLK (2224). The seller's date and account number are repacked into a form which is similar to the packed data received from the module 20 (2226).

Referring to FIG. 7-14, subroutine COPYAC repacks the buyer's account number into a pack buffer (2228). Subroutine UNITIO prints out the account number (2230) and routine WRTXCT (2232) takes the packed data in PACKBF and generates a formated listing on the phone printer in the following exemplary order: date, seller's module number, amount of transaction and type of transaction.

Subroutine OUTPR (2234) causes the printer to generate a status prompt which advises the buyer to confirm or cancel the transaction, as explained in the introductory portion of this disclosure. If there is no confirmation by the buyer, an error prompt is displayed (XMERR) by the portable module 20 seated in resident unit 62. The program jumps to routine ECHOD in FIG. 7-15 if the buyer confirms the transaction.

The ECHOD routine obtains the received confirm or cancel code, and transmits that information over the telephone lines using subroutine SEND (2236). Subroutine RECV is now called to obtain the seller's or buyer's confirm or cancel order. An error has occurred (XMERR) if neither a confirm nor a cancel order is indicated (2238). If a confirm or cancel order is received, the "confirmed" message is pointed to (2240), and printed (2242). There is a final end of transaction message (2244) printed and the confirm or cancel order is transmitted to module 20 (2246). Data are now obtained from the optical interface using subroutine RECVOP (2248).

Referring to FIG. 7-16, the character is transmitted through the modem (2250), and a response is obtained from the remote unit (2252). The received character is relayed to the portable module 20 (2254) by the resident unit 62. The transmitter is now disabled following a time delay of one second (2256), so that the remote unit can receive the last character transmitted. The speaker and microphone of the handpiece are turned on (2258) and the modem carrier transmitter is turned off (2260).

If a deny character is received following step 2236 in FIG. 7-15, the ECHODN routine points to the "try again" message. The message is printed out using subroutine OUTPR (2262) and some line feeds together with a short promotional message are generated using a subroutine ENDTCK (2264).

Referring now to FIG. 7-17, the sell routine, identified during step 2168 in FIG. 7-11, is initiated by setting the mode flag (2266). Subroutine SANS (2268) is called to configure the modem to the ANSWER mode. The seller's phone is automatically set to respond to the standard Bell 103 answer frequencies which, for transmit, are 2225 Hertz and 2025 Hertz for mark and space, respectively, and for receive are 1270 Hertz and 1070 Hertz for mark and space, respectively.

Subroutine XCTHDR (transaction header) (2270) obtains the seller's transaction data from module 20 in a single block transmission. These data include the seller's date and account number. Subroutine XCTHDR also mutes the handpiece speaker and microphone, and performs synchronization of the two phones.

The communication is pointed to (2272) and the length of the data stream to be received is set. Subroutine RXBLK (2274) is now called, to receive the buyer's transaction data. Subroutine RXBLK is shown in detail in FIG. SR-5, wherein the CHKSUM variable is initially cleared (2276) and data are stored at the location pointed to by register pair HL with data length defined by register pair BC. Received data are stored at the location pointed to by register HL (2278), the pointer is incremented and data counter is decremented. When there are no more data (2280), the complemented CHKSUM is received (2282). If the CHKSUM is 0, the registers are restored and control of the program is returned (2284). If the CHKSUM is not 0, "no acknowledge" is transmitted, the registers are restored and the subroutine is re-executed (2286).

Following return of control back to the main program, the transaction acknowledge is transmitted (2288), and the ETB character is received (2290).

Referring to FIG. 7-18, if end of transmission has not occurred, an error message is generated (2292). Subroutine TXBLK transmits the seller's transaction data from the optical input buffer, pointed to by the HL register pair, to the remote buyer's resident unit. An end of transmission signal is now transmitted (2296) and the register pair HL again points to the transmission input buffer (2298). The buyer's transaction data are transmitted through the optical interface to the seller's resident unit (2300). These data include the buyer's account number as well as the amount of the transaction. The buyer's amount and account number are repacked into a form that is similar to the packed data received from the module 20 during a transaction dump (2302). The sell transaction is now completed by transferring control of the program to FINXCT in FIG. 7-14.

Referring to FIG. 7-19, in routine XFRXCT (transfer transaction), identified during step 2180 in FIG. 7-11 (XDUMP), the message "NOW RECEIVING TRANSACTION DATA" is pointed to by registered pair HL, with register B defining the length of the message. The message is printed (2304) on the printer, and the portable module 20 is advised that the resident unit is ready to receive the message (2306).

Subroutine GETHDR retrieves header record information from module 20, including the number of transactions, the account number, the balance and the historical transaction count (2308). Subroutine GETMEM reads the entire module memory 204, 206 containing the packed transaction records. The DMPAVL flag is set to indicate that the transaction memory of the resident unit contains data from the module 20 (2312). The registered pair HL now points to the message "TRANSACTIONS RECEIVED FROM MODULE", and the message is printed (2314). Control of the program branches back to BEGIN in FIG. 7-1.

The portable module request routine MMREQ, indicating that a portable module is requesting service (see FIG. 7-1) advises the module that the resident unit is ready and that the handpiece of the resident unit is on hook (2316). If the module is not requesting a transaction dump, an error message is generated (2318); if the module is requesting a transaction dump, a receipt of request from the module signal is transmitted (2320), and the module header record containing information on the account number, module balance, transaction count and historial transaction total is received (2322).

The routine ANSPHN (answer phone) accessed by the program at FIG. 7-2, causes the resident unit to be answered or to ring the ringer depending upon the state of the message flag MSGFLG. The state of the MSGFLG in the A register is tested (2324) to determine whether the message flag is set. If the message flag is not set, the telephone is caused to ring (2326) using an amplifier driven speaker on an output line of the parallel interface. The phone status lights are simultaneously flashed (2328). If the flag MSGFLG is set, however, the resident unit waits for a second ring. If no second ring occurs within five seconds (2330), the subroutine exits to the main control loop to prevent spurious pulses on the phone line to cause the resident unit to go on-hook. The second ring is detected in FIG. 7-22 which establishes a loop 2332 wherein the state of the ring detect bit on port C of PPI 216 is tested to determine whether the phone is ringing. If the phone is not ringing, the timer advances, and after five seconds, the program branches back to BEGIN. If the phone line is ringing, on the other hand, the program jumps to GOTNXR wherein the speaker and handpiece microphone are muted (2334) and a subroutine OFFHK is called which places the phone off-hook and waits for the coupler cut through on port C of PPI 216 (2336). The telephone is placed in the answer mode by subroutine SANS (2338), and the telephone and originating computer are synchronized using subroutine SYNC (2340).

The subroutine SYNC is shown in FIG. SR-6. The SYNC subroutine performs line initialization between two resident units 62 based upon whether the current resident unit is in the BUY mode or SELL mode. The SYNC routine goes through the respective ORIGINATE or ANSWER initialization sequence, depending upon the mode of the unit. Initially, the mode flag is obtained and tested (23432). If the mode flag is set, the unit is controlled to answer; if the mode flag is reset, the unit is controlled to originate. Assuming that the unit is controlled to originate, port C of PPI 216 is tested to determine whether a carrier is present (2344). If a carrier is present, there is a 1.6 second delay (2346) before turning on the transmitter. The input buffer is pointed to (2348) and the buffer returns the next character terminal. If the character is within the 0–9 range, the input character is stored (2412), the counter is incremented and the character is relayed to the portable unit 20 (2414) followed by decrement of the character input count, until the count is at 0.

FIG. 7-13 illustrates the RCVMSG routine, wherein received messages are output to the system printer until a control character is received. The prompt message pointed to by register pair HL and length register B (2416) is "ready to receive and print messages", sent to the remote terminal indicating that the resident unit is ready to receive data. The receive subroutine is called (2418) and a DLE character is tested. If there is a DLE character, the program returns to the main menu; otherwise, print characters are outputted to the printer (2420) through a buffer, which enables the characters to be temporarily stored until the printer is ready. The characters are also relayed to the remote terminal (2422).

FIG. 7-32 illustrates the VOICEM routine and log out routine. VOICEM initially turns off the modem transmitter (2424) to exit to the voice mode. Subroutine VXON turns on the handpiece transmitter and speaker (2426) and the resident unit is caused to emulate an "off-hook" condition before returning to the main control loop at "BEGIN" (FIG. 7-1).

Log out consists of turning off the carrier and hanging up the line. Subroutine XMSTRG causes the log off message to be transmitted to the remote terminal (2428), the transmitter to be turned off (2430) and the phone to be taken off line (2432) before returning to the main control loop.

In FIG. 7-33, the routine SENXCT, accessed from step 2360 in FIG. 7-23, causes transaction listings to be transmitted to the remote computer. The module memory dump available flag (DMPAVL) is accessed and tested to From a FIFO buffer. The carry CY is set if the buffer is empty (2350). After flushing the buffer, there is a 255 millisecond delay (2352). A SYNC character is now transmitted to control a carriage return (2354). If data other than a carriage return ($0D_{16}$) is received, that data are rejected; the input buffer is tested until a recognizable character is received (2356). Control is now returned to the main program at FIG. 7-22. The program indexes to the main menu loop MAINME which allows remote control of the resident unit by an operator at a central computer.

Referring to FIG. 7-23, the routine MAINME transmits a menu selection screen to the remote computer terminal. The operator is offered the following options: (1) unit status, (2) list transactions, (3) print messages, (4) return to voice mode and (5) sign-off hang up phone (2360).

In FIG. 7-24, the routine UNSTA (unit status menu) permits viewing and changing of internally stored data. The operator is given the option to (1) display the display unit (stored inside the phone) and data (2) change unit number and data and (3) return to main menu (2362).

The internally stored account number is displayed by routine DISPAC in FIG. 7-25. The message "internal unit number: . . . " is transmitted to the remote computer (2364), followed by the transaction usage count (2366) and prompt message (2368). The program now branches back to UNSTA in FIG. 7-24.

Generation of the change menu is shown in FIG. 7-26. The change menu display provides the option of changing (1) internal account number, (2) transaction usage number, (3) transaction listing and (4) return to unit status menu (2370).

The GETAC routine accessed from step 2370 controls read in of the internal account number. The input account number prompt message is first pointed to by register pair HL and sized by register B (2372). A six digit account number is then inputted (2374) at GETNUM, and the output digit is received by the resident unit (2376). Step 2378 involves editing of the account number and in step 2380, the received account number is relayed to the portable module. Finally, the character input counter is decremented (2382) until the characters are exhausted. Control now returns to DISPAC in FIG. 7-25.

FIG. 7-28 shows the RNGBEL routine to control the resident unit bell to ring (2384) and routine BACKS (2386) to backspace a detected erase field and rewrite prompt, followed by a carriage return and line feed through subroutine XCRLF.

FIG. 7-29 illustrates usage count acquisition. The prompt "transaction usage" is initially pointed to (2388) and transmitted to the remote terminal. The transaction count, indicating the number of usages the resident unit has completed, is accessed (2390) and at routine GTLP, the input character is received at the optical input of the resident unit 20 (2392). Subroutine LMTCHK1 (2394) returns the carry flag if the ASCCI character falls outside the range of 0-9. If the carry flag is set, the bell of the resident unit is echoed (2396). The character data are converted to numeric data (2398) and the character is stored at the pointer location; the pointer is then incremented (2400). The character is now echoed back to the remote terminal (2402) and the count is decremented until all of the input data has been received (2404).

In FIG. 7-30, the GETLIS routine maintains a record of the number of complete transaction listings generated on the system printer. A "transaction listing" message is prompted at the remote terminal (2406). At routine USGLP the input data is received (2408), and the input character is tested to determine whether it falls between the values 0-9 (2410). If the value is outside 0-9, the telephone bell is rung and the bell code is transmitted to the remote determine whether any data are available for transmission. If no data are available, the bell tone is transmitted to the remote computer (2436) followed by the message "no data available" (2436) before returning to the main menu. If there is data to be dumped for printing, a form feed is transmitted (2438) to clear the screen of the remote terminal. The transmit output buffer is now formatted with a string of header information (2440). The header record contains a transaction count, the unit account number and the unit balance. Note that the transaction count is loaded into the A register in step 2442. Transactions are counted as they are transmitted, and the transaction count is saved, during routine SENDXN (2444). An unpacked transaction record is built (2446) as the program continues to FIG. 7-34.

The CHKSUM of the packed record is now compute (2448). The packed record length is ten bytes. The logical record check (longitudinal parity) is also computed (LRC).

Specifically, CMPCHK involves obtaining the current value CHKSUM in register A and adding the byte pointed to by IY (2450). CHKSUM is restored (2452). This is equivalent to the operation CHKSUM =CHKSUM +DATA(I), where $I = 1^n$, for a data string of length and bytes. The longitudinal parity is computed (2454). The next data byte is pointed to (2456) and the counter is decremented until the counter value is at 0. The pointer IY is now restored (2458).

Continuing to FIG. 7-35, the computer CHKSUM is tested against that in the stored data. If there is a mismatch, the record is flagged as containing an error. The pointer IY plus 11 points to the CHKSUM byte (2460). LRC is now tested (2462). If IY plus 12 does not point to the LRC byte, the questionable record is flagged with an error character (2464); otherwise, the record is flagged with a blank indicating that the CHKSUM byte is proper. The data are stored at the location pointed to by the register pair HL (in this case PRNTBF (2466). IY now points to the next transaction to be either sent direct in packed BCD form or unpacked and transmitted as a formatted record (2468). The packed data are stored as a concatenated BCD string consisting of a data, account number, amount and transaction type (i.e., plus or minus). Thus, the data can be transmitted either in packed BCD form and then unpacked at the receiving end or it can be unpacked and expanded into a printable ASCII record at the phone end as it does during a local printout of transaction memory. For testing purposes, the data are unpacked by the phone and then transmitted. Data will generally be transmitted in packed form, however, to reduce transmission time.

Continuing to FIG. 7-36, the unpacked string is stored at location PRNTBF (2470). The register pair HL now points to PRNTBF as an input argument to XMSTRG, where register B contains the length of the string. Subroutine XMSTRG transmits the string to a remote terminal at the central computer (2472). The pointer IY is poped off the stack and restored to where it was pointing prior to computing the pointer to the next record (2474). An audible tone is output through the ring enunciator circuit each time a transaction is transmitted, to prompt the user of the phone that the transmission is proceeding smoothly. Finally, a "transmission complete" message is transmitted to the remote terminal (2476).

In FIG. 7-37, step 2478 involves waiting for confirmation of receipt from the remote terminal. When confirmation occurs, the program moves to branch 2480, which sends an acknowledge code to the module 20 (2480), waits for a reply (2482) and acknowledges. An acknowledgement signal is sent to the remote terminal (2484) and to the module 20 (2486). Finally, the message "transaction purge acknowledged" is transmitted to the remote terminal (2488) and following a one second delay time, control is returned to the main loop.

The module 20 is aborted if there is no confirmation of receipt from the main terminal (2490), before control is returned to the main control loop.

The print routine that is shown in FIG. 7-38 was described earlier. An exemplary printout is shown below:

| | | MODULE TRACK 1 | | |
|---|---|---|---|---|
| TRNS # | DATE | ACCOUNT # | AMOUNT | TYPE |
| 24022 | 02/00/83 | 123456 | $100.00 | BUY |
| 24023 | 02/02/83 | 123456 | $56.00 | BUY |
| 24024 | 02/02/83 | 123456 | $500.00 | BUY |
| 24025 | 02/02/83 | 123456 | $288.00 | SELL |
| 24026 | 51/52/83 | 123456 | $258.00 | SELL |
| 24027 | 02/03/83 | 123456 | $248.00 | SELL |
| 24028 | 02/03/83 | 123456 | $1000.00 | SELL |
| 24029 | 02/11/83 | 123456 | $500.00 | BUY |
| 24030 | 02/03/83 | 123456 | $125.00 | BUY |
| 24031 | 02/03/83 | 123456 | $1000.00 | BUY |
| 24032 | 02/03/83 | 123456 | $523.00 | SELL |
| 24033 | 02/03/83 | 123456 | $45.00 | SELL |
| 24034 | 02/03/83 | 123456 | $1565.00 | BUY |
| 24035 | 02/07/83 | 123456 | $150.00 | BUY |
| 24036 | 02/08/83 | 123456 | $789.00 | BUY |
| 24037 | 02/08/83 | 123456 | $61.15 | BUY |
| 24038 | 02/08/83 | 123456 | $1999.99 | BUY |
| 24039 | 02/08/83 | 1234 3 | $4999.81 | SELL |
| 24040 | 02/08/83 | 123456 | $100.00 | SELL |
| 24041 | 02/08/83 | 123456 | $2078.00 | SELL |
| 24042 | 02/08/83 | 123456 | $78.00 | BUY |
| 24043 | 02/08/83 | 123456 | $1000.00 | BUY |
| 24044 | 02/08/83 | 123456 | $1900.33 | SELL |
| 24045 | 02/08/83 | 123456 | $45.00 | BUY |

| | UNIT SUMMARY | | |
|---|---|---|---|
| TOTAL SELLS = | 10 | AMOUNT = | $11540.14 |
| TOTAL BUYS = | 14 | AMOUNT = | $7969.14 |
| | BALANCE | | $5955.15 |

FIG. 7-41 illustrates the NODVAC and PAGEP routines. Routine NODVAC prints out "no data available" if there are no data currently in the transaction memory (see step 2088 in FIG. 7-38). PAGEP prints the page heading, including the unit number, page number and column headings Thus, there has been described a system for transferring electronic funds data between portable modules by optically couling the data directly between the modules or indirectly through resident units that interface with telephone lines. The modules operate, respectively, in credit and debit modes, and maintain a running transaction record associated with each mode in different regions of memory within each module. The modules are initialized, upon issuance, by the sponsoring institution, with a personal identification number, initial account balance and initial transaction count as well as other data. Each module is periodically placed on line, by a resident unit, to a central computer to download its stored transaction data and, if necessary, receive an increase in the account balance or initialization of the transaction count. Communication with the central computer could, alternatively, be made at an automatic teller or equivalent, constructed or retrofitted to receive a module 20. A summary of transactions that have been completed since a module was last initialized or during some other predetermined time period can be printed locally or at a remote location through a pair of resident unit. Communication is established between modules and between modules and resident units using a "hand-shaking" protocol that confirms bidirectional communication before a transaction is completed. The protocol also identifies to the module whether the remote signal source is a resident unit or another module, and switches the local module into the proper mode for bidirectional data transfer.

Although the detailed description of the invention has been made with respect to an electronic funds transfer environment, the system is capable of being applied in other environments wherein data are accumulated and transferred between locations. Examples of other types of data that may be processed, in accordance with the present invention, are set forth below.

Physiological Data

In this application, the module 20 and resident unit 62 accumulate physiological data, such as heart rate, respiration, blood pressure, etc. Physiological data may be obtained manually by medical personnel or by the patient. The data may be keyboard entered into module 20 at predetermined times, or may be entered automatically using monitoring equipment, such as a computer. As one example, a portable unit measuring EKG may be carried by a patient. Quantized EKG data may be sampled by a suitable sensor applied to external data input port 23 (see FIG. 1b) or through optical interface 36. In either case, the values of the quantized data as well as the data acquisition times are stored in corresponding locations of the RAM.

At a particular time, such as the end of the day, the module 20 is positioned in resident 62, and the telephone number is dialed using telephone keyboard 70 (FIG. 4). The personal identification number (PIN) of the patient is keyboard entered at module 20, and the module and remote resident unit at the central computer undergo a handshaking cycle of protocol, as described above in connection with funds transfer, to establish communication. The physiological data including quantized data and corresponding times are now downloaded into the computer data bank prior to sign off.

Privacy is ensured by the patient by data encryption established by standard encryptology methods, such as by using a DES chip (not shown) within the resident unit 62. A further level of security is the personal identification number known by only the patient and required to be keyboard entered prior to each transfer to the central computer.

It is thus possible to establish a national physiological data bank, wherein physiological data concerning each authorized module holder are in the bank. Any physician or other authorized personnel requiring information on the patient, on an emergency or routine basis, can obtain that information virtually instantaneously using a resident unit 62 to access the data base and information concerning the particular patient stored therein. The physician, however, is able to obtain that information only if he is authorized to use the system and if the patient has authorized release of data in his "account" to that particular physician or group of which the physician is a member. The physician will have to identify himself as an authorized user of the system by keyboard entering his own personal identification number. Once into the system, the central computer determines whether the particular physician is permitted to have access to information on the patient by comparing the physician identification number with corresponding identification numbers of physicians or other personnel who are authorized to view the personal records of the patient.

Security-Work-Time Data

Modules 20 in resident unit 62 may be applied for accessing restricted regions as well as for maintaining work-time records. In this regard, module 20 can be used as an electronic "key" to enable only authorized users to have access to a secured zone or to use proprietary equipment, such as a computer. In a security zone, the user must insert his module 20 into the receptacle of a resident unit 62, and keyboard enter his PIN. Only if the PIN is correctly keyboard entered does the lock open. Upon entry, the module records place and time of entry and stores that data in memory. Meanwhile, the resident unit requires the PIN of the individual having authorized entry as well as the time of entry. Upon exit, the user must reinsert his module 20 into the receptacle of resident unit 62. The time as well as place of the exit is stored in the memory of module 20. Both portable module 20 and resident unit 62 thus carry an "audittrail" of access times, personnel (unit 62) and place (module 20).

The resident unit 62 may be on-line with the central computer whereby the identity and status of the user requesting access to the secured area are verified upon departure from the area. The on-line system may authorize exit only if the user has receive a "clearance" based upon information maintained in memory at the central computer.

Periodically, such as at the end of the week, the user may place his module 20 on-line to the central computer at a resident unit 62, such as at his home telephone, to download his work-time or location-time records. The user will, again, keyboard his PIN to enable the unit 62 to handshake with the central computer. The work-time or location-time records transmitted to the central computer are stored in the particular "account" assigned to the user prior to sign off. Computations may be provided at the central computer to determine compensation as a function of the number of hours worked as well as of the particular hours, and a compensation check may be mailed to the user, virtually without any human intervention.

Radiation Dosage Data

Operation of the modules 20 and resident units 62 of the invention in a radiation dosage monitoring application involves monitoring radiation using a suitable radiation probe. As one possibility, the amount of sunburn a user is likely to receive is determined by measuring instantaneous ultraviolet radiation using an ultraviolet radiation probe (not shown) within or connected to module 20 (see probe port 23 in FIG. 1(b)). This measurement may be taken at predetermined intervals, such as at one minute intervals. The instantaneous reading of ultraviolet radiation, together with the time, is applied to the memory of module 20, together with the particular time of the reading. Both data are stored in corresponding memory locations.

There are now two possibilities of data read out. The first is to simply accumulate radiation dosage readings as a function of time and to energize an alarm (not shown) when the accumulated, or integrated, radiation dosage reaches a predetermined amount which may be tailored to the particular user's sensitivity. The second possibility is to download the dosage and time data to the central computer using the resident unit 62, to establish a radiation dosage profile in monitoring radiation dosage of workers in a high radiation zone, such as in proximity to a nuclear reactor. The data would be used for, among other purposes, restricting exposure of workers to radiation by limited accumulated dosage, or to help construct cause-effect data for medical research.

We claim:

1. An electronic fund transfer system for enabling financial transactions to be carried out between either local or remote users, comprising a plurality of microprocessor controlled modules, each one of said modules including a housing carrying a display and a keyboard for manually entering electronic funds data, said housing containing microprocessor controlled circuitry including a memory, and a first optical interface coupled to the circuitry and extending through the housing to transfer electronic funds data bidirectionally directly with another one of said modules with said modules positioned adjacent each other with said first interfaces thereof in registration, and a plurality of resident units, each of said resident units including a housing having a receptacle to receive one of said portable modules and a second optical interface in said receptacle positioned in optical registration with the first interface of one of said modules seated in said receptacle to couple electronic funds transfer data bidirectionally with said one of said modules seated in said receptacle, said resident unit further including means for transferring data bidirectionally onto external communication lines; and means for controlling electronic funds data transfer bidirectionally (1) directly between local portable modules via only said first optical interfaces thereof or (2) between remote portable modules, indirectly, along external communication lines through the resident units and via said first and second optical interfaces thereof.

2. An electronic funds transfer system for enabling financial transactions to be carried out between either local or remote users, comprising a plurlaity of microprocessor controlled modules, each one of said modules including a housing carrying a display and a keyboard for manually entering funds transfer data, said housing containing microprocessor controlled circuitry including a memory, and a first optical interface coupled to the circuitry and extending through the housing to transfer electronic funds data bidirectionally with another one of said modules with said modules positioned adjacent each other with the first interfaces therof in optical registration, and a plurality of resident units, each one of said resident units including a housing having a receptacle to receive one of said portable modules and further having a second optical interface in said receptacle positioned to be in registration with one of said modules seated in said receptacle for bidirectional electronic funds data transfer with a module seated in said receptacle, said resident unit further including means for transferring data bidirectionally onto external communication lines, and data protocol means in each of said microprocessor controlled modules for automatically determining whether said each of said modules is (1) in direct communication with another of said modules via only said first optical interfaces thereof or in indirect communication via said first and second optical interfaces thereof with another of said modules through resident units in which said modules are seated or (2) in communication with a resident unit.

3. The system as defined in claim 2, wherein each of said resident units includes means for generating an alternating binary code identification signal, and each of said portable modules includes means responsive to said alternating code signal for making said resident unit identification.

4. A system for accumulating and transferring data between either local or remote users, comprising a plurality of portable modules, each of said modules including a housing carrying a keyboard for manually entering data and a display, said housing containing microprocessor controlled circuitry including a memory, and a first optical interface external to said housing for coupling the data directly to the corresponding optical interface of another one of said portable modules with said modules positioned adjacent each other and the first interfaces thereof in optical registration; a plurality of resident units, each of said resident units including a housing, a receptacle in the housing for receiving one of said portable modules and a second optical interface in said receptacle for communicating the data with a portable module seated in said receptacle with said first and second interfaces thereof in optical registration with each other; means for transferring the data between resident units; and means for controlling communication of the data (1) directly between portable modules via only said first optical interfaces or (2) between portable modules, indirectly, through resident units within which said portable modules are seated, via said first and second optical interfaces thereof.

5. The system of claim 4, including control means within the microprocessor circuitry of each said portable module to store plural data accumulated by the module via the first optical interface and keyboard.

6. The system of claim 5, wherein each said resident unit includes means for selectively downloading data stored in a portable module received therein to a central computer or to control a printer to provide a hard copy of said data.

7. The system of claim 4, wherein the data include electronic funds tranfer data, and said portable module includes switch means for storing transaction data in separate regions of said memory as a function of a credit mode or debit mode of operation selected by said switch means.

8. The system of claim 4, wherein each of said portable modules includes an input port for receiving data from an external source to be accumulated within said memory.

* * * * *